United States Patent
Lang et al.

(10) Patent No.: US 10,623,443 B2
(45) Date of Patent: Apr. 14, 2020

(54) METHOD AND SYSTEM FOR POLICY MANAGEMENT, TESTING, SIMULATION, DECENTRALIZATION AND ANALYSIS

(71) Applicants: Ulrich Lang, San Diego, CA (US); Rudolf Schreiner, Falkensee (DE)

(72) Inventors: Ulrich Lang, San Diego, CA (US); Rudolf Schreiner, Falkensee (DE)

(*) Notice: Subject to any disclaimer, the term of this patent is extended or adjusted under 35 U.S.C. 154(b) by 276 days.

(21) Appl. No.: 15/645,639

(22) Filed: Jul. 10, 2017

(65) Prior Publication Data
US 2018/0069899 A1    Mar. 8, 2018

Related U.S. Application Data

(60) Provisional application No. 62/430,590, filed on Dec. 6, 2016, provisional application No. 62/408,829, filed on Oct. 16, 2016, provisional application No. 62/360,309, filed on Jul. 8, 2016.

(51) Int. Cl.
| | |
|---|---|
| H04L 29/06 | (2006.01) |
| G06F 17/24 | (2006.01) |
| G06F 3/0482 | (2013.01) |
| G06F 3/0481 | (2013.01) |
| G06F 8/38 | (2018.01) |

(52) U.S. Cl.
CPC ............ *H04L 63/20* (2013.01); *G06F 3/0482* (2013.01); *G06F 3/04817* (2013.01); *G06F 8/38* (2013.01); *G06F 17/248* (2013.01); *H04L 63/0263* (2013.01)

(58) Field of Classification Search
CPC .... H04L 63/20; H04L 63/0263; G06F 17/248
USPC .......................................................... 713/150
See application file for complete search history.

(56) References Cited

U.S. PATENT DOCUMENTS

| | | | | |
|---|---|---|---|---|
| 7,607,164 | B2 * | 10/2009 | Vasishth | G06F 21/577 726/1 |
| 8,396,838 | B2 * | 3/2013 | Brockway | G06F 21/10 707/662 |
| 8,856,863 | B2 | 10/2014 | Lang et al. | |
| 9,027,077 | B1 * | 5/2015 | Bharali | G06F 16/00 726/1 |
| 9,043,861 | B2 * | 5/2015 | Lang | H04L 63/0263 726/1 |
| 9,386,033 | B1 * | 7/2016 | Rossman | H04L 63/1433 |

(Continued)

*Primary Examiner* — Lynn D Feild
*Assistant Examiner* — Viral S Lakhia
(74) *Attorney, Agent, or Firm* — Muncy, Geissler, Olds & Lowe, P.C.

(57) ABSTRACT

A policy management method and system, which determines at least one functional model for the IT system; loads at least one pre-configured policy selection template that indicates at least one policy aspect applicable to the at least one IT system; generates at least one policy user interface that gathers a policy input; receives a policy input loaded from a data storage or a memory or entered by a user via a user interface; loads at least one pre-configured policy generation template that indicates at least one technical rule or configuration aspect of the policy that the policy template pertains to; generates at least one machine-enforceable rule/configuration compliant with the received input policy; transmits the at least one machine-enforceable rule and/or configuration to at least one policy implementation entity; and executes the transmitted at least one machine-enforceable rule/configuration.

18 Claims, 40 Drawing Sheets

Assisted policy
management example
steps

(56) References Cited

U.S. PATENT DOCUMENTS

| | | | |
|---|---|---|---|
| 9,420,006 B2* | 8/2016 | Lang | H04L 63/0263 |
| 9,563,771 B2* | 2/2017 | Lang | G06F 21/57 |
| 9,692,792 B2* | 6/2017 | Lang | H04L 63/0263 |
| 9,888,040 B2* | 2/2018 | Hoy | H04L 63/205 |
| 2013/0019276 A1* | 1/2013 | Biazetti | H04L 65/40 |
| | | | 726/1 |
| 2013/0081105 A1* | 3/2013 | Giambiagi | H04L 63/20 |
| | | | 726/1 |
| 2015/0237073 A1* | 8/2015 | Lang | H04L 63/20 |
| | | | 726/1 |
| 2015/0269383 A1* | 9/2015 | Lang | G06F 21/57 |
| | | | 726/1 |
| 2016/0142262 A1* | 5/2016 | Werner | H04L 41/0843 |
| | | | 709/224 |
| 2017/0230419 A1* | 8/2017 | Prafullchandra | H04L 63/20 |

* cited by examiner

Assisted policy management example steps

ObjectSecurity OpenPMF v4.0 Policy Editor

Select Policy Templates

HIPAA Security Rule ☑

HIPAA Privacy Rule ☑

PCI DSS ☒

NEXT >>>

250

Example policy wizard

FIG.2B

ObjectSecurity OpenPMF v4.0 Policy Editor

Analyzing Technologies & Information...

EMR ☑
Identity ☑
Physical Access ☑
Perioperative ☒
HR ☑
Radiology ☒
Lab

200

Example import wizard

FIG.2A

Example graphical editor

Example textual editor

Example menus to generate "low-level policies"

Example menus to deploy and enforce "low-level policies"

450

| ObjectSecurity OpenPMF v4.0 Security Policy Automation Platform |
|---|
| File Edit Generate Deploy Help Import |
| ☐ Policies ☐ Registries ☐ Reports ☐ Exports ☐ Contents ☐ Testing ☐ Monitoring |
| ☐ Compliance \| ☐ Natural language (High Level Policy) \| ☐ Natural language (Low Level Policy) |
| Within the rule, I am now processing policy rule element AND IF the information from destination machine IP address is equal to wildcard (fill in values automatically); |
| Completed 'calculate policy attribute refinements' function.... |
| CALCULATE POLICY ATTRIBUTE REFINEMENT FUNCTION (2017/06/27 20:17:23) |
| I am now processing each Policy found in the high-level-policy.... |
| Analyzing policy (there is only one root!) [includes generated low level policy sets]' |
| (copied root policy set) |
| Processing input policy set Decisions are combined 'first Applicable': (0 policy sets, 2 policies) into output root |
| Processing all policies in input set Decisions are combined 'first Applicable': (0 policy sets, 2 policies) into output policy set Decisions are combined 'first Applicable': (0 policy sets, 2 policies): |
| Within the policy set, now processing policy Decisions are combined 'first Applicable': (3 entries): |
| Within the policy, I am now processing policy rule IF ALL of the following is true: IF the information flow source machine IP address is equal to 172.30.0.243 AND IF the information flow destination machine IP |
| Within the rule, I am now processing policy rule element IF the information flow source machine IP address is equal to 172.30.0.243 |
| Within the rule, I am now processing policy rule element IF the information flow source machine IP address is equal to 172.30.0.243 |
| Within the policy, I am now processing policy rule IF ALL of the following is true: IF the information flow source machine IP address is equal to 172.30.0.243 AND IF the information flow destination machine IP |
| Within the rule, I am now processing policy rule element IF the information flow source machine IP address is equal to 172.30.0.243 |
| Within the rule, I am now processing policy rule element IF the information flow source machine IP address is equal to 172.30.0.243 |
| Within the policy, I am now processing policy rule IF ALL of the following is true: IF the information flow source machine IP address is equal to 172.30.0.243 AND IF the information flow destination machine IP |
| Within the rule, I am now processing policy rule element IF the information flow source machine IP address is equal to 172.30.0.243 |
| Within the rule, I am now processing policy rule element IF the information flow source machine IP address is equal to 172.30.0.243 |
| Within the policy set, now processing policy //!// Decisions are combined 'fist Applicable': (1 rules): |
| Within the policy, I am now processing policy rule IF ALL of the following is true: IF the information flow source machine IP address is equal to * (fill in values automatically) AND IF the information flow destina |
| Within the rule, I am now processing policy rule element IF the information flow source machine IP address is equal to * (fill in values automatically); |
| Within the rule, I am now processing policy rule element IF the information flow source machine IP address is equal to * (fill in values automatically); |

Example documentation (excerpt)

FIG. 4C

```
generatetextpolicy.xpt    textpolicy.openpmf  | OpenPMF_Security_Policy_Model.xmi |
v + platform:/resource/com.objectsecurity.openpmf.dev.model/model/OpenPMF_Security_Policy_Model.xmi
  v + Metamodels
    v + Policies [includes generated low level policy sets]
      v + High Level Policies High level policies
        v + Access Polict sets high level access policy sets
          v + Poilicy set Decisions are combined 'firstApplicable': (1 policy sets, 2 policies)
            v + Policy Set [Custom Policy] Decisions are combined 'firstApplicable': (0 policy sets, 1 policies)(edits will be overwr
              v + Policy Decisions are combined 'firstApplicable': (1 rules)
                > + Policy Rule IF ALL of the following is true: IF the requestor's identity is equal to UlrichLang AND IF requestor
              v + Policy Decisions are combined 'firstApplicable': (3 rules)
                > + Policy Rule IF ALL of the following is true: IF the identity of the terrorist the requestor is working on AND the id
                > + Policy Rule IF ALL of the following is true: IF the information flow's source machine IP address is equal to * (fill
                > + Policy Rule IF ALL of the following is true: IF FSD2'info_flow_ip_source_dest'_add_10000_to_port is equal to
              > + Policy [DDS into flows, automatically filled in] Decisions are combined 'firstApplicable': (1 rules)
            > + Custom Policy Set [Custom Policy] Decisions are combined 'firstApplicable': (0 policy sets, 1 policies)
          > + High Level Access Policy Testing first_testing_demo
          > + Imported Access Policy Sets [INPORTED POLICIES][XACML]
          + Low Level Policies
    > + Registry OpenPMFv4_component_registries
    > + Internal Registry
```
~500

Example data model based on metamodel (excerpt)

FIG.5A

```
□ platform:/resource/com.objectsecurity.openpmf.
v □ OpenPMFMetamodels
  > □ GenModel
  > □ Metamodels -> Entity
  v □ policies
    > □ GenModel
    v □ Policies -> Entity
      > □ highLevelPolicies : HighLevelPolicies
      > □ lowLevelPolicies : LowLevelPolicies
    > □ HighLevelPolicies -> Entity
    > □ LowLevelPolicies -> Entity
    > □ HighLevelAccessPolicyTesting -> Entity
    > □ AccessPolicySets -> Entity
    > □ ImportedAccessPolicySets -> Entity
    > □ LowLevelAccessPolicyTesting -> Entity
    > □ StashedHighLevelPolicies -> Entity
    > □ policy
      □ policy_concepts
  > □ component_registry
  > □ internal_registry
  > □ general_concepts
```
~550

Example metamodel (excerpt)

FIG.5B

```
 9
10  Model:
11      { Model }
12
13      / / ('r' | '\n' | '\f' | WS)*
14
15      ('ACCESSPOLICIES'
16      rootset = RootPolicySet
17 //   (customrootset = RootPolicySet)?
18      'END')?
19      ('TESTINGPOLICIES'
20      (testingrootset = RootPolicySet)?
21      'END')?
22
23      ('ATTRIBUTES'
24          attributes+ = Attribute+
25      'END')?
26      ('CALCULATIONS'
27          attributes+ = Calc+
28      'END')?
29      ('DECISIONS'
30          attributes+ = Dec+
```

Example grammar (excerpt)

FIG.6A

```
1     FOREACH this.policyRuleElement AS rulele ITERATOR ruleleiterator >>
2 <<      IF ruleleiterator.counter1 == 1
3    ">>     IF <<
4     ENDIF ->> <<
5     IF ruleleiterator.counter1 >1 ->>
6 <<      IF this.policyRuleElementCombiner.naturalLanguageSnippet == null ->>
7 <<          IF this.policyRuleElementCombiner.naturalLanguageSnippet == "" ->>
8     <<openSymbol () >> << this.policyRuleElementCombiner.naturalLanguageSnippet.toStr
9             ENDIF ->>
10 <<         ENDIF ->>
11 <<         IF this.policyRuleElementCombiner.naturalLanguageSnippet == null ->>
12    <<openSymbol () >> << this.policyRuleElementCombiner.name.toString () ->> << closeSymbol () >>
13 <<         ENDIF ->>
14 <<         IF this.policyRuleElementCombiner.naturalLanguageSnippet == "" ->>
15    <<openSymbol () >> << this.policyRuleElementCombiner.name.toString () ->> << closeSymbol () >>
16         ENDIF ->>
17 <<     ENDIF ->> <<
18     EXPAND rule_element FOR rulele ->>
19 << ENDFOREACH
20 ">>
21
```

Example model-to-text generator (excerpt)

FIG.6B

```
ObjectSecurity OpenPMF v4.0 Policy Editor
elp  Textpolicy
☐ Policies   ☐ Registries   ☐ Reports   ☐ Exports   ☐ Contents   ☐ Testing
☐ High Level Policy Editor    │   ☐ Low Level Policy Editor   │   ☐ Policy Text Editor
 1  //========================================================================
 2  OpenPMF 4.0 Text Policy generated from tree editor model at 2016/12/06 11:07:26
 3  Use CTRL-SPACE for content assist, CTRL-S to save & continue editing
 4  // Click on another tab or perspective to save/merge or discard
 5  // Click anywhere in the editor to begin ...
 6  //========================================================================
 7
 8  ACCESSPOLICIES //========================================================
 9
10  POLICYSET "Decisions are combined 'firstApplicable': (1 policy sets, 2 policies)" [<<first
11
12  POLICY "Decisions are combined 'firstApplicable': (3 rules)" [<<first application>>]
13
14          IF
          ┌──────────────────────────────────────────────────────────────────
          │ ☐ <<the information flow's source machine IP address>>
          │ ☐ <<DISABLED XACML 'guardian id string set of string from XPath location (resource at
          │ ☐ <<DISABLED XACML 'patient number string set of string from XPath location (resource
          │ ☐ <<DISABLED XACML XPath content selector for Date (requestor/resource/context_attr
          │ ☐ <<FSD1'info_flow_ip_source_dest'>>
          │ ☐ <<FSD2'info_flow_ip_source_dest'_add_10000_to_port>>
          │ ☐ <<FSD3'info_flow_ip_source_dest'_merge_ports>>
          │ ☐ <<FSD4'info_flow_ip_source_dest'_reverse_flow>>

☐ Error Log
```

— 650

Example editor content assist (excerpt)

FIG.6C

| ObjectSecurity OpenPMF v4.0 Policy Editor |
| --- | elp  Textpolicy

☐ Policies  ☐ Registries  ☐ Reports  ☐ Exports  ☐ Contents  ☐ Testing

☐ High Level Policy Editor  ☐ Low Level Policy Editor  ☐ Policy Text Editor

```
142
143
144  // ================================================================
145  //              DO NOT MODIFY BELOW THIS LINE
146  // ================================================================
147
148  ATTRIBUTES                                                   ~675
149      "ID..." <<the requestor's identity>>
150      "ID..." <<requestor geolocation>>
151      "ID..." <<resource info geolocation>>
152      "ID..." <<the task the resource pertains to>>
153      "ID..." <<the time window the resource is about>>
154      "ID..." <<the task the requestor is assigned>>
155      "ID..." <<the country the requestor resides in>>
156      "ID..." <<the country the resource resides in>>
157      "ID..." <<the time window the requestor is working on>>
158      "ID..." <<the identity of the terrorist the requestor is working on>>
159      "ID..." <<the identity of the terrorist the resource is about>>
160      "ID..." <<the privacy-relevance of the requestor's work>>
161      "ID..." <<the privacy-relevance of the resource>>
162      "ID..." <<the political power block the requestor resides in>>
163      "ID..." <<the political power block the resource is about>>
164      "ID..." <<the information flos's source machine IP address>>
```

☐ Error Log

Example model elements (excerpt)

FIG.6D

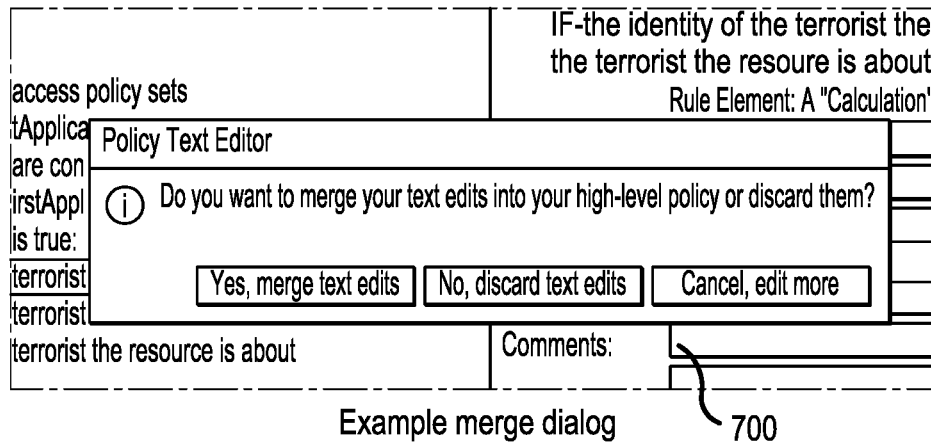

Example merge dialog — 700

FIG.7A

| 233 | POLICY " " [<< first application >>] | <id37> |
| --- | --- | --- |
| 234 | · RULE " " | <id38> |
| 235 | · IF << the identity of the terrorist the requestor is working on >> | <id40> |
| 236 | · AND << the identity of the terrorist the resource is about >> | <id41> |
| 237 | · << are in social security >> | <id39> |
| 238 | ·        " 3 " | <id43> |
| 239 | · THEN << allow >> | <id44> |
| 240 |  |  |
| 241 | · RULE " " | <id45> |
| 242 | · IF << the information flow's source machine IP address >> | <id47> |
| 243 | · << is equal to >> [<< node_source_ip >>] | <id46> |
| 244 | ·        " * " | <id49> |
| 245 | · << and >> << the information flow's destination machine IP address >> | <id51> |
| 246 | · << is equal to >> [<< node_dest_ip >>] | <id50> |
| 247 | ·        " * " | <id53> |
| 248 | · THEN << allow >> | <id54> |

Example merge IDs — 725

FIG.7B

Example of policy subset generation

"Flexible policy testing" - example 1

"Flexible policy testing" - example 2

"Flexible policy testing" - example 3

"Flexible policy testing" - mapper chain example 1

"Flexible policy testing" - example 5

"Flexible policy testing" - intermediary attributes" example

"Flexible policy testing" - example 7

SCRAMS example metamodel

```
⌄ + Scrams Prototype
  > + Scrams Prototype Contents
  ⌄ + Clean Content
    ⌄ + Scrams Prototype Contents
      ⌄ + Supplier Registry
          + Supplier Lockheed Martin
          + Supplier ObjectSecurity LLC
          + Supplier PC USA Vendor 1
          + Supplier PC USA Vendor 2
          + Supplier PC Taiwan Vendor 3
          + Supplier PC parts USA supplier 1
          + Supplier PC parts USA supplier 2
          + Supplier PC parts USA supplier 3
          + Supplier PC parts Taiwan supplier 1
          + Supplier PC parts Taiwan supplier 2 (assumed compromised)
          + Supplier PC parts Taiwan supplier 3
      ⌄ + Item Registry
          + Item ERP SCRAMS solution
          + Item SCRAMS hardware
          + Item PC Desktop 1
          + Item PC Desktop 2
          + Item PC Desktop 3
          + Item PC Server
        > + Item Harddrive 1
        > + Item Harddrive 2
        > + Item Motherboard 1
        > + Item Motherboard 2
        > + Item Memory 1
        > + Item Memory 2
        > + item Display 1
        > + Item Display 2
          + Item SCRAMS software
```

SCRAMS example model

FIG.21B

SCRAMS example supplier

SCRAMS example item properties

```
| scramsmetamodel | mapSupplyChain.q... | scramsmetamodel... | Console | com.objectsocuri... | Menu_Importer_T_ | prototype1.xmi |
1   |// (c) 2016 ObjectSecurity LLC - all rights reserved. Confidential & Proprietary
2   modeltype scramsprototype uses prototype ('http://com/objectsecurity/scrams/prototype');
3   transformation mapSupplyChain (inout mm: scramsprototype);
4   main( ) {
5       var m : ScramsPrototype := mm.objectOfType (ScramsPrototype) -> collectOne (oclAsType (ScramsPrototype));
6       mm.objectsOfType (ScramsPrototype) -> map mapSuppliers (m);
7   };
8
9   mapping inout ScramsPrototype: :mapSuppliers (inout m: ScramsPrototype) {
10      // restore clean model
11      log ("restoring clean model...");
12      mm.removeElement (m.workingModel);
13      m.WorkingModel := m.cleanContent.cleanModel -> deepclone ( )
14      > select (oclIsTypeOf (ScramsPrototypeContents))
15      -> collectOne (oc) AsType (scramsPrototypeContents));
16      log ('                         ');
17      // Autocomplete manufacturer for each item
18      m.workingModel.itemRegistry.item -> forEach (i) [
19          i.manufacturer += i.comprisedItems.manufacturer;
20          log ("item " + i.name + " manufacturer add: ", i.comprisedItems.manufacturer.name);
21      };
22      log ('-------------------------');
23      // autocomplete who supplies what
24      m.workingModel.itemRegistry.item -> forEach (i) {
25          i.supplier -> forEach (s) {
26              s.suppliesItems += i;
27              log ("item " + i.name + " has supplier " + s.name + " add suppliesItems: ", i.name);
28          };
29      };
30      log ('-------------------------');
31      // figure out subsuppliers aggregate
32      m.workingModel.itemRegistry.item -> forEach (i) {
33          i.supplier -> forEach (super) {
34              i.comprisedItems.supplier -> forEach (sub) {
35                  super.subSuppliers += sub;
36                  log ("" + sub.name + " is sub (aggregate) of " + super.name +" (item " + 1.name + ")");
37              };
38          };
39      };
40      log ('-------------------------');
41      // autocomplete who manufactures items for each supplier
42      m.workingModel.supplierRegistery.supplier -> forEach (s) {
43          s.suppliesItemsManufacturedBy += s.suppliesItems.manufacturer;
44          log ("supplier" + s.name + " supplies items manufactured by ", s.suppliesItems.manufactured.name)
45      };
46      log ('-------------------------');
```

SCRAMS example supply chain mapping algorithm

FIG.22C

```
 1  restoring clean model ...
 2  --------------------------------
 3  item ERP SCRAMS solution manufacturer add: , data: [ObjectSecurity LLC]
 4  item SCRAMS hardware manufacr=turer add: , data: [ ]
 5  item PC Desktop 1 manufacturer add: , data: [PC parts Taiwan supplier 3, PC parts Taiwan supplier 1, PC parts Taiwan supplier 2
    (assumed compromised) ]
 6  item PC Desktop 2 manufacturer add: , data: [PC parts Taiwan supplier 3, PC parts Taiwan supplier 3, PC parts Taiwan supplier 2
    (assumed compromised), PC parts Taiwan supplier 2 (assumed compromised) ]
 7  item PC Desktop 3 manufacturer add: , data: [PC parts Taiwan supplier 1, PC parts Taiwan supplier 1, PC parts Taiwan supplier 3]
 8  item PC Server manufacturer add: , data: [PC parts Taiwan supplier 1, PC parts Taiwan supplier 1, PC parts Taiwan supplier 1]
 9  item Harddrive 1 manufacturer add: , data: [ ]
10  item Harddrive 2 manufacturer add: , data: [ ]
11  item Motherboard 1 manufacturer add: , data: [ ]
12  item Motherboard 2 manufacturer add: , data: [ ]
13  item Memory 1 manufacturer add: , data: [ ]
14  item Memory 2 manufacturer add: , data: [ ]
15  item Display 1 manufacturer add: , data: [ ]
16  item Display 2 manufacturer add: , data: [ ]
17  item SCRAMS software manufacturer add: , data: [ ]
18  --------------------------------
19  item ERP SCRAMS solution has supplier Lockheed Martin add suppliesItems: , data: ERP SCRAMS solution
20  item SCRAMS hardware has supplier ObjectSecurity LLC add suppliesItems: , data: SCRAMS hardware
21  item PC Desktop 1 has supplier PC USA Vendor 1 add suppliesItems: , data: PC Desktop 1
22  item PC Desktop 2 has supplier PC USA Vendor 2 add suppliesItems: , data: PC Desktop 2
23  item PC Desktop 3 has supplier PC Taiwan Vendor 3 add suppliesItems: , data: PC Desktop 3
24  item PC Server has supplier PC Taiwan Vendor 3 add suppliesItems: , data: PC Server
25  item Harddrive 1 has supplier PC parts Taiwan supplier 1 add suppliesItems: , data: Harddrive 1
26  item Harddrive 1 has supplier PC parts USA supplier 1 add suppliesItems: , data: Harddrive 1
27  item Harddrive 2 has supplier PC parts Taiwan supplier 2 (assumed compromised) add suppliesItems: , data: Harddrive 2
28  item Harddrive 2 has supplier PC parts USA supplier 2 add suppliesItems: , data: Harddrive 2
29  item Motherboard 1 has supplier PC parts Taiwan supplier 1 add suppliesItems: , data: Motherboard 1
30  item Motherboard 1 has supplier PC parts Taiwan supplier 2 (assumed compromised) add suppliesItems: , data: Motherboard 1
31  item Motherboard 1 has supplier PC parts USA supplier 1 add suppliesItems: , data: Motherboard 1
32  item Motherboard 2 has supplier PC parts Taiwan supplier 1 add suppliesItems: , data: Motherboard 2
33  item Motherboard 2 has supplier PC parts Taiwan supplier 2 (assumed compromised) add suppliesItems: , data: Motherboard 2
34  item Motherboard 2 has supplier PC parts USA supplier 2 add suppliesItems: , data: Motherboard 2
35  item Memory 1 has supplier PC parts Taiwan supplier 1 add suppliesItems: , data: Memory 1
36  item Memory 1 has supplier PC parts Taiwan supplier 2 (assumed compromised) add suppliesItems: , data: Memory 1
37  item Memory 1 has supplier PC parts Taiwan supplier 3 add suppliesItems: , data: Memory 1
38  item Memory 1 has supplier PC parts USA supplier 3 add suppliesItems: , data: Memory 1
39  item Memory 2 has supplier PC parts Taiwan supplier 1 add suppliesItems: , data: Memory 2
40  item Memory 2 has supplier PC parts Taiwan supplier 2 (assumed compromised) add suppliesItems: , data: Memory 2
41  item Memory 2 has supplier PC parts Taiwan supplier 3 add suppliesItems: , data: Memory 2
42  item Memory 2 has supplier PC parts USA supplier 2 add suppliesItems: , data: Memory 2
43  item Display 1 has supplier PC parts Taiwan supplier 3 add suppliesItems: , data: Display 1
44  item Display 2 has supplier PC parts Taiwan supplier 3 add suppliesItems: , data: Display 2
45  item SCRAMS software has supplier Objectsecurity LLC and suppliesItems: , data: SCRAMS software
```

FIG.23-1

```
46  ----------------------------
47  ObjectSecurity LLC is sub (aggregate) of Lockheed Martin (item ERP SCRAMS solution)
48  ObjectSecurity LLC is sub (aggregate) of Lockheed Martin (item ERP SCRAMS solution)
49  PC USA Vendor 1 is sub (aggregate) of ObjectSecurity LLC (item SCRAMS solution)
50  PC USA Vendor 2 is sub (aggregate) of ObjectSecurity LLC (item SCRAMS solution)
51  PC Taiwan Vendor 3 is sub (aggregate) of ObjectSecurity LLC (item SCRAMS solution)
52  PC Taiwan Vendor 3 is sub (aggregate) of ObjectSecurity LLC (item SCRAMS solution)
53  PC parts Taiwan supplier 3 is sub (aggregate) of PC USA Vendor 1 (item PC Desktop 1)
54  PC parts Taiwan supplier 1 is sub (aggregate) of PC USA Vendor 1 (item PC Desktop 1)
55  PC parts Taiwan supplier 2 (assumed compromised) is sub (aggregate) of PC USA Vendor 1 (item PC Desktop 1)
56  PC parts Taiwan supplier 3 is sub (aggregate) of PC USA Vendor 1 (item PC Desktop 1)
57  PC parts USA supplier 3 is sub (aggregate) of PC USA Vendor 1 (item PC Desktop 1)
58  PC parts Taiwan supplier 1 is sub (aggregate) of PC USA Vendor 1 (item PC Desktop 1)
59  PC parts Taiwan supplier 2 (assumed compromised) is sub (aggregate) of PC USA Vendor 1 (item PC Desktop 1)
60  PC parts USA supplier 2 is sub (aggregate) of PC USA Vendor 1 (item PC Desktop 1)
61  PC parts Taiwan supplier 3 is sub (aggregate) of PC USA Vendor 2 (item PC Desktop 2)
62  PC parts Taiwan supplier 1 is sub (aggregate) of PC USA Vendor 2 (item PC Desktop 2)
63  PC parts Taiwan supplier 2 (assumed compromised) is sub (aggregate) of PC USA Vendor 2 (item PC Desktop 2)
64  PC parts Taiwan supplier 3 is sub (aggregate) of PC USA Vendor 2 (item PC Desktop 2)
65  PC parts USA supplier 2 is sub (aggregate) of PC USA Vendor 2 (item PC Desktop 2)
66  PC parts Taiwan supplier 1 is sub (aggregate) of PC USA Vendor 2 (item PC Desktop 2)
67  PC parts Taiwan supplier 2 (assumed compromised) is sub (aggregate) of PC USA Vendor 2 (item PC Desktop 2)
68  PC parts USA supplier 2 is sub (aggregate) of PC USA Vendor 2 (item PC Desktop 2)
69  PC parts Taiwan supplier 2 (assumed compromised) is sub (aggregate) of PC USA Vendor 2 (item PC Desktop 2)
70  PC parts USA supplier 2 is sub (aggregate) of PC USA Vendor 2 (item PC Desktop 2)
71  PC parts Taiwan supplier 1 is sub (aggregate) of PC Taiwan Vendor 3 (item PC Desktop 3)
72  PC parts Taiwan supplier 2 (assumed compromised) is sub (aggregate) of PC Taiwan Vendor 3 (item PC Desktop 3)
73  PC parts Taiwan supplier 3 is sub (aggregate) of PC Taiwan Vendor 3 (item PC Desktop 3)
74  PC parts USA supplier 3 is sub (aggregate) of PC Taiwan Vendor 3 (item PC Desktop 3)
75  PC parts Taiwan supplier 1 is sub (aggregate) of PC Taiwan Vendor 3 (item PC Desktop 3)
76  PC parts Taiwan supplier 2 (assumed compromised) is sub (aggregate) of PC Taiwan Vendor 3 (item PC Desktop 3)
77  PC parts USA supplier 1 is sub (aggregate) of PC Taiwan Vendor 3 (item PC Desktop 3)
78  PC parts Taiwan supplier 3 is sub (aggregate) of PC Taiwan Vendor 3 (item PC Desktop 3)
79  PC parts Taiwan supplier 1 is sub (aggregate) of PC Taiwan Vendor 3 (item PC Server)
80  PC parts USA supplier 1 is sub (aggregate) of PC Taiwan Vendor 3 (item PC Server)
81  PC parts Taiwan supplier 1 is sub (aggregate) of PC Taiwan Vendor 3 (item PC Server)
82  PC parts Taiwan supplier 2 (assumed compromised) is sub (aggregate) of PC Taiwan Vendor 3 (item PC Server)
83  PC parts USA supplier 1 is sub (aggregate) of PC Taiwan Vendor 3 (item PC Server)
84  PC parts Taiwan supplier 1 is sub (aggregate) of PC Taiwan Vendor 3 (item PC Server)
85  PC parts Taiwan supplier 2 (assumed compromised) is sub (aggregate) of PC Taiwan Vendor 3 (item PC Server)
86  PC parts Taiwan supplier 3 is sub (aggregate) of PC Taiwan Vendor 3 (item PC Server)
87  PC parts USA supplier 3 is sub (aggregate) of PC Taiwan Vendor 3 (item PC Server)
88  ----------------------------
89  supplierLockheed Martin supplies items manufactured by , data: [ObjectSecurity LLC]
90  supplierObjectSecurity LLC supplies items manufactured by , data: [ObjectSecurity LLC]
```

FIG.23-2

91 supplierPC USA Vendor 1 supplies items manufactured by , data: PC parts Taiwan supplier 3, PC parts Taiwan supplier 1, PC parts Taiwan supplier 2 (assumed compromised) ]
92 aupplier PC USA Vendor 2 supplies items manufactured by , data: [PC parts Taiwan supplier 3, PC parts Taiwan supplier 2 (assumed compromised) ]
93 supplierPC Taiwan Vendor 3 supplies items manufactured by , data: [PC parts Taiwan supplier 1, PC parts Taiwan supplier 3, PC parts Taiwan supplier 1]
94 supplierPC parts USA supplier 1 supplies items manufactured by , data: [PC parts Taiwan supplier 1, PC parts Taiwan supplier 1]
95 supplierPC parts USA supplier 2 supplies items manufactured by , data: [PC parts Taiwan supplier 2 (assumed compromised), PC parts Taiwan supplier 2 (assumed compromised), PC parts Taiwan supplier 3]
96 supplierPC parts USA supplier 3 supplies items manufactured by , data: [PC parts Taiwan supplier 1]
97 supplierPC parts Taiwan supplier 1 supplies items manufactured by , data: [PC parts Taiwan supplier 1, PC parts Taiwan supplier 1, PC parts Taiwan supplier 2 (assumed compromised), PC parts Taiwan supplier 1, PC parts Taiwan supplier 3]
98 supplierPC parts Taiwan supplier 2 (assumed compromised) supplies items manufactured by , data: [PC parts Taiwan supplier 2 (assumed compromised), PC parts Taiwan supplier 1, PC parts Taiwan supplier 2 (assumed compromised), PC parts Taiwan supplier 1, PC parts Taiwan supplier 3]
99 supplierPC parts Taiwan supplier 3 supplies items manufactured by , data: [PC parts Taiwan supplier 1, PC parts Taiwan supplier 3, PC parts Taiwan supplier 3, PC parts Taiwan supplier 3]
100 --------------------------------

SCRAMS supply chain mapping example console output

FIG.23-3

SCRAMS supply chain mapping example visualization

| Properties ⊗ | |
|---|---|
| Property | Value |
| Backorder Delay | ▫ |
| Comprised Item | ▫ |
| Countries Where | ▫ |
| Manufacturer | ▫ Supplier PC parts Taiwan supplier 2 (assumed compromised) |
| Name | ▫ Harddrive 2 |
| Price | ▫ 300 |
| Supplier | ▫ Supplier PC parts Taiwan supplier 2 (assumed compromised), Sup |

Properties of "Harddrive 2"

FIG.24B

| Properties ⊗ | |
|---|---|
| Property | Value |
| Backorder Delay | ▫ |
| Comprised Item | ▫ Item Disply 2, Item Memory 2, Item Motherboard 2, Item Harddrive 2 |
| Countries Where | ▫ USA |
| Manufacturer | ▫ |
| Name | ▫ PC Desktop 2 |
| Price | ▫ 2000 |
| Supplier | ▫ Supplier PC USA Vendor 2 |

Properties of "PC Desktop 2"

FIG.24C

```
51  mapping inout ScramsPrototype: :calculatePriceHistory (inout m: ScramsPrototype) {
52    // create pricing "normal" for each item
53    var components_price : Integer := 0;
54    m.workingModel.itemRegistry.item -> forEach (i) {
55      components_price := 0;
56
57      components_price := components_price + recursiveComponentPricing (i, m, 0);
58      log ("Add price history to " + i.name + " price: " + i.price.toString() + " - normal components price: " + compo
59      i.priceHistory.priceHistoryItem += object PriceHistoryItem {
60        price := i.price;
61        componentsPrice := components_price.toString ();
62        name := "Price: $" + price + ", Components: $" + componentsPrice;
63      };
64    };
65  };
```

Example purchase history calculation algorithm

FIG.25A

```
∨ + Item ERP SCRAMS solution
   ∨ + Price History
        + Price History Item Price: $200000, Components: $186100
        + Price History Item Price: $200000, Components: $186100
        + Price History Item Price: $200000, Components: $186100
        + Price History Item Price: $200000, Components: $186100
        + Price History Item Price: $200000, Components: $186100
∨ + Item SCRAMS hardware
   ∨ + Price History
        + Price History Item Price: $20000, Components: $6100
        + Price History Item Price: $20000, Components: $6100
        + Price History Item Price: $20000, Components: $6100
        + Price History Item Price: $20000, Components: $6100
        + Price History Item Price: $20000, Components: $6100
> + Item PC Desktop 1
∨ + Item PC Desktop 2
   ∨ + Price History
        + Price History Item Price: $2000, Components: $1800
        + Price History Item Price: $2000, Components: $1800
        + Price History Item Price: $2000, Components: $1800
        + Price History Item Price: $2000, Components: $1800
        + Price History Item Price: $2000, Components: $1800
```

Example purchase history calculation results in the model

FIG.25B

```
91   mapping inout scramsPrototype: :detectAnomaly (inout m: scramsPrototype) {
92       var anomaliesDetected := false;
93       m.workingModel.itemRegistry.item -> forEach (i) {
94           var avg_price : Integer := 0;
95           var avg_cmp_price : Integer := 0;
96           i.priceHistory.priceHistoryItem -> forEach (phi) {
97               avg_price := avg_price + phi.price.toInteger() ;
98               avg_cmp_price := avg_cmp_price + phi.componentsPrice.toInteger() ;
99           };
100          avg_price := avg_price.div (i.priceHistory.priceHistoryItem -> size(() ;
101          avg_cmp_price := avg_cmp_price.div(i.priceHistory.priceHistoryItem -> size()) ;
102          log ("Item " + i.name + " average price " + avg_price.toString() + " (components): " + avg_cmp
103          // any major deviations from the average?
104          var alerted := false ;
105          i.priceHistory.priceHistoryItem -> forEach (phi) {
106              if (avg_price != phi.price.toInteger()) {
107                  if (alerted = false) {
108                      log ("ALARM - anomaly in item pricing for "+i.name +" detected!") ;
109                      alerted; = true ;
110                  };
111                  anomaliesDetected: = true ;
112              };
113              if (avg_cmp_price != phi.componentsPrice.toInteger()) {
114                  if (alerted = false) {
115                      log ("ALARM - anomaly in item components pricing for "+i.name +" detected!");
116                      alerted: = true ;
117                  };
118                  anomaliesDetected; = true ;
119              };
120          };
121      };
122      if (anomaliesDetected = false) {
123          log ("No pricing anomalies detected.") ;
124      };
125  };
```

Example purchase history pricing anomaly calculation algorithm

FIG.26A

```
Item ERP SCRAMS solution average price 200000 (components: 186100)
Item SCRAMS hardware average price 20000 (components: 6100)
Item PC Desktop 1 average price 2000 (components: 1500)
Item PC Desktop 2 average price 2000 (components: 1800)
Item PC Desktop 3 average price 2000 (components: 1500)
Item PC Server average price 10000 (components: 1300)
Item Harddrive 1 average price 300 (components: 300)
Item Harddrive 2 average price 300 (components: 300)
Item Motherboard 1 average price 500 (components: 500)
Item Motherboard 2 average price 500 (components: 500)
Item Memory 1 average price 500 (components: 500)
Item Memory 2 average price 500 (components: 500)
Item Display 1 average price 500 (components: 500)
Item Display 2 average price 500 (components: 500)
Item SCRAMS software average price 180000 (components: 180000)
No pricing anomalies detected.
```

Example console output

FIG.26B

```
˅ + Item Harddrive 2
   > + Countries
   ˅ + Price History
       + Price History Item Price: $300, Components: $300
       + Price History Item Price: $300, Components: $300
       + Price History Item Price: $300, Components: $300
       + Price History Item Price: $300, Components: $300
       + Price History Item Price: $300, Components: $300
       + Price History Item Price: $50, Components: $50
```

Example pricing anomaly

FIG.27A

```
Item ERP SCRAMS solution average price 200000 (components: 186058)
ALARM - anomaly in item components pricing for ERP SCRAMS solution detected!
Item SCRAMS hardware average price 20000 (components: 6058)
ALARM - anomaly in item components pricing for SCRAMS hardware detected!
Item PC Desktop 1 average price 2000 (components: 1500)
Item PC Desktop 2 average price 2000 (components: 1758)
ALARM - anomaly in item components pricing for PC Desktop 2 detected!
Item PC Desktop 3 average price 2000 (components: 1500)
Item PC Server average price 10000 (components: 1300)
Item Harddrive 1 average price 300 (components: 300)
Item Harddrive 2 average price 258 (components: 258)
ALARM - anomaly in item pricing for Harddrive 2 detected!
Item Motherboard 1 average price 500 (components: 500)
Item Motherboard 2 average price 500 (components: 500)
Item Memory 1 average price 500 (components: 500)
Item Memory 2 average price 500 (components: 500)
Item Display 1 average price 500 (components: 500)
Item Display 2 average price 500 (components: 500)
Item SCRAMS software average price 180000 (components: 180000)
```

Example pricing anomaly detection output

FIG.27B

Example SCRAMS Architecture

Example Orthogonal and Merged Policies

Example Computer Implementation

METHOD AND SYSTEM FOR POLICY MANAGEMENT, TESTING, SIMULATION, DECENTRALIZATION AND ANALYSIS

This application claims priority to U.S. Provisional Application Nos. 62/360,309 entitled "Method and System using Model-Driven Security for Policy Testing and Simulation", 62/408,829 entitled "Security for additive manufacturing and for supply chain risk management", 62/430,590 entitled "Automatic natural language policy generation from models and model merging of edits", which were filed on Jul. 8, 2016, Oct. 16, 2016, and Dec. 6, 2016, respectively, and which are all incorporated herein by reference.

BACKGROUND OF THE INVENTION

1. Field of the Invention

Embodiments of the invention relate to security policies within a computing system, and more particularly to a method and system of managing policies, trust and risk within an information technology (IT) system. The present invention can provide assisted policy management, contextual editor generation and round-tripping, flexible policy testing, policy simulation and continuous testing, decentralized and orthogonal management of policy and trust, and supply chain risk analysis and management.

2. Description of the Related Art 2.1. Model-Driven Security

U.S. Pat. No. 9,043,861 to Lang et al. ("Method and system for managing security policies", which is incorporated by reference herein for its entirety, thereafter called "MDS" or "MDS patent", or "MDS1") and U.S. Pat. Nos. 9,420,006 and 9,692,792, which are also incorporated by reference herein for its entirety, teach methods and systems that can manage meaningful policies, in a way that is manageable, and that supports IT agility, and that is repeatable/traceable/verifiable. The patent explains how a "model-driven security" (MDS) approach can be used to better manage security policies, i.e. to meet (some of) the above-mentioned requirements. Additionally, U.S. Pat. No. 9,563,771 to Lang et al. ("Automated and adaptive model-driven security system and method for operating the same"), which is incorporated by reference herein for its entirety, teaches systems and methods for managing implementation of policies in an information technologies (IT) system. Among many other concepts, U.S. Pat. No. 9,563,771 introduces "attribute refinement" and "mapper chains", terms used throughout this document.

Furthermore, as explained in U.S. Pat. No. 8,856,863 to Lang et al. ("Method and system for rapid accreditation/re-accreditation of agile it environments, for example service oriented architecture (soa)", which is incorporated by reference herein for its entirety, thereafter called "MDSA patent") and US Patent Application 20140366085 A1), which is also incorporated by reference herein for its entirety, conventional compliance/accreditation methods are also inadequate for today's IT landscapes, because they require too much manual effort, and also usually require a static IT landscape to be verified.

Moreover, U.S. Pat. No. 9,563,771 B2 entitled "Automated and adaptive model-driven security system and method for operating the same" (called "B-MDS" throughout this specification) explains how to automatically calculate so-called "mapper chains" to translate "high-level policy" rules to machine-enforceable "low-level policy" rules. "Mapper services" are calculation functions that map an input to a corresponding output (e.g. map geolocation to country code).

These patents introduce the concepts behind model-driven security (MDS), model-driven security accreditation (MDSA), attribute-based access control (ABAC). Some aspects of the present invention relate to MDS, MDSA, and ABAC.

SUMMARY OF THE INVENTION

An embodiment of the present invention is directed to a method of managing policies in an at least one information technologies (IT) system including at least one policy implementation entity that operates in a user context or organizational context, comprising of: determining at least one functional model for the IT system which indicates functional system attributes (e.g. of the user context or organizational context of the IT system); loading, by a processor, from a data storage or a memory, at least one pre-configured policy selection template that indicates at least one policy aspect applicable to the at least one IT system, selecting the at least one policy selection template is based on the at least one functional system attributes; automatically or semi-automatically generating, by the processor, at least one policy user interface that gathers a policy input, by selecting policy aspects applicable to the at least one IT system from the at least one policy template, and/or by selecting functional aspects applicable to the at least one IT system from the at least one functional model; receiving, by a processor, a policy input loaded from a data storage or a memory, or entered by a user via a user interface, indicating at least one input policy for the at least one IT system; loading at least one pre-configured policy generation template from a memory to the processor that indicates at least one technical rule or configuration aspect of the policy that the policy template pertains to; automatically or semi-automatically generating, by the processor, at least one machine-enforceable rule and/or configuration that is in a ready to implement format in a manner compliant with the received input policy; transmitting the at least one machine-enforceable rule and/or configuration to at least one policy implementation entity of the IT system; and executing the transmitted at least one machine-enforceable rule and/or configuration by the at least one policy implementation entity for implementing the policy input through the IT system, thereby modifying an operation of the processor of the IT system or the policy implementation entity to determine the result of the at least one condition, and executing the at least one action.

Another embodiment of the present invention is directed to a policy management system, comprising of at least one policy management device that is configured to manage a policy input and/or a policy selection template and/or a policy generation template and/or a functional model, the policy management device including a processor, memory having a computer executable program and the policy input and/or the template stored and/or the functional model therein, and a user interface; furthermore comprising of at least one policy enforced device that is directly or indirectly connected to the policy management device via a network and that is configured such that at least a part of the functional model managed by the policy management device reflects the functional features/behaviors of the (at least one) policy enforced device; furthermore, comprising of at least one policy enforcement device that is configured to execute policy enforcement on the policy enforced device, the policy enforcement device being a part of or connected to the at least one policy enforced device and/or at least one policy decision device; and the at least one policy decision device that is configured to receive at least one machine-enforceable rule and/or configuration from the at least one policy management device, wherein the at least one policy management device determines at least one functional model for the at least one policy enforced device relevant for selecting the policy selection template and/or the policy generation template based on which functional system attributes are indicated by the policy selection template and/or the policy generation template, the at least one functional model indicating functional system attributes used to select the policy selection template and/or to iteratively fill attribute placeholders; furthermore, the at least one policy management device receives a policy selection template loaded from the memory, or entered by a user via a user interface, indicating at least one policy aspect applicable to the at least one IT system, selecting the at least one policy selection template is based on the at least one functional system attributes; furthermore, the at least one policy management device automatically or semi-automatically generates at least one policy user interface that gathers a policy input, by selecting policy aspects applicable to the at least one IT system from the at least one policy template, and/or by selecting functional aspects applicable to the at least one IT system from the at least one functional model; furthermore, the at least one policy management device receives a policy input loaded from a data storage or a memory, or entered by a user via a user interface, indicating at least one input policy for the at least one IT system; furthermore, the at least one policy management device receives a policy input loaded from a data storage or a memory, or entered by a user via a user interface, indicating at least one input policy for the at least one IT system; furthermore, the at least one policy management device loads at least one pre-configured policy generation template from a memory to the processor that indicates at least one technical rule or configuration aspect of the policy that the policy template pertains to; furthermore, the at least one policy management device automatically or semi-automatically generates, by the processor, at least one machine-enforceable rule and/or configuration that is in a ready to implement format in a manner compliant with the received input policy; furthermore, the at least one policy management device transmits the at least one machine-enforceable rule and/or configuration to the at least one policy decision device that determines the result(s) of the at least one pre-configured rule and/or configuration template for the policy enforced device; and the at least one policy enforcement device, when a policy relevant event occurs, instructs the at least one policy decision device to determine the result of the at least one condition of the transmitted at least one machine-enforceable rule and/or configuration for implementing the policy input for the at least one policy enforced device, thereby modifying an operation of the at least one policy enforced device or the at least one policy enforcement device to execute the at least one action. Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 2A and 2B illustrate and example import wizard (FIG. 2A) and an example policy wizard (FIG. 2B) according to an embodiment;

FIGS. 4A-4C illustrate example menus to generate "low level policies" (FIG. 4A), to deploy and enforce "low-level policies" (FIG. 4B) and example generated documentation (FIG. 4C) according to an embodiment;

FIGS. 5A and 5B illustrate an example data model (excerpt) (FIG. 5A) and an example metamodel (excerpt) (FIG. 5B) according to an embodiment;

FIGS. 6A-6D illustrate natural language editor related examples: an example grammar (excerpt) (FIG. 6A), example model-to-text-generator (excerpt) (FIG. 6B), example editor content assist (excerpt), and example model elements (excerpt) (FIG. 6D) according to an embodiment;

FIGS. 7A and 7B illustrate natural language editor related examples of a merge dialog (FIG. 7A) and of example merge IDs used to merge policies (FIG. 7B) according to an embodiment;

FIGS. 21A and 21B illustrate an example metamodel (FIG. 21A) and example model (FIG. 21B) in the context of supply chain risk analysis and management, according to an embodiment;

FIGS. 22A-22C illustrate an example supplier (FIG. 22A), an example item (FIG. 22B), and an example supply chain mapping algorithm (FIG. 22C), according to an embodiment related to FIG. 21;

FIGS. 23-1-23-3 illustrate the console output of the supply chain mapping algorithm shown in FIG. 22C, according to an embodiment;

FIGS. 24A-24C illustrate a visualization (FIG. 24A), and properties of example items, FIG. 24B and FIG. 24C) of a supply chain mapping example, according to an embodiment;

FIGS. 25A and 25B illustrate an example purchase history calculation algorithm (FIG. 25A) and an exemplary price history in a model (FIG. 25B) (based on the metamodel in FIG. 21A), according to an embodiment;

FIGS. 26A and 26B illustrate an example purchase history pricing anomaly calculation algorithm (FIG. 26A) and the output of the algorithm (FIG. 26B) according to an embodiment;

FIGS. 27A and 27B illustrate an exemplary price history anomaly in a model (FIG. 27A) (based on the metamodel in FIG. 21A), and the output of the pricing anomaly calculation algorithm (shown in FIG. 26A), according to an embodiment.

DETAILED DESCRIPTION

Figure 1:
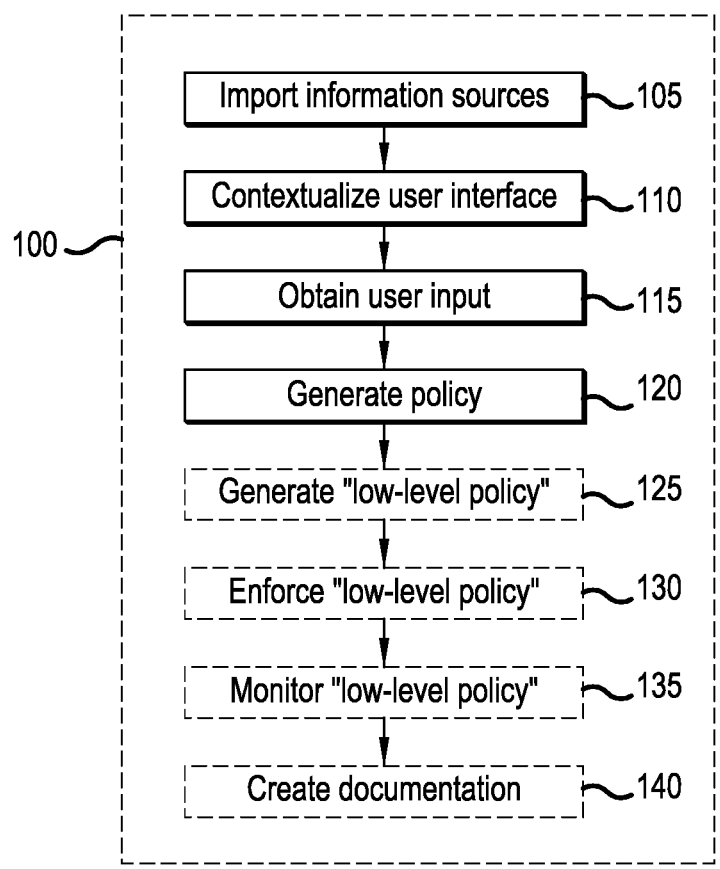
FIG. 1 illustrates example steps involved in assisted policy management according to an embodiment.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A method and system is illustrated for assisted policy management, contextual editor generation and round-tripping, flexible policy testing, policy simulation and continuous testing, decentralized and orthogonal management of policy and trust, and supply chain risk analysis and management.

Introduction: Policy Management Challenges

Conventional management of security policies for computing systems is often hard for many reasons: Policies need to be authored, managed, updated, tested, analyzed, documented, enforced, monitored etc. The challenges include:

Firstly, policies are often too numerous, complex, overlapping and non-intuitive—especially technically enforceable policies. Features of such advanced policies are that they involve policy rules that are numerous, complex, feature-rich (e.g. privacy), fine-grained, contextual/dynamic etc. in particular, security policies need to capture increasingly more complex security requirements that are meaningful to business, and are often driven by compliance/accreditation requirements. Also, security policies need to increasingly move from black-listing to white-listing to increase protection.). "Blacklisting" and other approaches that focus on detecting and blocking/mitigating unwelcomed contents and access cannot implement the required security policies. On the other hand, "whitelisting" and other approaches that focus on only allowing appropriate contents and access are often unmanageable using today's manual policy implementation approaches.

Secondly, policies need to be enforced consistently in many places (for example across many interconnected computing devices), which adds further complexity. IT environments are increasingly complex, with today's agile (i.e. dynamically changing), complex, interconnected Systems of Systems (SoS). Examples include Internet of Things (IoT), Machine-to-Machine (M2M), Service Oriented Architectures (SOA), Cloud computing. The world needs better policy management.

Particular challenges (tackled by the present invention) include:

1) Policy Authoring is Difficult:

Many approaches have been utilized in the attempt to make policy authoring easier, including for example: using a textual specification language similar to a programming language to allow users to consistently specify policies for potentially many systems; using a text editor with content assist and validation to make "programming" policies easier; using a graphical editor that includes for example drop-down menus, expand/collapse tree editors etc. using graphical editors that draw flowcharts, graphs etc. Despite those conventional attempts, authoring policies still remains difficult. A promising approach is to let users author policies in (constrained) natural language text, and automatically translating the natural language into technically enforceable policies (as for example explained for a specific use case and approach in U.S. Pat. No. 8,532,978 to Turner, "Natural language interface, compiler and de-compiler for security policies"). Assisted policy management is needed to make policy authoring easier.

2) Hard-Coded Editors/Wizards are Inflexible:

Conventional policy editors/wizards are usually hard-coded for a specific purpose, for example to enter policies in a particular format or language. In other words, editors are not "intelligent" and "adaptive/contextual/dynamic" in that they would automatically present only the features needed (or ask only the questions needed) within the specific context of the user and their environment. As a result, editors are often complex to use and inflexible. Policy editors/wizards should automatically adapt based contextually on the user and their environment so that policy authoring becomes easier.

3) Natural Language Text Editors with all Details Too Confusing:

While natural language is an intuitive way for humans to communicate policies, it has its limits when used for authoring complex policies. This is because complex policies often include many features that do not fit into a normal sentence, and when included, make the natural language hard to author and understand (which is the case for conventional approaches). An approach is needed that allows policy authoring of policies in simple terms (intuitive sentences), while allowing to add policy details to the authored policies by other means (such as a graphical tree editor or wizard). Such an approach needs to support "round-tripping" between for example the natural language editor and the editor for the details in a way that allows going back and forth without losing or wrongly translating information.

4) Policy Testing Approaches are Inflexible:

Policy testing allows the formal verification that the access policy meets certain properties. For example, for access policies, it may be useful to formally verify that—for a particular implemented access policy—a particular system cannot access a particular other system. Conventional approaches were for example implemented in NIST's ACPT (see csrc.nist.gov/groups/SNS/acpt) and by ObjectSecurity (based on an extension of NIST's work). Such testing approaches often use a symbolic model checker to run through a combinatorial array through a finite state machine to prove/disprove properties. One shortcoming of that approach is that the testing properties need to be stated in the same terms (i.e. using the same building blocks) as the policy, i.e. using the same attributes. For example, if a policy is stated in terms of IP addresses, then the testing properties also need to be stated in IP addresses. There is a need for more flexible policy testing approaches where testing properties can be expressed using different terms ("attributes") than the ones used to express policies.

5) Combinatorial Array Testing for Policies can be Inefficient and Unrealistic:

Combinatorial array testing (CAT) is conventionally used for exhaustively testing policies, e.g. by NIST's ACPT. For example, ACPT generates a CAT test suite and tests each test case on a policy implementation. While useful to test policies if the running "functional system" (e.g. interconnected IT landscape) is unknown, this approach will in many cases test too many combinations of policy values (e.g. attribute values), and will not always realistically reflect the behavior of the functional system. For example, CAT tests may include many test cases which cannot occur in the functional system in question, e.g. due to the network setup. Additionally there is often no realistic sequencing of decisions (unless it's just a linear sequence that can be represented as a sequence of attribute values). A useful extension to policy testing would be to detect and import a "functional system model" and policy implementation behavior that can be used to "simulate" (i.e. replay) the system aspects relevant for testing, and thus replace the combinatorial array used for testing, potentially: significantly reducing the number of tests to be carried out; running the test suite closer to the actual observed behaviors of the functional system environment; and simulating and analyzing the impact of a policy implementation on the functional system environment, without the need to actually enforce the policies. This could be done either in a "training mode" or for continuous (near real-time) testing of properties across the running system.

6) Trust and Control is Often Too Centralized:

Oftentimes, conventional policy management is done centrally for everyone by an organization's security staff on a central system (or several central systems). Even if users can impact their policies (e.g. indicate consent), they ultimately rely on the central system and the organization's staff to keep evidence and enforce policies. A conventional approach to extend trust across several stakeholders is federation (identity and/or authorization) where cryptography and legal contracts ensure trust and accountability between the stakeholders. Even large systems like telecom systems operate this way. Unfortunately federation is not viable for use cases where there is no central control or trusted entity (e.g. an operator of a system). Conventional approaches have been devised to not rely on central control, but instead rely on a decentralized system with no one owner/operator where trust is purely ensured by the system (and its cryptography itself). The most prominent approach is the "blockchain" used by cryptocurrencies such as bitcoin. Policy management, enforcement, evidence collection, distribution, monitoring, and analysis needs to support such decentralization for some use cases—for example additive manufacturing ("3D printing"), where numerous stakeholders work together with no central control (this document presents an embodiment for additive manufacturing).

In addition, enforceable policies have to express aspects from different sources, for example security requirements at different hierarchical levels or for different departments, or data protection policies. These requirements are defined by different administrators, but have to be transformed in one, single, enforceable and conflict free policy for an organization as a whole and have to be enforced at all relevant points.

7) Supply Chain Risk Analysis and Management:

Supply chains introduce potential risks into procured products, e.g. IT products, which are usually assembled from many parts provided by many suppliers. Such risks can be lack of quality/Q&A (e.g. counterfeit parts), hidden malware (e.g. kill-switch or backdoors in hardware). Supply chain risk analysis and management (SCRAM) is therefore an important activity. Conventional SCRAM focuses primarily on detecting risks leading to production inefficiencies and financial loss. There is a need for a SCRAM approach that also analyzes risks relevant to government (incl. military), which include risks the malicious introduction of counterfeit parts, maliciously tampered parts, parts with backdoors/kill-switches etc. (this document presents an embodiment for a SCRAM system that covers supply chain risks).

1. Assisted Policy Management (Using Wizards, Expert Systems Etc.)

As described in the background section, users often find managing policies difficult, especially technically enforceable security policies. An embodiment of the present invention (depicted in FIG. 1) is a system (100) and method that simplifies the management of policies. It achieves this by carrying out the following steps (105-140). While the order of the steps presented is according to an embodiment of the invention, the order could differ in other embodiments. Also, not all steps have to be present in every embodiment, for example 125-140 could be optional.

1.1. Import Information Sources

In this step (105), an embodiment of the invention gathers information about the environment for which policies should be managed. As depicted in FIG. 2A, the importing step can include a user interface (200) that allows users to select which information to import, to specify parameters that determine importing behaviors (e.g. connection information to systems, data format preferences, replace/merge preferences etc.). In such embodiments the user can simply select which systems they want the invention to analyze. The invention can also first attempt to automatically detect which systems are available and/or allow users to configure information about which systems are available.

It then imports and analyzes information about those systems, including information stored in those systems. It also imports—at the user's request—information from general sources, such as tcpdump logs, IDS logs, asset management tools etc.

This information is used to determine the technically enforceable policies ("low-level policies") that correspond with the policies selected by the user ("high-level policies"). An embodiment of a system and method to achieve this determination has been described in U.S. Pat. No. 9,043,861B2 entitled "Method and system for managing security policies" (referred to "MDS1" within the present application).

Example information sources that can be imported include (for example):

Information about systems and their interactions, e.g. imported from tcpdump logs Information about applications, e.g. imported from asset management tools Information about users, e.g. imported from directories and identity management systems, or HR systems Information about business processes, e.g. imported from ERP systems or BPMS systems Information about the organization, e.g. from ERP systems, HR systems etc.

Information about physical location of users and systems, e.g. from badge access systems, RFID management systems, tagging systems etc.'

Information about policies, e.g. policies already configured on IT systems

Information about alerts, incidents, logs etc.

etc.

The present invention aims to simplify policy management by presenting the user with an interactive, dynamic, contextual user interface, e.g. a textual or graphical editor, a canvas or graph/model/flowchart etc. editor, a web site, a "software wizard" or a knowledge-based system (related to and sometimes called "expert system"). A software wizard is a user interface type that presents a user with a sequence of dialog boxes that lead the user through a series of well-defined steps. Tasks that are complex, infrequently performed, or unfamiliar may be easier to perform using a wizard. A knowledge-based system is a computer program that reasons and uses a knowledge base to solve complex problems, and often includes a knowledge base, a user interface (wizard interface, natural language query interface, graphical editor etc.) and an inference engine. An expert system converts the knowledge of an expert in a specific subject into software, and is sometimes implemented as a rule-based system.

In the present invention, the imported information is part of the knowledge base used for determining the user interface. The information can be translated, merged, normalized etc. to allow for more consistent processing in the subsequent steps of the invention. For example, the information can be transformed (syntactically and/or semantically) into a consistent metamodel, ontology, data structure etc.

1.2. Knowledge-Contextual User Interface

In this step, an embodiment of the present invention contextualizes the user interface (110) and interacts with the user (115) to answer questions tailored to the analyzed information, and—in some embodiments—tailored to the particular industry vertical and their policy requirements (e.g. security & compliance), such as HIPAA, PCI etc.

The following embodiment illustrates an exemplary contextualizing user interface as a wizard-based embodiment of the invention: The embodiment uses the imported information to dynamically tailor a "software wizard" to determine (e.g. infer) and ask the user the minimum needed number of specific questions needed to determine which high-level policies should be automatically created for the particular user. Questions include for example (paraphrased in text—the wizard will in many embodiments instead use various graphical elements, such as tickboxes and pulldown menus):

In a hospital environment: "You store patient records in Electronic Medical Record (EMR) xzy. You manage users and roles in directory abc. Would you like to give your main user roles in abc access to the EMR xyz based on the following access controls defined in the EMR: <role nurse: permissions f,g,h,j,k>, <role doctor: permissions u,h,j,k,l> etc. Or would you also like to take the physical location of the role into account, which is defined in the badge access system?"

In a hospital environment: "Should nurses be able to access <all records in the EMR> or <only patient records in the EMR for patients where the patient's current treating physician is on duty> or <only patient records in the EMR for which the patient's current treating physician is the same physician who the nurse is currently working for>?" etc.

In a hospital environment: "would you like to generate a set of policies that reflect typical HIPAA security and privacy rule requirements, based on the information analyzed from your EMR and your identity directory?" etc.

FIG. 2B illustrates a very simple wizard (250) that lets users select certain requirements to technically implement.

Alternative embodiments may include a (potentially constrained) natural language requirements editor, a query interface (which may ask questions and require users to enter or select answers), based on e.g. textual, graphical, canvas, flowchart, model, wizard, website, voice, gesture, brainwaves or other physical or logical communication method.

A particular feature of the embodiment is that the system can present particular user interface artifacts (e.g. menus, tick-boxes, questions) contextually determined by the imported information and/or industry vertical. For example, if the imported information includes information about users of a system, it may ask questions about policies related to users. If such information is not imported (e.g. not available), then it may not ask such questions. In cases where information is unavailable, the wizard may also provide instructions how to find and import the information. In particular industries, common policies and regulations may determine some of the policies.

1.3. Generate Policy

In this step (120), the embodiment of the invention then determines a set of (usually more detailed) policies based on the particular user selections and the imported information. It can use "templates" to create the policies, which could be software code/binaries, model transformations, rules in a rule engine, etc.

This step can either generate "high-level policies" (e.g. if the MDS1 prior art or similar is used subsequently) or directly generate "low-level policies" (step 125).

This invention simplifies the authoring of policies, esp. for industry verticals that share common policy requirements, for example common security regulations and laws, e.g. HIPAA, PCI, privacy laws etc. In this case, the invention can include templates that determine the policies required for the particular industry.

Figures 3A, 3B:
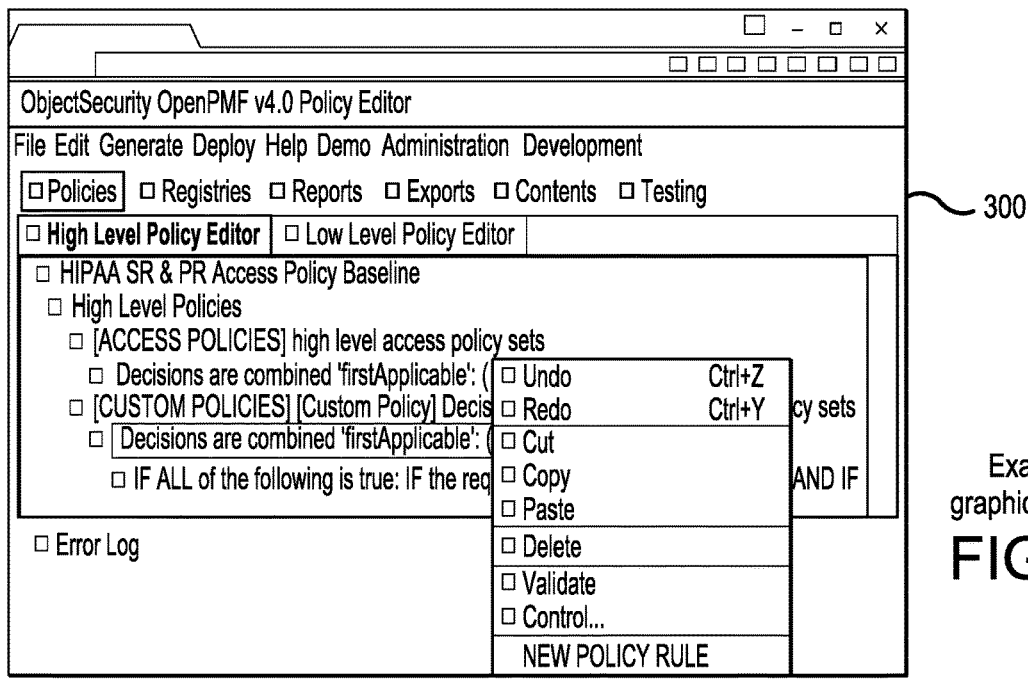
FIGS. 3A and 3B illustrate an example graphical editor (FIG. 3A) and an example textual editor (FIG. 3B) according to an embodiment.

In an embodiment, the user is then able to customize the generated policies using a policy editor. For example, FIG. 3A illustrates an exemplary high-level graphical policy editor (300) that contains the generated policies and allows fine-tuning. FIG. 3B illustrates an exemplary textual policy editor (350) that allows editing policies using (constrained) natural language.

1.4. Generate & Enforce Technical "Low-Level Policies"

Figure 4A:
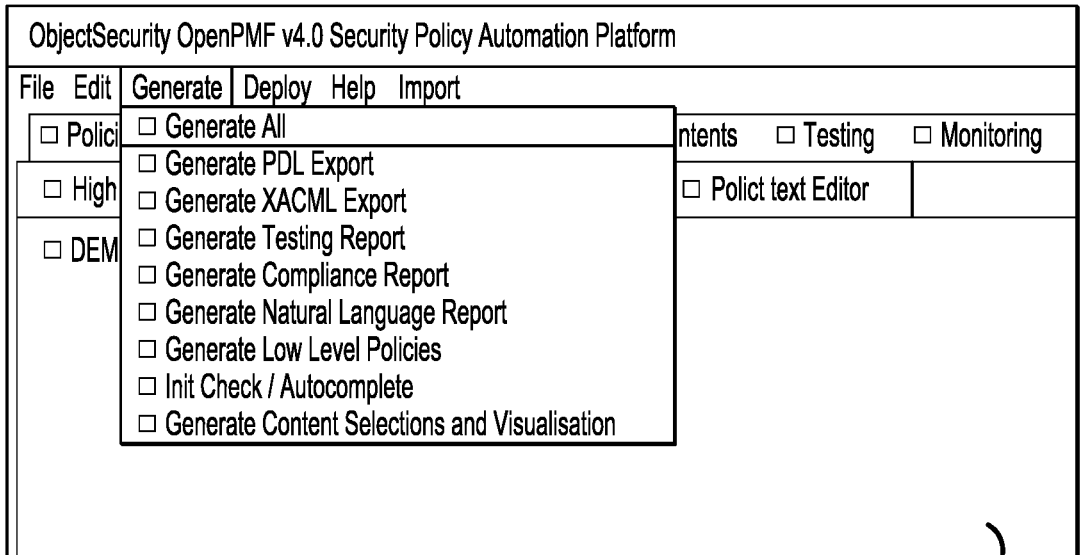

Unless "low-level policies" were already generated in the "Generate policy" step, the system can automatically generate (step 125) the "low-level policies" corresponding to the generated "high-level policies". Because the invention already knows a lot about the various technologies it has analyzed in earlier steps, it can automatically generate the policy rules and configurations for those systems (for example using the MDS1 prior art). This may involve explicit user action (see FIG. 4A or example screenshot of the user interface menus 400), or may be fully automated.

Figure 4B:
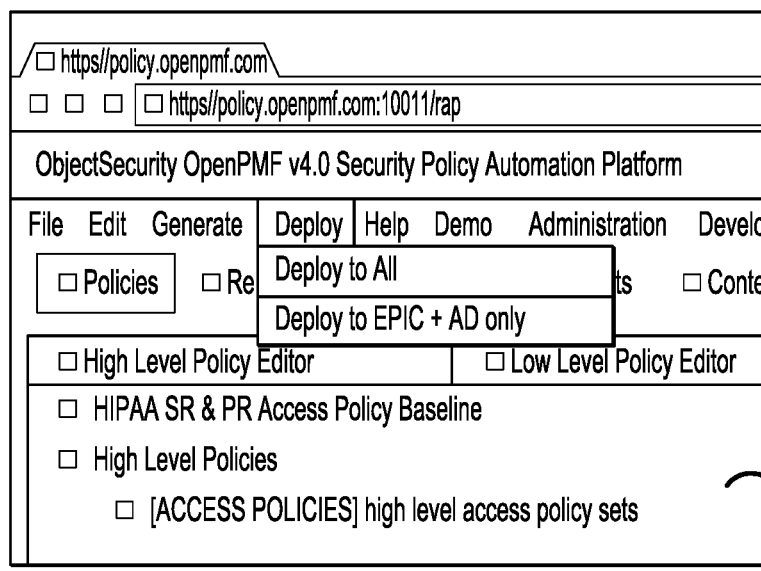

After that, the generated "low-level polices" can be distributed (deployed) for technical implementation (step 130), for example technical runtime access control policy enforcement (and may also include monitoring incidents related to policy enforcement, step 135). This may involve explicit user action (see FIG. 4B or example screenshot of the user interface menus 425), or may be fully automated.

1.5. Document Automatically

The system can also analyze all the information that went into the described steps, esp. the imported information, authored policies, templates, generated policies, enforcement, and create documentation. The invention automatically generates (step 140) documentation and evidence for audit and compliance based on the imported/analyzed information, templates, input policies, and output policies etc.

For example, an automatically generated document (see FIG. 4C, 450) explains (e.g. in natural language) the steps the system went through to generate policies, based on which particular templates and on which particular imported information. Furthermore, the "MDSA patent" can be used to analyze and document the information that went into the described steps.

2. Contextual Editor Generation, and "Round-Tripping" Between Multiple Editor Options This part of the present invention aims to provide contextual editor generation, and to provide users with a textual natural language representation of policies in a way that operates seamlessly alongside other information model editing approaches (e.g. tree form editors).

2.1. Contextual Editor Generation

For the present invention, policies editors need to be contextualized, for example based on the imported information sources and/or based on the industry for which the policies are managed. However, it is hard to design and implement a hard-coded policy editor that can accommodate the required level of contextualization.

An embodiment of the present invention includes automated editor generation from a common, customizable data structure (metamodel). For example (depicted in FIG. 5A), an access control policy model 500 based on a specified metamodel 550. In this example, Eclipse Modeling Framework (EMF) is used, and the screenshot shows the data model directly opened in the Eclipse integrated development environment (IDE). Many other implementation choices are possible, including for example ontologies, (graph) databases, in-memory structures etc. In the example, the information model is in-memory and stored in a standard XML-based notation (XMI). It contains the information model elements of the policies and other information indirectly related to policies (e.g. attributes) or unrelated to policies (e.g. imported contents).

Based on the metamodel, it is possible to automatically generate editors. An exemplary graphical model editor is shown in 300. It allows direct editing of parts of the information model in a tree-form editor. The tree editor is based on the metamodel of the information model and a customization DSL. The policy is accessible in its own tab in the user interface (UI). The example uses available tooling to generate the editor from the metamodel.

The benefit of this approach is that it is possible to change the metamodel to reflect contextualization, customization (or evolution), and automatically update the editor consistently with those changes. For example, it is possible to rapidly customize the present invention to allow managing policies specific to a particular industry (e.g. hospitals).

2.2. "Round-Tripping" Between Multiple Editor Options (Near) natural language editors are often a user-friendly and intuitive option to author and manage policies. However, natural language editors that contain every little detail about the policy become very cluttered and non-intuitive. As a consequence, natural language editors are often only used for relatively high-level statements, and not for very detailed configurations.

For example, in an embodiment of the invention, a near natural language text editor (see 350) is automatically generated from a customizable grammar specification (see FIG. 6A, 600 for an example grammar excerpt). In this example, the text editor does not include all elements of the policy metamodel used to generate the abovementioned tree editor, because the (near) natural language would be quite cluttered and unwieldy with all the details being part of the sentence. Instead, it is based on a subset of the metamodel. An advantage of such a grammar-based editor generation is that tools are available to create editors that include automatic validation of whether the text in the editor conforms to the grammar or not, and semantically "intelligent" content assist.

The invention prefills the natural language text editor with a natural language notation of the relevant parts (or all) of the policy in the metamodel (if a policy is already specified there), using for example a model-to-text (M2T) generator (see FIG. 6B, 625) that selects relevant parts of the full policy. It generates the textual policy as a starting point for editing (if a policy is already stored in the model).

The textual editor can also draw on other information stored in the system, for example text snippets available for the editor's content assist feature (see FIG. 6C, 650). The text snippets can also be provided by the M2T generator (see FIG. 6D, 675). The textual building blocks for the editor can be configured as textual model elements in the same or another textual model file, for example (see below) attributes. This allows the textual editor to populate the content assist without tight integration with the information model.

A particularly innovative aspect about the present innovation is that it should be possible to "round-trip" between editors that allow authoring of subsets of the full information (e.g. the described natural language editor), and other editors that (for example) allow authoring of the full information (or other subsets), such as the tree editor in the example embodiment.

An embodiment of the "round-tripping" works as follows: When a user (in the example) opens the (near) natural language text editor, the system automatically generates a textual representation of (a subset of) the same policies as described above. The user then edits the policy (add, remove, modify etc.). When done, the changes are automatically merged back into the full policy representation—and the invention consolidates the edits with the original information model.

To make this work, the merging feature needs to be able to reliably associate each element of the edited policy (e.g. in the natural language editor) with its original policy element (e.g. in the tree editor and full metamodel/model), so that potential changes can be detected and reflected in the full model. The user may be able to select the merge behavior, as depicted in FIG. 7A, 700. For example, if "discard" is selected, the system notes that decision and does not merge the edits. If "cancel" is selected, the user is brought back into the editor for more editing. If the user selects "yes", the merging system is triggered.

The merging system compares the policy from the textual model with the policy stored in the information model by traversing each model element of the policy and comparing its contents with one another. If changes are detected, it configures these changes in the information model.

This merging process may be assisted by assigning a unique (maybe random) ID to each model element in the information model, which gets copied into the textual representation. This way, the merging method can reliably find the correspondence between model elements in the information model and in the natural language textual model by matching the ID of each element, therefore facilitating robust detection of changes. For example, IDs can be appended to each textual element, as depicted in FIG. 7B, 725. An editing convention could be that users should not edit those IDs, and edits may be detected by the merging system by comparing the original textual representation with the changed textual representation (for example by finding the matching ID for each policy element in both policy representations, and comparing/merging the data associated with that ID).

Merging can also be done by traversing the policies in both models in the same sequential order to detect changes, or other algorithms such as calculating a differential between both models.

Figure 8:
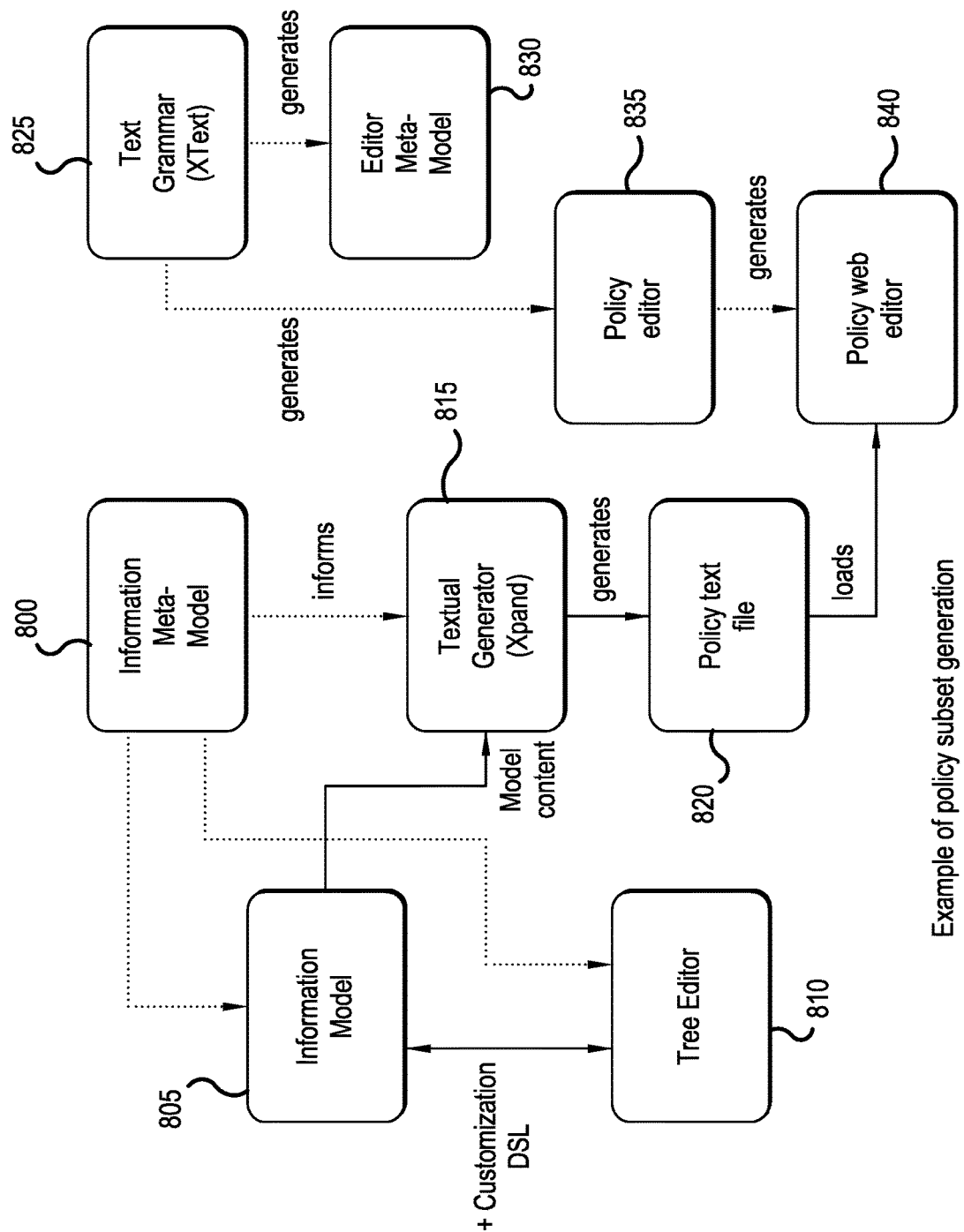
FIG. 8 is a diagram that shows how a policy subset for a text editor is generated from a full information model according to an embodiment.

FIG. 8 illustrates an example of the first half of the embodiment's "round-tripping" process: the generation of a textual editor and textual model representation based on the information model: The complete policy data structure is specified in the metamodel (800). The policy is stored in the information model (805) conformant with the metamodel (800). From the metamodel (800), the tree editor is generated (with some customization, e.g. via a Domain Specific Language, DSL). The tree editor allows the editing of the information model (805). Note that in other embodiments, the tree editor could be generated from a different metamodel, which may for example specify a subset of the overall policy model. In an embodiment, a textual generator (815) transforms relevant parts of the information model (805) into a policy text file (820).

The editor is specified using a grammar (825), which automatically generates its own metamodel (830). A policy editor (835) is automatically generated from the grammar, e.g. using a tool such as Xtext. Furthermore, a web editor is generated (840), e.g. using a tool such as DSLforge. The policy editor (840) loads the text file (820) and editing can begin.

Figure 9:
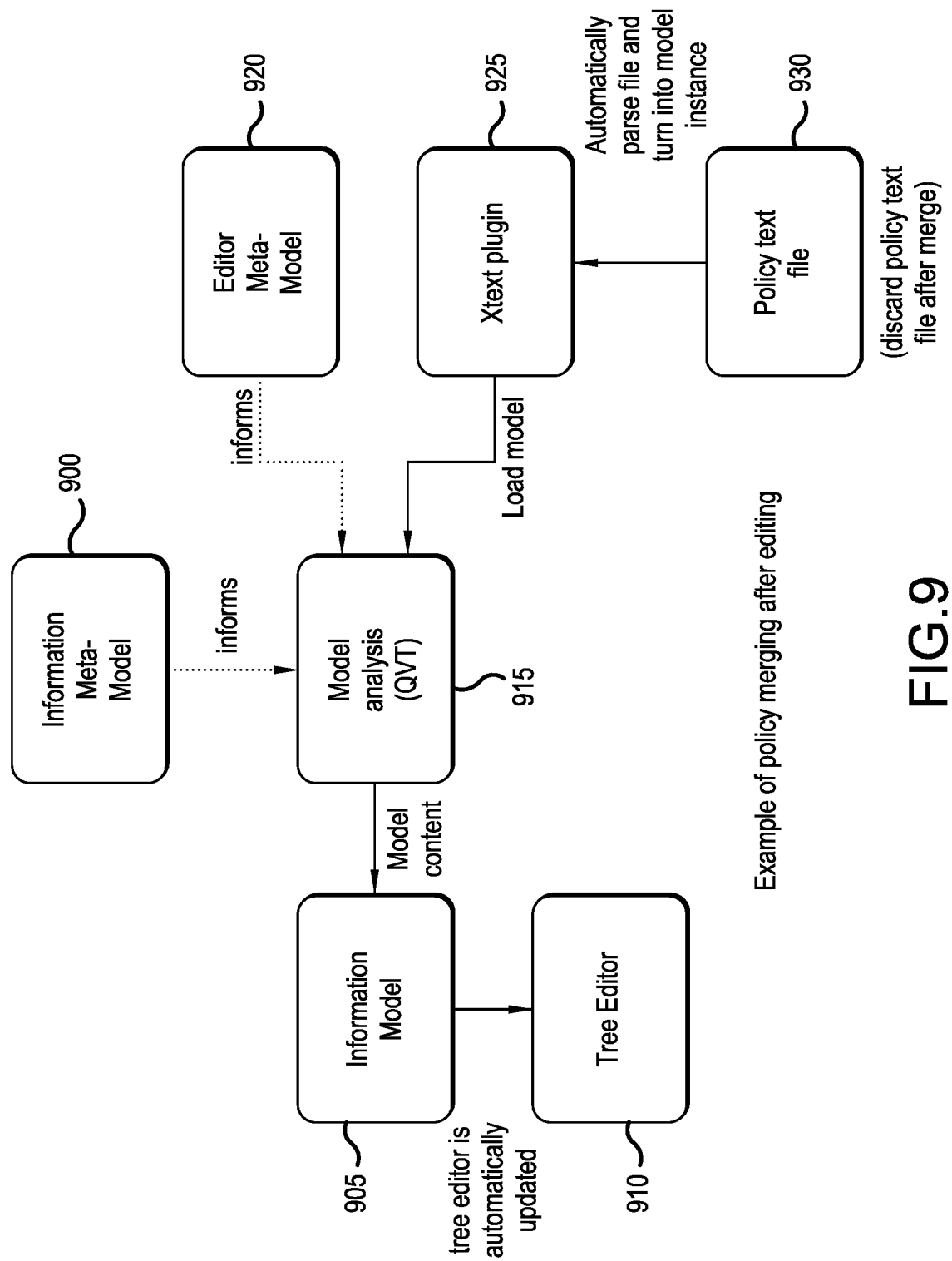
FIG. 9 is a diagram that shows how a policy subset for a text editor is merged into a full information model according to an embodiment.

FIG. 9 illustrates an example of the second half of the embodiment's "round-tripping" process: the merging of the edited textual model representation and the information model: The policy editor tooling (925), e.g. provided by the Xtext plugin of the editor, allows the model analysis algorithm (915), e.g. implemented in the QVT model transformation language, to parse the edited policy text file (930) syntax-neutral based on the editor metamodel (920) that was originally generated by the editor generation process in FIG. 8. The model analysis algorithm (915) also has access to the full information metamodel (900), and can therefore transform the model represented by the policy text file (930) into its corresponding model elements in the information model (905) that corresponds to the metamodel (900). As a result, the changes are now visible in the tree editor (910) as well. Merging is done in such a way that the analysis algorithm (915) determines a match between policy text file (930) elements and information model (905) elements (e.g. based on a shared ID, as described above), and determining whether any relevant changes have occurred. If so, it stores those changes in the information model (905) element without overwriting additional attributes that may be stored with the model element. As a result, details in the richer information (in this example in the information model 905) are not overwritten, but rather modified/merged.

One objective of this design is to be able to edit a rough policy in the intuitive textual editor using natural language, then fine-tune policy details in the tree editor, and round-trip numerous times e.g. to add additional policies.

Notable aspects of this example embodiment of the described present invention can be summarized as follows:
1) automatically creates a customizable textual natural language representation from information models
2) the text blocks used for the language are user customizable, underlying information model entities corresponding to the text blocks are user customizable 3) policies can be easily constructed using an editor content assist feature the first state of the policy editor may automatically be pre-filled with an automatically generated textual representation of the information model 4) the results of the natural language editing process are merged back into the information models, to provide seamless consistency between the textual editor and other editors and/or features (e.g. generators)

5) if the complete information model is presented as natural language text, edits can be merged by replacing the content in the information model 6) if only parts of the information model can be presented as natural language text, edits can be merged by analyzing the information model of the natural language text/model (usually programmatically) and entering changes into the information model 7) merging may be assisted by assigning a unique (maybe random) ID to each model element in the information model, which gets copied into the textual representation. This way, the merging method can find the correspondence between model elements in the information model and in the natural language textual model by matching the ID of each element, therefore facilitating robust detection of changes.

Note that "round-tripping" is not limited to embodiments where there is a natural language policy representation, but can be used for any policy representation.

2.3 Natural Language Policy Representation

An embodiment of the present invention allows the representation of policies in a form that resembles natural language, e.g. English language. Numerous approaches can be used to allow a machine to generate, parse and analyze the natural language policy, including:

1) Associate a "Natural Language Snippet" with Each Building Block of a Policy:

Example policy rules supported by an embodiment of the present invention can be of the form "IF <attribute> <calculation> <comparison-value> THEN <action>". In natural language, an example rule could therefore be: "IF the requestor's identity equals 'Ulrich's ID' THEN allow access". While this is a valid natural language sentence, each building block (e.g. attribute, calculation, comparison value and action) is clearly specified by a "natural language snippet".

Internally, an embodiment of the present invention has to correlate these natural language snippets with the building blocks it can store and process (e.g. a data model). Such an implementation is straightforward: each data element that holds information about technical building blocks stores a field that holds the "natural language snippet. For example: Attribute1→"the requestor's identity; Calculation1→"equals", Action1→"allow access". For comparison values, it may be preferable to include the actual value in the natural language policy representation, e.g. "DN:ulrich_lang". Alternatively, it may be preferable to implement a mapping between actual values and their natural language representation, for example "Ulrich's ID"→"DN:ulrich_lang".

This solution allows an embodiment of the invention to translate between natural language snippets and the internal technical representation.

Moreover, it allows an embodiment of the invention to translate between numerous representations, for example, from natural language to an internal technical data structure, and then to a technical (or other) syntax such as for example OASIS eXtensible Access Control Markup Language (XACML). In such an implementation, "target language snippets" define specific syntactic elements filled into the technical syntax. For example, Attribute1→"urn:oasis:names:tc:xacml:1.0:subject:subject-id". Another example would be the translation into a visual policy graph.

This allows the invention to for example translate a natural language policy into XACML, or a natural language policy into a "model-driven security" (MDS, see MDA1) high-level policy, and a corresponding "model-driven security" low-level policy into XACML 2) Natural Language Processing (NLP):

NLP often uses machine learning algorithms and inference algorithms to understand natural language. NLP systems often have to be "trained" using data, and the more data is run through the system, the better the NLP gets. For example, machine translation systems (e.g. Google Translate) are trained using existing large sets of phrases between languages. An embodiment of the invention applies NLP algorithms to natural language policies, for example to translate natural language policies into technical policies (e.g. XACML). The NLP training set could for example include example mappings similar to the ones described in 1) above. The likely advantage of this approach over 1) is that it allows more flexible natural language policy authoring. On the downside, this approach may make translation mistakes (esp. if not sufficiently trained), leading to incorrect policies—and it may be hard to review/verify how exactly the natural language policy was translated and why. In contrast, approach 1) above will verifiably produce the correct translation (or no translation at all).

3) Tagging Natural Language:

Some electronic text editing tools allow the addition of tags to text, for example SemanticXWiki extension to XWiki, a popular Wiki software. Such tools allow text, e.g. words or phrases, to be tagged with tags that can be managed and processed. In an embodiment of the invention, users manually tag natural language building blocks in the text with their matching technical equivalent (e.g. tag "the requestor's identity" with "Attribute"). In another embodiment, the semi-automated system analyzes (e.g. using NLP) the text and adds tags, which can then be reviewed/edited by users. In another embodiment, the automated system analyzes (e.g. using NLP) the text and adds tags without human intervention. The benefit over 1) and 2) is that a completely arbitrary natural language can be used, and natural language snippets can be arbitrarily modified even after tagging has occurred. It is also possible to use existing text as a basis, for example pertaining to a law or regulation. The tags add the semantic clarity to such text, allowing the system to further process (e.g. using MDS, translating into technical syntax, constrained natural language, policy graph etc.).

3. Flexible Policy Testing

Policy testing allows the formal verification that the access policy meets certain properties. For example, for access policies, it may be useful to formally verify that—for a particular implemented access policy across IT systems—a particular IT system cannot access a particular other IT system. This approach was for example implemented by NIST (see csrc.nist.gov/groups/SNS/acpt) and by ObjectSecurity (based on an extension of NIST's work). The exemplary system uses a symbolic model checker to run a combinatorial array (see below) through a finite state machine to prove/disprove properties. One shortcoming of that approach is that the testing properties need to be stated in the same terms as the policy, i.e. using the same attributes.

For example, if a policy is stated in terms of IP addresses, then the testing properties also need to be stated in IP addresses.

This aspect of the invention allows policy authors and testers to author policies and properties, respectively, in terms (=attributes) that are intuitive and relevant to them. In particular, it allows testing high-level testing properties against policy rules that are expressed quite differently. For example, if there is a mapping between hostnames and IP addresses, it should also be possible to state properties using hostnames, not just IP addresses. The system should be able to translate properties to the correct attributes to allow the formal verification (e.g. map hostnames to IP addresses).

Related to such mappings, prior art (patent U.S. Pat. No. 9,563,771 B2 entitled "Automated and adaptive model-driven security system and method for operating the same", called "B-MDS" throughout this specification) explains how to automatically calculate so-called "mapper chains" to translate "high-level policy" rules to machine-enforceable "low-level policy" rules. "Mapper services" are calculation functions that map an input to a corresponding output (e.g. map geolocation to country code).

The following examples illustrate how the present invention can test policies (for example in the context of MDS1 and B-MDS), to allow more flexible authoring of testing policies. Note that the invention is not limited to access control policies, but applies to any kind of policies (e.g. logging, QoS, alert, incident, mitigation, alarm, reporting):

3.1. Policy Testing Examples

Figure 10:
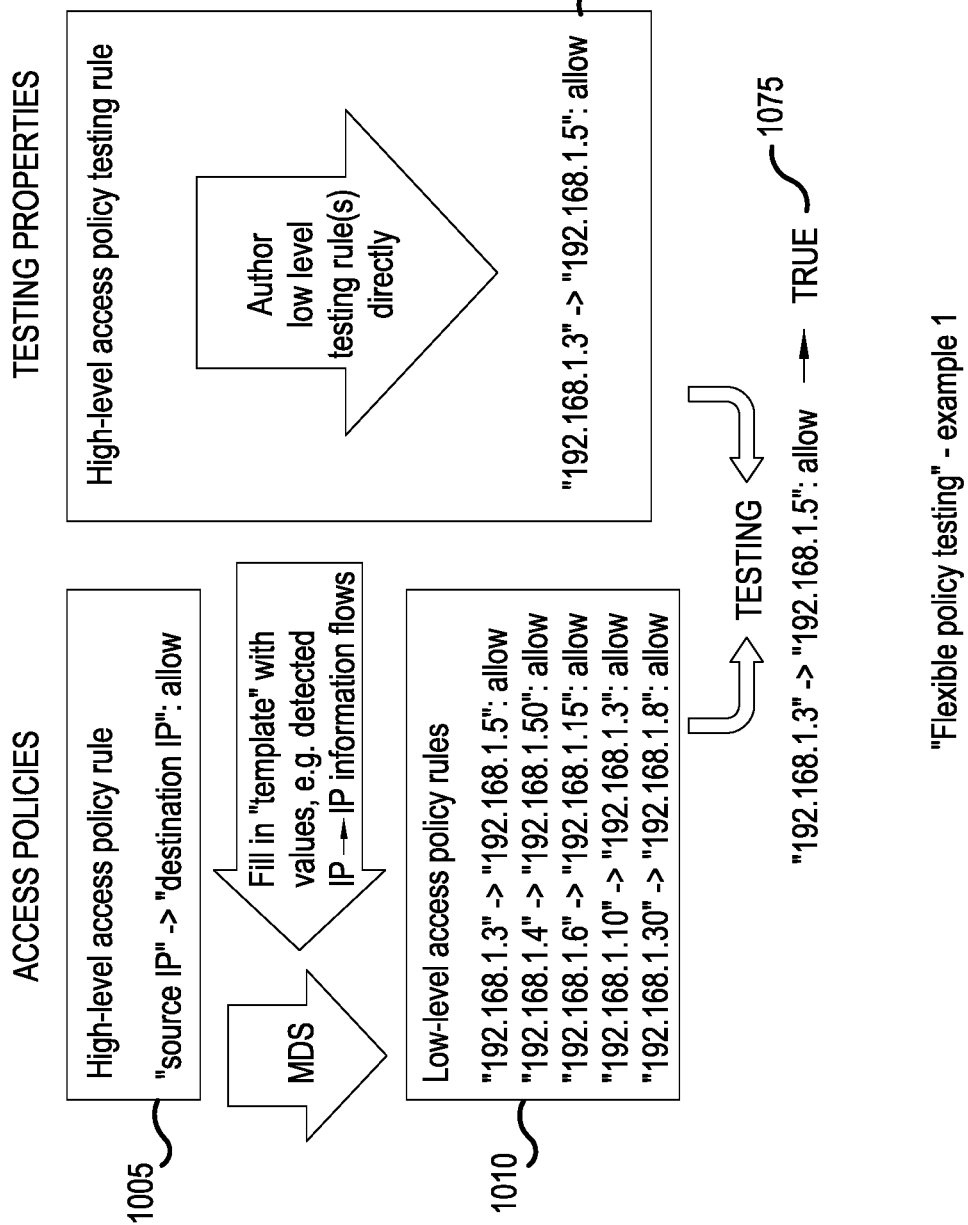
FIG. 10 illustrates a policy testing example where "high-level" access policies are authored using "wild-cards", and "low-level" testing properties are directly authored according to an embodiment.

FIG. 10 illustrates a simple example of a high-level access rule (left side) and how "MDS" (model-driven security, based on the MDS1/B-MDS prior art) fills in detailed IP-to-IP address (1010) from a high-level rule (1005). On the right side it shows how the user directly authors low-level testing properties (1050) using IP addresses as attributes. The attributes in the "low-level" rules match on both sides (source IP and destination IP), and testing can be calculated. The bottom shows the result of the symbolic model checker (1075), which determines that the testing property is true (i.e. there is a matching rule in the low-level policy rules on the left side).

Figure 11:
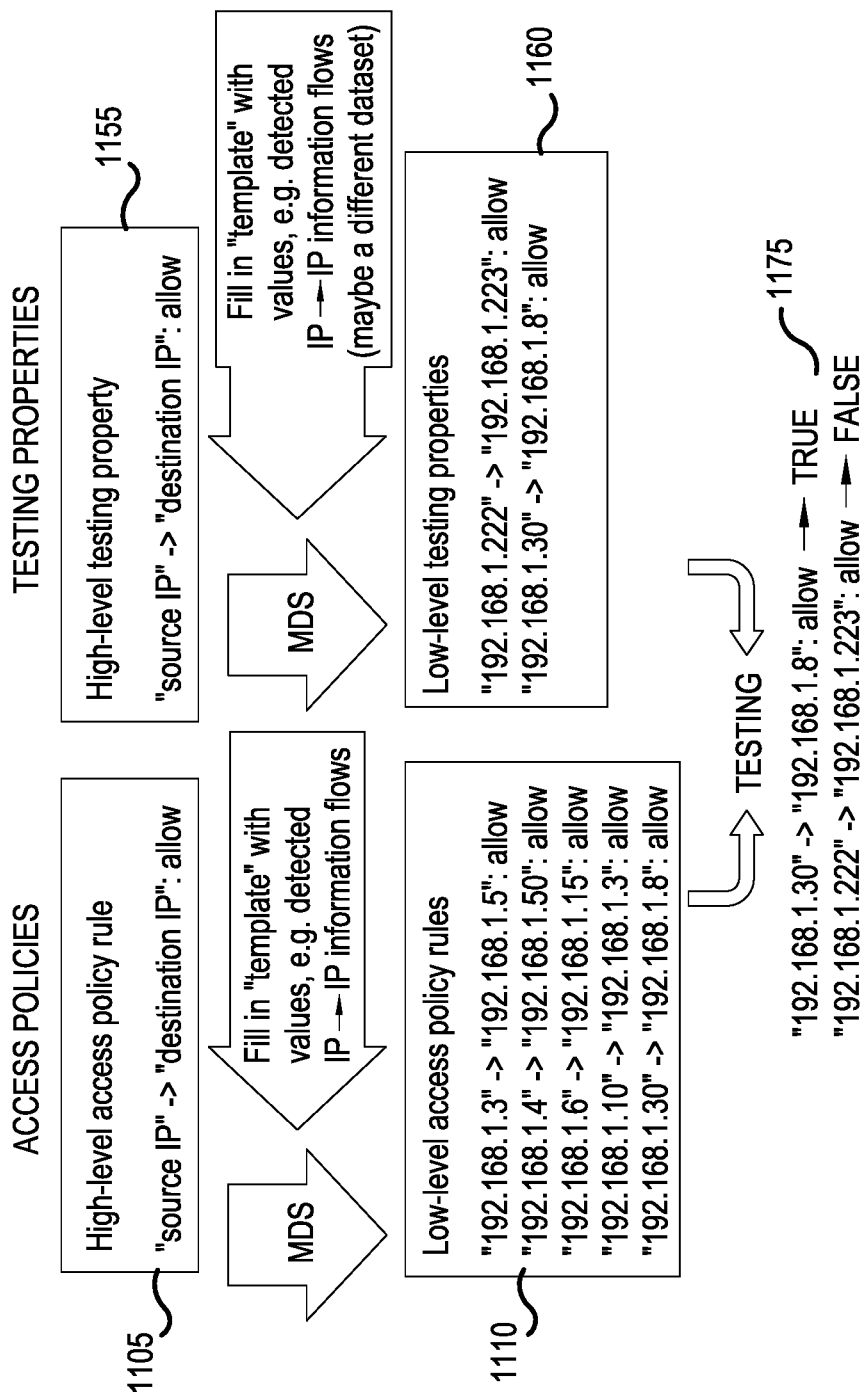
FIG. 11 illustrates shows a policy testing example where "high-level" access policies and testing properties are authored and the matching low-level access policies and testing properties are generated according to an embodiment.

FIG. 11 illustrates another simple example of a high-level access rule (left side) and how MDS again fills in detailed IP-to-IP address (1110) from a high-level rule (1105). On the right side it shows how the user authors high-level testing properties (1155), which MDS again fills in detailed IP-to-IP address (1160). The attributes in the "low-level" rules match on both sides (source IP and destination IP), and testing can be calculated. The bottom shows the result of the symbolic model checker (1175), which determines that one testing property is true (i.e. there is a matching rule in the low-level policy rules on the left side), and one is false.

Figure 12:
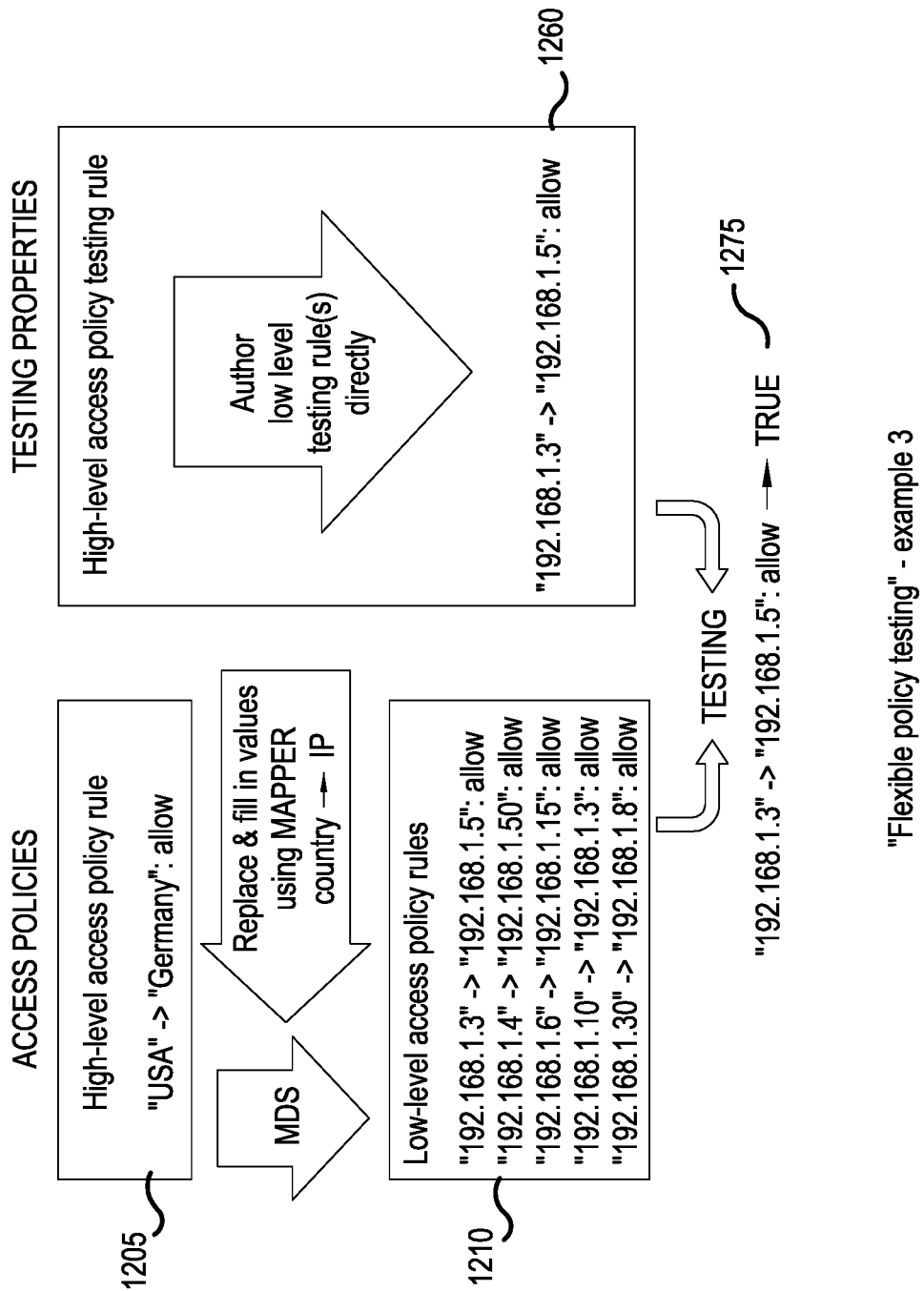
FIG. 12 illustrates a policy testing example where "high-level" access policies are authored using attributes that are mapped to different attributes in "low-level" access policies, and "low-level" testing properties are directly authored according to an embodiment.

FIG. 12 illustrates another example that illustrates how MDS allows the authoring of "high-level" access policy rules based on country names (1205), and automatically calculates a "mapper chain" (through "mappers", see B-MDS) to the matching IP addresses (1210). The example assumes that a country→IP "mapper calculation" is available (e.g. from an IT asset management solution). Testing properties are authored using IP addresses as attributes (1260), and test results can be calculated successfully (note that the user does not need to be aware of the correspondence of country names and IP addresses), in this case the testing property is true (1275).

Figure 13:
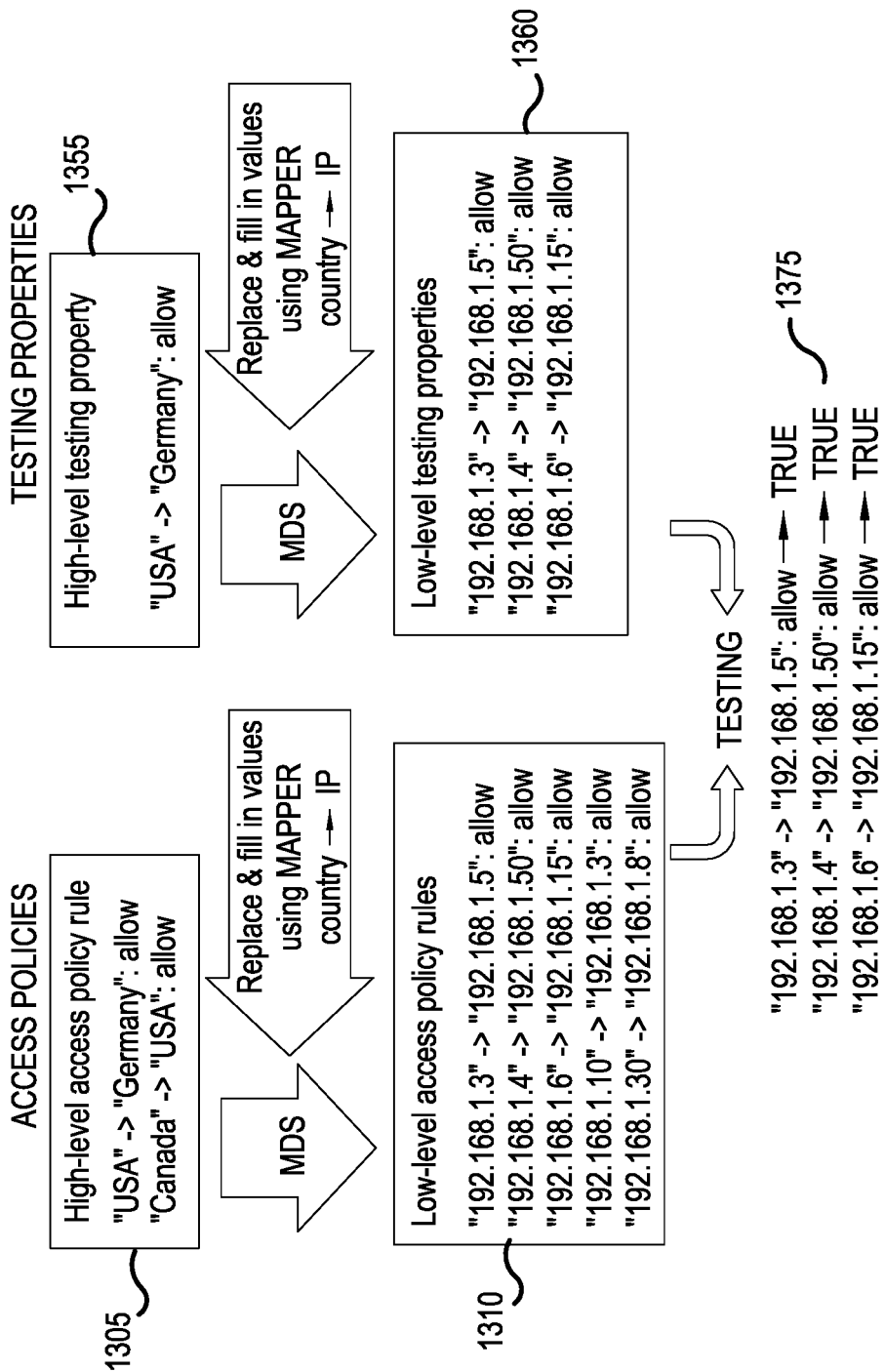
FIG. 13 illustrates a policy testing example where "high-level" access policies and testing properties are authored using the same attributes that are mapped to different attributes (but the same for access policies and testing properties) in "low-level" access policies according to an embodiment.

FIG. 13 illustrates an example how the MDS used in FIG. 12 for access policies can also be used for testing properties. In this example, country names are used as attributes in both high-level access policies (1305) and high-level testing properties (1355). Both high-level access policies (1305) and high-level testing properties (1355) are transformed into IP-to-IP address "low-level" rules (1310) and properties (1360), respectively. Again, all inputs into the formal verification use the same attributes (IP addresses) on both sides, so testing is possible—the results of the example are shown at the bottom (1375).

Figure 14:
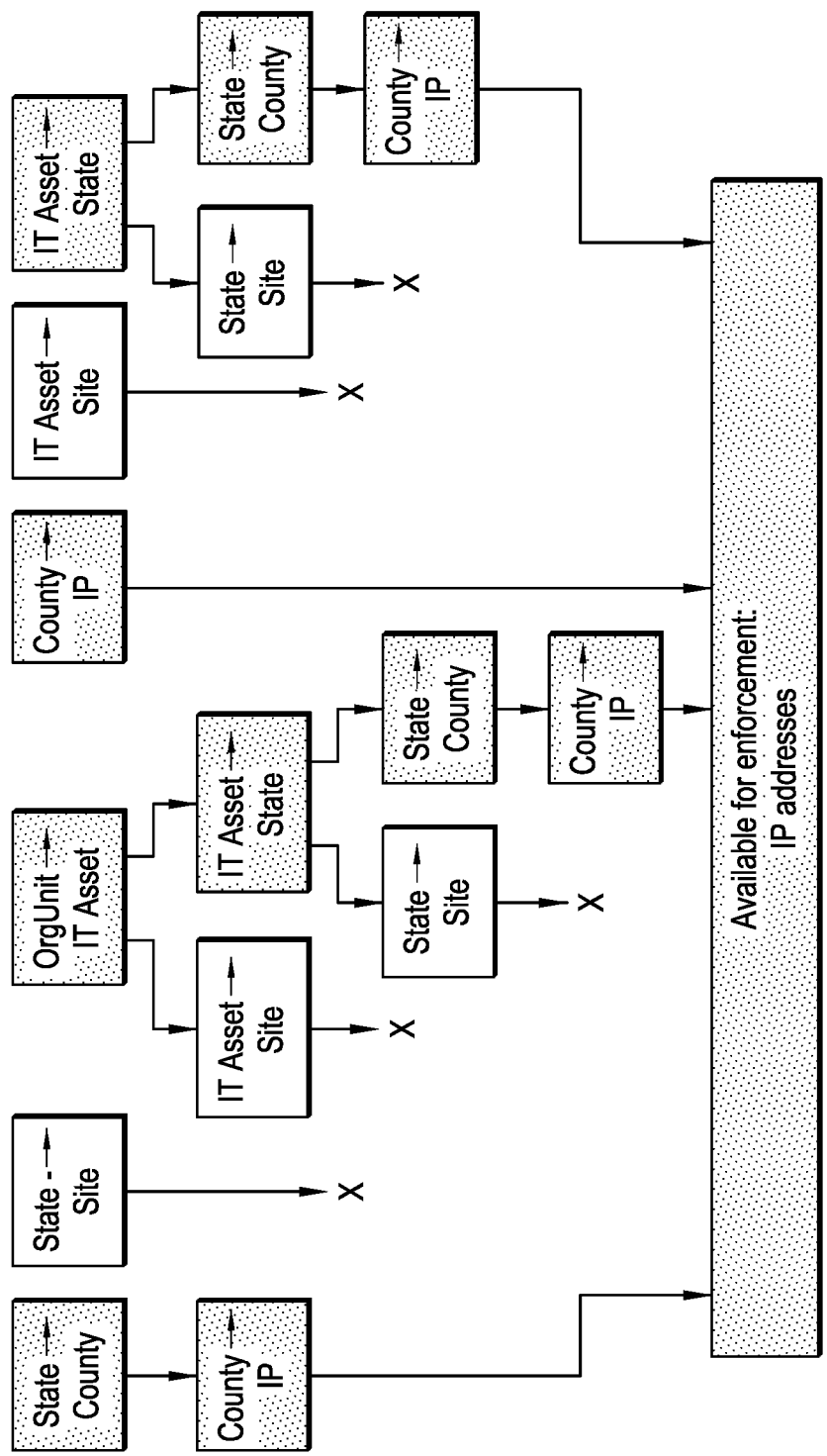
FIG. 14 illustrates "mapper chain" examples based on their inputs and outputs, indicating which mapped attributes are available, according to an embodiment.

FIG. 14 illustrates an example how different mappers can be stacked into "mapper chains", which define refinement paths for different attributes used in "high-level rules" into technical ("low-level") rules. Based on the prior art (MDS1/B-MDS), the invention calculates all possible "mapping chains" between all "technically available" (cf. B-MDS) attributes and any other attribute that can be mapped from, resulting in a tree-like mapping structure from the available attribute(s) (IP in the example) to all mapped attributes (State, County, OrgUnit, and IT Asset in the example). In FIG. 14, arrows signify how a mapper output becomes another mapper input to form a mapper chain.

3.2. Flexible Policy Testing Examples

Figure 15:
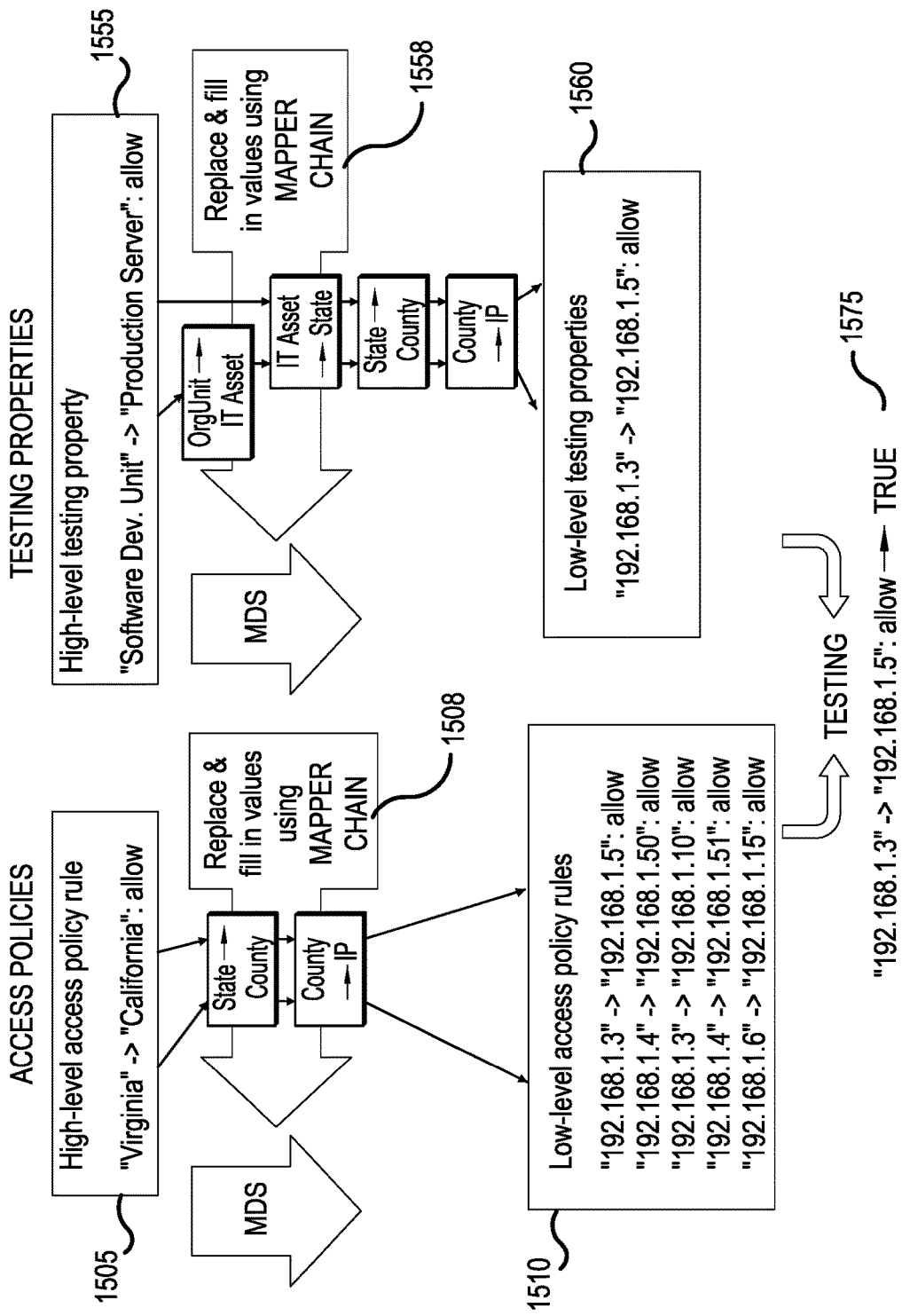
FIG. 15 illustrates a policy testing example where "high-level" access policies and testing properties are authored using the same attributes that are mapped—using the mapper chains illustrated in FIG. 14—to different attributes (but the same for access policies and testing properties) in "low-level" access policies according to an embodiment.

The following examples illustrate how MDS/B-MDS makes it possible to author testing properties using different attributes from the ones used in access policies:

FIG. 15 illustrates how the mapper chain example (see FIG. 14) can be applied to the example to allow the specification of testing properties using different kinds of attributes. In the example, high-level access policies (1505) are specified using "State" attributes (e.g. Virginia, California), while the high-level testing properties (1555) are specified using "OrgUnit" attributes (e.g. Software Dev. Unit, Production Server). Based on the calculated "mapper chains" (1508 and 1558), MDS can refine both the access control policies and the testing properties into access rules and testing properties based on the attribute IP (1510 and 1560), and test results can therefore be calculated (note that the example test result 1575 assumes that the Software Dev Unit is located in Virginia, and that the Production Server is located in California).

Figure 16:
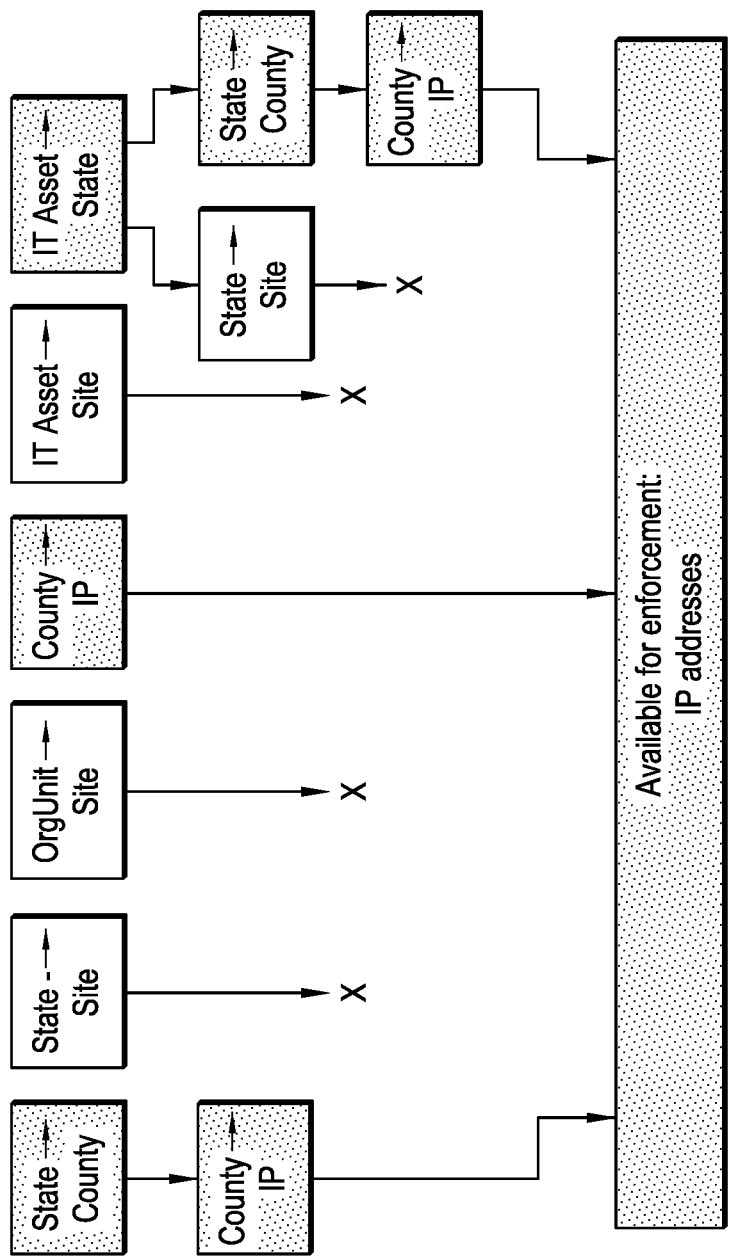
FIG. 16 illustrates different (compared to FIG. 14) "mapper chain" examples based on their inputs and outputs, indicating which mapped attributes are available, according to an embodiment.

FIG. 16 illustrates an example how different mappers can be stacked into "mapper chains" if no "OrgUnit" to "IT Asset" mapper is available, but instead only an "OrgUnit→Site" mapper is available. MDS can calculate the changed "mapper chains" as depicted in FIG. 16.

Figure 17:
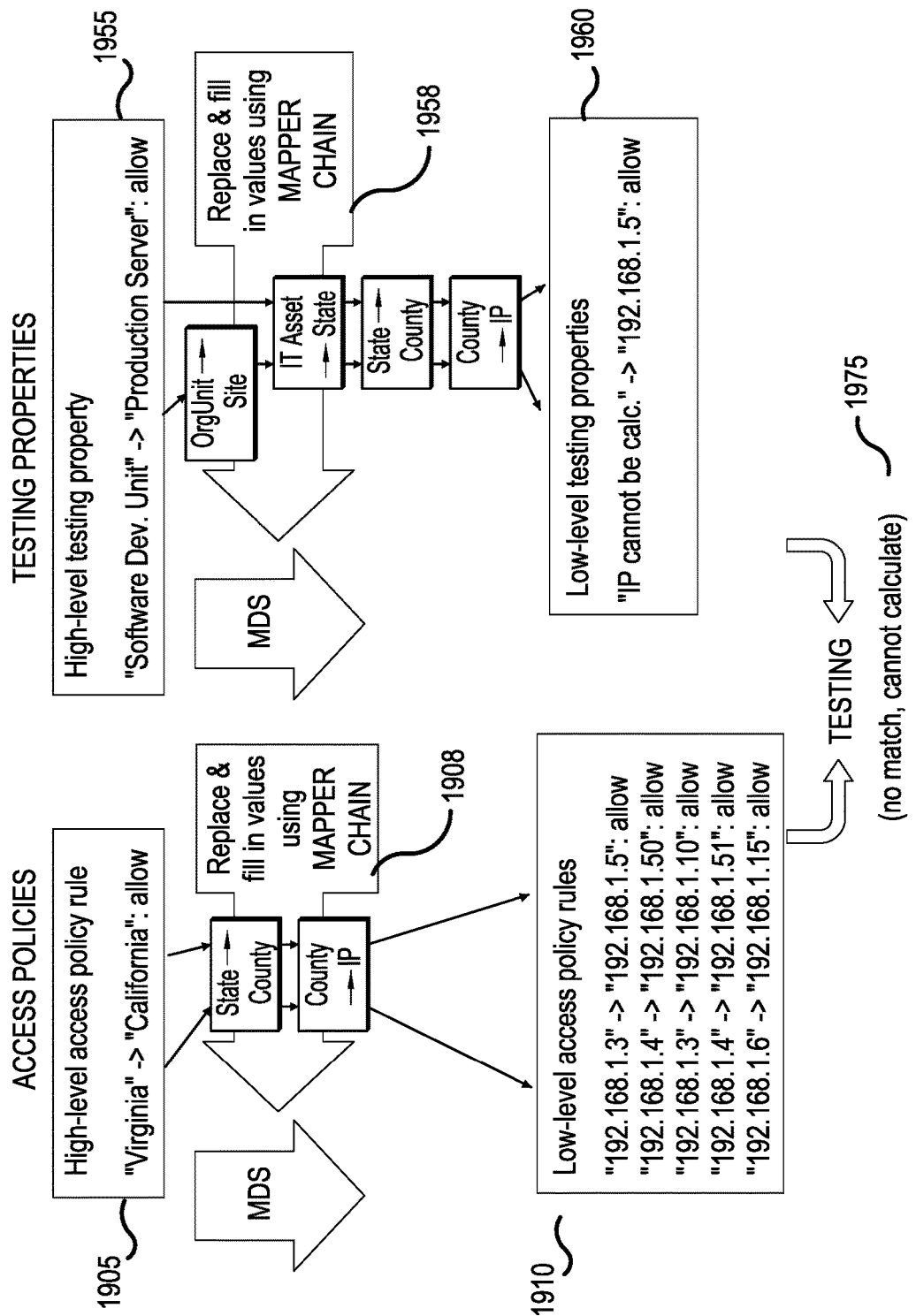
FIG. 17 illustrates a policy testing example where "high-level" access policies and testing properties are authored using the different (between access policies and testing properties) attributes that are partly mapped—using the mapper chains illustrated in FIG. 16—to different attributes in "low-level" access policies, illustrating that testing is not possible anymore, according to an embodiment.

FIG. 17 illustrates an example how in the mapper chain depicted in FIG. 16, no mapping chain from OrgUnit to IP address is available on the testing properties side (1758). This makes it impossible (at least for MDS1/B-MDS) to refine the exemplary authored "high-level" testing property (1755) into a "low-level" testing property (1760) that matches the low-level IP-to-IP access control rules (1710).

3.3. Intermediary Attribute Mapper Chains

An embodiment of the present invention allows policy authors and testers to author policies and properties, respectively, in terms (=attributes) that are intuitive and relevant to them. This benefit is that it allows testing high-level testing properties against policy rules that are expressed quite differently, using different attributes. The present invention is able to automatically match up the policy generation rules and the testing rules at every node in this tree-like structure to determine whether there any rules with "intermediary attributes" match between rule generation and testing property generation.

Figure 18:
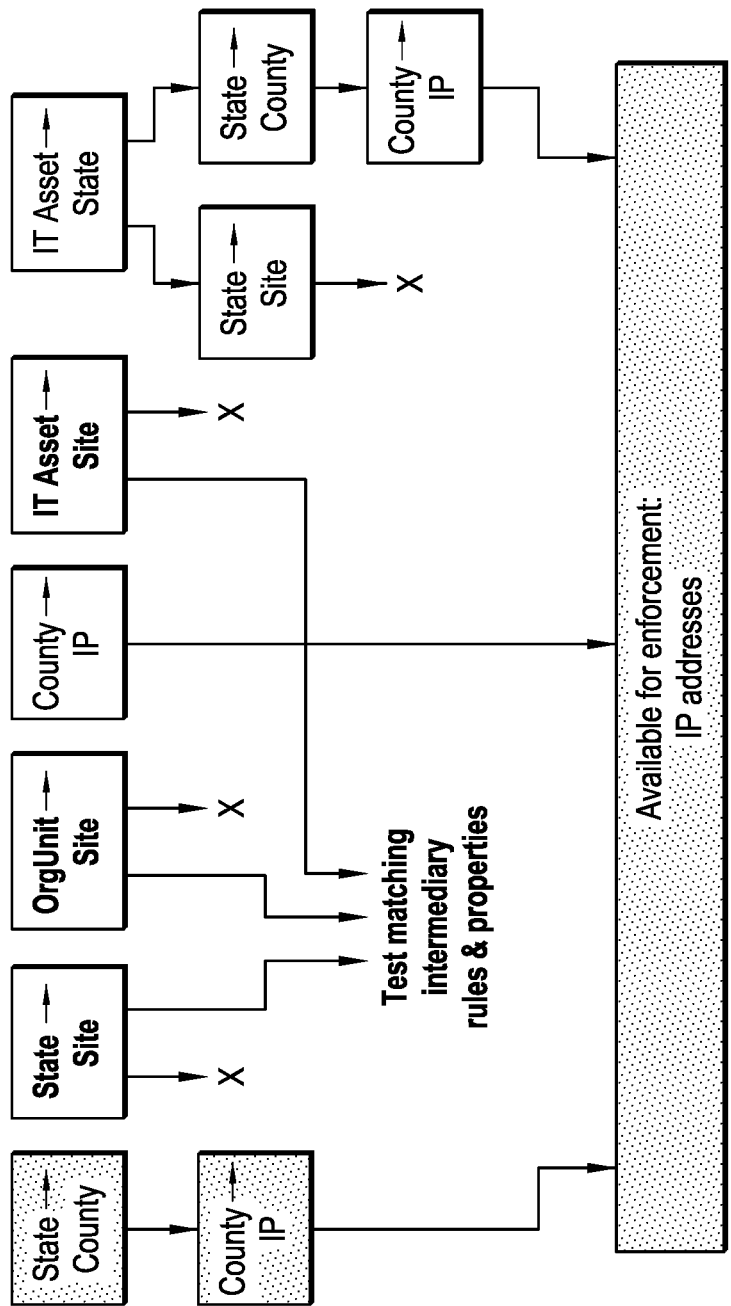
FIG. 18 illustrates different (compared to FIG. 14 and FIG. 16) "mapper chain" examples based on their inputs and outputs, indicating which mapped attributes are available, and which "intermediary attributes" could be used for testing, according to an embodiment.

FIG. 18 illustrates an example how "Site" attributes is a common attribute in the mapper chain tree for numerous attributes (State, OrgUnit, and IT Asset). There are also mappings from State, Country, and IT Asset to IP address.

Figure 19:
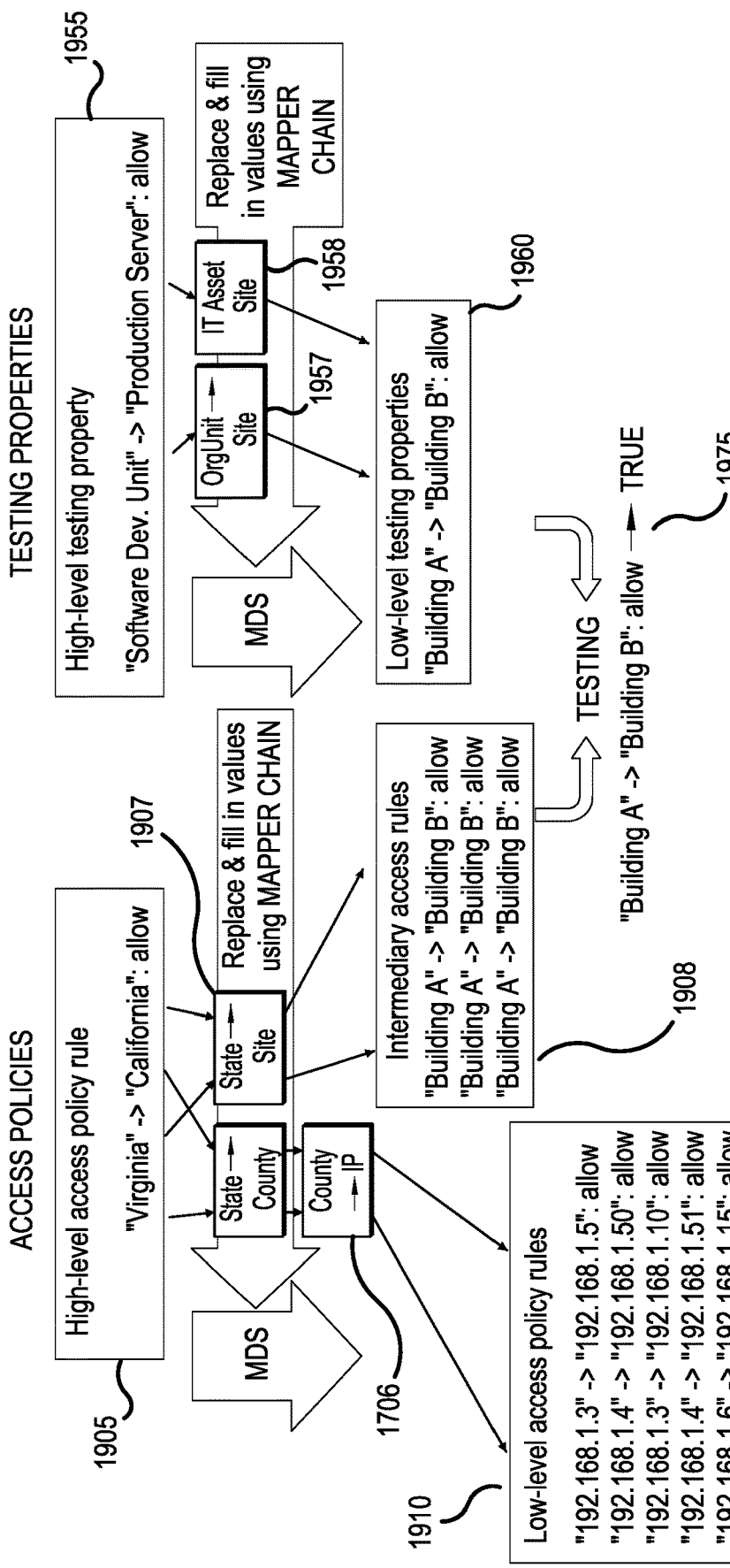
FIG. 19 illustrates a policy testing example where "high-level" access policies and testing properties are authored using the different (between access policies and testing properties) attributes that are mapped—using the mapper chains illustrated in FIG. 18—to matching (between access policies and testing properties) "intermediary attributes" in "intermediary access rules" and "low-level testing properties", while low-level access policy rules are generated using different mapper chains, illustrating that testing is possible using the intermediary attributes, according to an embodiment.

For the example illustrated in FIG. 19, it is assumed that the access policies need to be refined to IP addresses because only runtime enforcement based on IP addresses is assumed available (e.g. host firewalls). In particular, it is assumed that there is no runtime enforcement mechanism is available for "Site" attributes. Therefore, the high-level policy rule 1905 (which uses "State" attributes) is mapped to low-level IP-to-IP rules (1910) using the available mappers (1906).

However, in the same example (FIG. 19), the high-level testing property's OrgUnit (1955) cannot be mapped to IP addresses because no matching mapper chain is available. Without considering "intermediary attributes", no match is available between low level access policies (1910) and anything that can be mapped from the high-level testing properties (1955). However, as illustrated in FIG. 19, it is possible to find an intermediary attribute—"Site"—that can be generated on both sides. The present invention can use the "State-to-Site" mapper (1907) for access policy generation to generate the "State-to-Site" rules that can be matched with "OrgUnit-to-Site" (1957) and "IT Asset-to-Site" (1958) rules that can be generated for the testing rules. As a result, the generated "intermediary rules" (using "Site" attributes) on the left side (policy rule generation) (1908) can be matched with the rules generated on the right side (testing rule generation) (1960). The result is that the attributes used in the rules on both sides match, and the testing properties can be tested against the "intermediary rules" (1908 and 1960). The result of the example is shown in the test results (1975).

In plain language, the access policy "whitelists" IP-to-IF connections 1910 between states 1905. These IP addresses also relate to Sites (i.e. buildings) in a relationship where several IP addresses can be associated with one building (assuming that several computers will be in a building). Therefore a more "coarse-grained" (and not machine-enforceable, see assumptions above), potentially incomplete representation of the access policy is generated that talks about which systems can talk across buildings. The testing properties are authored in terms of OrgUnits and ITAssets, so that no mapping to IP addresses is possible (OrgUnit has not matching mapper chain). However, OrgUnits and ITAssets (1955) can be mapped to Sites (1957 and 1958). As a result, the invention can at least test whether "Software Dev. Unit" can communicate with the "Production Server", while the access policy stated that any communications from Virginia to California are allowed. In the depicted example (FIG. 19), the result is "true".

Note that mappers are only available if there is either a data source or an algorithm that can turn an input into an output. In the above example (FIG. 19), which is chosen for illustrative purposes rather than for realism, a State-to-County mapping could be obtainable (e.g. from a government source that lists counties per state, or from an organization internal system that stores relevant state-county relationships). It is further assumed that a County-to-IP mapping in the organization, i.e. some asset management tool maintains a list of which assets have IPs in which county. For the State-to-Site mapping and OrgUnit-to-Site, there could be an organizational chart that lists which sites of the organization are in which state. Similarly, IT Asset-to-Site mappings could be obtained from an IT asset management tool.

In an alternative example of data being used to define mappers, assume that various network traffic related information is available and is linked in the following chain: node name-to-MAC address-to-IF address-to-port-to-topic, where the node name could be a hostname or an assigned machine name; each network interface on the host will have a MAC address, IP address is one or more IP addresses associated with the MAC. Furthermore, each network communication will occur on a port for the IP address. Further, assume that certain more specific information is associated with some ports, for example which topic(s) the middleware will communicate on that port ("topics" are for example used in the OMG DDS middleware, see omg.org/dds, to determine which nodes will talk to each other). Because the data is structured in such relationships, it is possible to use the relationships between the data to populate the data required by a mapper service (e.g. node-to-MAC, MAC-to-IP, IP-to-port, port-to-topic, and vice versa)

In conclusion, this aspect of the present invention is beneficial because it allows (in some instances) testing high-level testing properties against policy rules that are expressed quite differently, and even in cases where the testing property would not be "technically enforceable" if it were an access policy rule. In other words, this feature allows the authoring of policy rules using some suitable attributes and the authoring of testing rules in other suitable attributes, as long as the algorithm can put together "mapper chains" and find at least one match in the mapper chain (graph/tree etc.) where both attributes are the same. This allows policy authors and testers to author policies and properties, respectively, in terms (=attributes) that are intuitive and relevant to them.

3.4. Inferring Mappings (Data Analytics, Machine Learning, Artificial Intelligence)

The following description illustrates features of the present invention that are generally useful for policy management (and elsewhere), not just for policy testing:

Turning again to FIG. 19 (and related descriptions above), an embodiment of the present invention can in some cases infer a mapping between attributes used in low-level access policy rules (1910) and attributes used in intermediary access rules (1908) (which show 3 identical rules for the sake of simplicity—in a useful implementation, such rules would likely be deduplicated). In the (highly simplified) example depicted, it is for example easy to determine that the IP addresses "192.168.1.3", "192.168.1.4", and "192.168.1.6" all correspond to "Building A", while "192.168.1.5", "192.168.1.50", "192.168.1.10", "192.168.1.51", "192.168.1.15" all correspond to "Building B". However, it is not immediately clear whether the mappings are complete, i.e. there may be more IP addresses associated with each building. Also, there may be implied semantics that for example buildings can contain numerous devices with individual IP addresses, while the reverse may not occur (one IP address shared across devices in separate building).

As a consequence, an embodiment of the invention is able to determine a (potentially partial) Building-to-IP mapping, which can be used to map high-level testing properties (1955) and the corresponding low-level testing properties (1960) into different rules matching the low-level access policy rules (1910) (not depicted in FIG. 19). The testing algorithm could then test IP-to-IP rules both on the access policy side (left-side of FIG. 19) and the testing properties side (right-side of FIG. 19).

While such an approach may be workable in some cases, it may not be workable in other cases. For example, the approach is more likely to be workable in cases where there are known 1:1 mappings between mapper inputs and outputs, while it is harder in cases where there are n:1 and 1:n mappings, or where when the known inputs are incomplete or unknown, and/or where outputs are dynamically calculated/changed.

In general, it would also be possible in some cases (depending on the data and the mapping semantics) to calculate a reverse direction of a mapper service, for example by inputting every possible input (e.g. org unit) and storing the output (e.g. sites), and then using the output data to create a new (reverse) mapper service, e.g. Site-to-OrgUnit, or Site-to-State which can be used to find a better match (e.g. the mapper chain OrgUnit-to-Site-to-State-to-County-to-IF, which would map high-level testing properties to low-level IP-to-IP testing properties).

The following known subject areas known to those skilled in the art are used in an embodiment of the present invention: "Artificial intelligence" is a broad term with many approaches applied when a machine mimics "cognitive" functions that humans associate with other human minds, such as "learning: and "problem solving", and includes automated inference systems to emulate human "inference" (often based on "pattern recognition" or "pattern matching", act of checking a given sequence of tokens for the presence of the constituents of some pattern). Evolved from pattern recognition and computational learning theory in artificial intelligence, "machine learning" involves approaches that can learn from and make predictions on data. "Data analytics" involves many approaches for inspecting, cleansing, transforming, and modeling data with the goal of discovering useful information, suggesting conclusions, and supporting decision-making. If datasets are very large, varied, rapidly generated and processed, inconsistent, and of varying quality, "big data" approaches are used (e.g. Google MapReduce). There are also "graph databases", which use graph structures for semantic queries with nodes, edges and properties to represent and store data. A key concept of the system is the graph (or edge or relationship), which directly relates data items in the store. For all these terms, tools and approaches exist.

Those skilled in the art in the fields of artificial intelligence, pattern recognition/matching, machine learning, (big) data analytics (and related areas, collectively simply referred to as "AI" unless a distinction is needed) will appreciate that many of the steps described in this specification can be implemented using those fields' approaches. For example:

Mappers are parts of a graph that includes edges (e.g. stored in a graph database), and AI is used to infer mapper chains, e.g. by connecting inputs and outputs. Attributes can be considered nodes mapped by mappers.

Data (e.g. imported data, mapper data, attribute data etc.) is stored in a big data store, maybe based on a database that supports unstructured data. This allows rapid analysis of large data, and easy extensibility Data is enriched: Data is analyzed using AI and knowledge is created, esp. by machine learning, inference and pattern recognition/matching. For example, if a data item states "hostname X has IP address Y", and another data item states "hostname X hosts personally identifiable information (PII)", then a (trivial example) knowledge would be that IP address Y likely relates to PII. Using AI tools, embodiments of the present invention automate such processes, and also support statistical learning of patterns that allow predictive "guessing". AI learning usually improves with the size of the dataset available for training.

Data is calculated for example for new mappers: This data and the knowledge gathered from/about it is then used to automatically determine mapper services. For example, an importer imports network traffic logs and another importer imports middleware traffic. The data is aggregated in a way that relates nodes and arches in the network traffic with nodes and arches in the middleware traffic. Taking for example the OMG DDS middleware (omg.org/dds), it is not obvious to determine the relation between the two, because DDS picks a publisher (sender) network port more or less randomly. However, the subscriber (receiver) port is selected based on a known calculation, and the communication "topic" is also known. As a result, the invention is able to calculate from the network traffic flows which publisher ports relate to which topics. Learning from that data (using AI), the invention is able to determine for example that there is now data available for a mapper service that (in this example) maps between DDS Topic-to-IP&port.

Data is calculated for example for reverse mappers: Taking the example of the abovementioned reverse mappings, embodiments of the invention can store data mappings in a data store (e.g. big data store, graph database etc.). Based on the data, and potentially taking gathered knowledge/patterns into account (e.g. particular semantics, such as there can be several ports per IP instance but only one IP per port instance), the invention can automatically offer a reverse mapper. The invention also learns (using AI) which mappers and reverse mappers are viable (e.g. only those that involve static information).

Policy inference: The invention learns from policies over time and uses AI to produce predictive policies based on the learned knowledge (e.g. recognized patterns). In a preferred embodiment, the user is "in the loop", e.g. the policies are presented to the user for verification and/or further editing. In other cases, the "learned" policies are automatically used by the policy management system.

Incidents: Similarly, embodiments of the invention can also learn the relevance of incidents, for example in the context of the policies managed by the policy management system.

4. Policy Simulation and Continuous Testing 4.1. Test Suite

Which of the following features should be used or not depends on how available and reliable the information sources used as inputs for testing are:

1) Combinatorial Array:

Prior art (e.g. the above-mentioned NIST ACPT) includes features to create a "test suite" for a particular policy: In ACPT, a combinatorial array is used to generate all possible access requests. A combinatorial array is an array that essentially includes all possible combinations of values covered by the axes of the array. In ACPT, these requests are sent to an access control policy decision tool (equivalent/similar to the ones used in an operational environment, e.g. an OASIS XACML policy decision point, cf. oasis-open.org/committees/xacml), and the results are collected. The results can then be compared with the results calculated by the formal testing (based on the same combinatorial array). Any discrepancies indicate errors in the access control policy decision tool.

In the context of policy testing, "combinatorial array testing" may include many test cases that will not occur in the system in question. For example, assume there is a distributed 15-node interconnected software application that is hardcoded to only have 40 particular interactions, and that the access policies to test are about node-to-node communications. In this case there is no need to test 15*15=225 combinations of source and destination node, but only the 40 that are assumed to ever actually occur (which may not be a good assumption in some cases).

2) "Replaying" the Functional System Behavior:

Prior art (as for example implemented in the inventor's OpenPMF product) allows for example the importing of network traffic logs (and the selection of certain traffic characteristics). After a "training run" where the data is collected for a period of time, the result is a set of the abovementioned 40 possible interactions. It is also possible to collect the sequence of the interactions from the same logs. Such a detected "functional system model" can be used to "simulate" (i.e. replay) the system aspects relevant for testing, and thus replace the combinatorial array used for testing, potentially significantly reducing the number of tests to be carried out (provided there is confidence that the test suite is sufficient/complete for the purpose).

In other words, an embodiment of the present invention ingests information about the running IT landscape and its behaviors, such as for example ingested and timestamped interactions between systems and applications. This allows "replaying" the relevant aspects of the functional system environment for testing purposes. This replaying will yield sets of functional system attributes that can be used to formulate and run the test suite closer to the actual observed behaviors of the functional system environment (e.g. certain patterns of events, such as order or repetition).

3) "Replaying" the Policy Implementation Behavior:

Furthermore, it is possible (in a simulation mode) to deploy runtime policy decision points (PDPs) in a way where no access policy decisions are actually carried out—instead, the PDPs collect a record of each access request together with their decisions—on the running functional system environment (e.g. attributes going into access requests, and decisions made, with timestamps/ordering). These records can be aggregated together with other information sources such as for example network traffic logs, to form the input into the test suite (i.e. replacing the abovementioned combinatorial array). This feature may be particularly useful in use cases where there are more than one PDP (e.g. a PDP on each to-be-protected system).

In other words, an embodiment of the invention obtains information from the policy decision points (PDPs) of the running access control implementation across the functional environment: PDPs provide alerts back to the central policy manager, which communicate functional system attributes in a consistent form together with the decision (and timestamp etc.). The invention collects and cross-references those attribute values and, as a result, can "replay" the access requests and decisions within the context of the running functional system (of systems) (and analyze/mine/infer mappings).

In summary, while option 1) tests based on an exhaustive array, options 2) and 3) tests based on imported content, incl. actual access requests and decisions across the functional system environment:

Calculated test suite based on imported content: An embodiment of the invention tests properties for the test suite based on particular user-configurable selections (subsets) of imported information (esp. functional system attributes). This could be beneficial because the test suite may be much smaller than a combinatorial array, and/or may include additional semantics such as sequence ordering.

Actual access requests and decisions: An embodiment of the invention collects and imports actual access requests and decisions done across the functional system environment, and uses these for developing a test suite. In other words, the access requests are not "triggered" by a testing tool, but rather "triggered" by the actual running system and imported. It could for example be used to verify that the decisions coming back from "isolated" policy implementation testing (within a testing tool) match with the decisions coming back from the policy implementation on the actual running functional system environment. This can for example be implemented by changing policies such that actions are changed to record the event with all its event information. This action could be added to the existing action(s) (e.g. allow/deny) if the policy should be enforced, or the action could replace existing action (s) if the policy should not be enforced during recording (e.g. for "what-if" and "before/after" analysis).

4.2. Simulation

An embodiment of the invention simulates and analyzes the impact of a policy implementation on the functional system environment, without the need to actually enforce the policies:

New policies: By "simulating" the impact of the new policy implementation (e.g. blocking certain access requests) based on the imported information, this feature allows users to analyze the potential impact of new policies on the replayed ("simulated") functional system environment (compared to the functional system environment without the implementation of the new policy). This can be done without actually implementing the policy (and potentially causing unintended behaviors of running systems)—instead, a "simulated" policy "overlay" is calculated over the (for example imported) functional system environment and tested, for example by replaying the functional system description and/or policy decisions.

Policy changes: Analogously, the impact of policy changes on the functional system environment can be analyzed Functional system environment behavior over time: This feature allows users to analyze policy behavior and impact over time. An embodiment of the invention supports "breakpoints" in the "simulation" states and "stepping through" the simulation states step-by-step (similar to stepping through software source code with a debugger, see en wikipedia.org/wiki/Breakpoint). This allows users to (for example visually) observe which access policy rules are "triggered" at a breakpoint (or a step), and also test properties against the particular examined state. The user interface updates automatically after each step or breakpoint to visually present the results.

4.3. Continuous Testing & Reporting

The described features be used either in a "training mode" where the system collects information for testing in bulk, or can be used for continuous (near real-time) testing of properties across the running system.

In an embodiment of the invention, continuous testing is carried out automatically in the background. This includes:

Transparently verifying properties: during the policy authoring process, and providing notifications only if any of the test properties are false. This way, testing is completely hidden from the policy author (once the test properties are authored).

Continuous roundtrip testing: This executes the features described in this section "4. Policy simulation and continuous testing" automatically on a continuous basis, providing insights on an ongoing basis.

4.4. Reporting/Documentation:

Based on the features described in this section "4. Policy simulation and continuous testing", an embodiment of the invention also automatically generates reports, especially about the impact of policy implementation. For example, the invention can generate a documentation (natural language or other, incl. visualization) of the test results and/or the functional system description used to calculate the test suite.

5. Decentralized and Orthogonal Management of Policy and Trust

Policy management, enforcement, evidence collection, monitoring, and analysis needs to support decentralization for some use cases—for example for additive manufacturing ("3D printing"), where numerous stakeholders work together with no central control. In addition, in many cases different aspects of overall security and data protection policies are handled by different departments and administrators and are governed by different regulations.

5.1. Centralized Vs. Federated Vs. Decentralized Vs. Orthogonal

Centralized Policy Management Trust:

Many policy management systems assume central ownership of policies, for example by the IT security department of an organization. In such cases, policies are managed by the IT security department, and deployed across the (potentially many) to-be-protected systems. Users may impact the policy by self-service mechanisms, but there is still only one stakeholder responsible (the organization).

Federated Policy Management Trust:

Federated policy management extends policy management across several federated stakeholders. Examples include federated identity management and federated authorization management (sometimes called "authoriZation-based access control, ZBAC, see zbac.openpmf.com and hpl.hp.com/techreports/2009/HPL-2009-30.html). Such federation approaches are trusted because there are legal contracts between the stakeholders that regulate responsibilities between the organizations operating the federation infrastructure (e.g. authorization servers).

Decentralized Policy Management Trust:

Decentralized trust goes further by distributing the trust across stakeholders who have no legal contracts or common organization. A prominent example of decentralized trust is bitcoin, a cryptocurrency and a digital payment system which is open source. The system is peer-to-peer, and transactions take place between users directly, without an intermediary. These transactions are verified by network nodes and recorded in a public distributed ledger called a "blockchain" (see en.wikipedia.org/wiki/Blockchain_(database)). Since the system works without a central repository or single administrator, bitcoin is called the first decentralized digital currency. In other words, there is no central or federated ownership of the system or the currency. An embodiment of the invention adapts several aspects of bitcoin blockchain to policy management, thus creating decentralized policy management trust. In particular (but not limited to):

- Decentralized logging/storing: Blockchain networks can be used to log any kind of information distributed, used or collected by the policy management system, for example alerts, incidents, actions, decisions, evidence, sensor/device readings, status/state readings etc. The blockchain could store the full information (potentially encrypted). Note that the full data does not always have to be stored (esp. if records are large). For some use cases, a cryptographic hash of the data with digital signature would suffice: It would prevent record producers from altering or deleting evidence after the fact without such fact being noticed. For example, if an organization wants their log entries (e.g. some evidence) to be tracked decentralized, for example to gain the trust of the public, it could operate blockchain nodes, and allow external parties to also operate blockchains within the blockchain network. Signed hashes added to the blockchain would propagate to these external parties and will be tamper-proofed by the blockchain's inherent block chaining mechanism.
- Decentralized tracking: Blockchain networks can be used to track transactions, policy information/attributes, actions, events, policy decisions, timing, sequencing etc.
- Decentralized transaction processing: Blockchain networks can be used to track atomic transaction completion (e.g. that all events that make up the atomic transaction completed), workflow completion, actions/events across multiple stakeholders etc.
- Decentralized non-repudiation: Blockchain networks can be used to track actions/events in a way that cannot later be repudiated.
- Decentralized distribution: Blockchain networks can be used to distribute information, such as information involved in policy distribution, attribute value distribution, token distribution (incl. identity tokens, policy tokens, authorization tokens etc.), authorization decision distribution and tracking, actuator/device writings, state/status updates etc.

In summary, an embodiment of the present invention uses blockchains as a decentralized, trusted mechanism to collect, store track, tamper-proof, and/or distribute information.

4) Orthogonal Policies:

Overall security and data protection policies enforce different security objectives, for example the organization's overall security policy, the department's security policy, individual protection of assets defined by the owners of the assets, but also regulatory policies like compliance or data protection policies. The complete life cycle of these policies, from policy definition to analysis of log and audit data, is handled by different administrators. In many cases, it is necessary to merge and deconflict such individual policies into one overarching policy.

5.2. Example Embodiment: Decentralized Trust for Additive Manufacturing

Background:

Additive manufacturing changes the manufacturing supply chain, bringing manufacturing processes closer to the buyer/user, and adding a myriad of outsourcing opportunities and complexities. This changed manufacturing environment results in loss of control over print specifications, print authorization, print quality, product authenticity etc.

Solution:

An example embodiment (referred to as "AMTUST" throughout this document) involves: (1) fine-grained security policy management to the specification process, which determine cryptographic authorization tokens to restrict access to the specification, to add provenance information to the specification (incl. digital watermarking), to ensure specification authenticity, and allowing independent verification; (2) printer device authentication and granular access policy enforcement, incl. by printer, printer kind, operator etc., and allowing independent verification; (3) printout quality validation during printing in a way that is independently verifiable; (4) physical watermarking, using material watermarking and 3D barcoding; (5) tools and processes to let all involved stakeholders cryptographically verify decentralized (e.g. using blockchain or similar approaches) item authenticity/provenance and Q&A results, specification authenticity/provenance, access authorization to the specification, printer, materials etc.

AMTUST embeds fine-grained, contextual authorizations and other policies (incl. provenance and usage) into specifications, using the innovative combination of "attribute-based access control" (ABAC see abac.openpmf.com) and cryptographic authorization tokens (for "authoriZation based access control", ZBAC see zbac.openpmf.com). Through this combination it becomes possible to author rich, granular, and flexible policies, to distribute those policies cryptographically secured between trust domains (between stakeholders), and cryptographically verify authorizations (and other policies) using decentralized mechanisms. The result is that stakeholders involved in additive manufacturing can configure granular, rich policy settings, and be assured that this policy is implemented. This innovative combination of ABAC and ZBAC with blockchain approaches (or similar) facilitates decentralized policy management and trust.

AMTUST cryptographically chains together the full trace of evidence across the processes and stakeholders of the additive manufacturing chain. Such evidence includes for example provenance certificates/fingerprints/watermarks, authenticity watermarks, authorization tokens, usage evidence, proof that QA was carried out etc. AMTUST ties together evidence across the digital part (specification) and for the physical part (embedded processing and printing). The result is that provable evidence is available for every step in the entire trace from the specification through the printer to the finished item. Furthermore, the process supports decentralized, independent verification of the evidence in a way that is cryptographically tamper-proof.

To close the loop, AMTRUST includes in-process validation of the machine UID, tool specification, material attributes and origin, and part serialization in the form of embedded barcoding or alternative forms of material signatures on or within the final artifact. AMTUST also ensures material validation through optical registration of a code printed on the material spool. Also, digital watermarking and QA reporting features will include data pertaining to the material used along with the specific machine UID used for processing.

Furthermore, post-process scanning (magnetic or X-ray) is used to verify the embedded material signatures and/or barcoding non-destructively.

Figure 20:
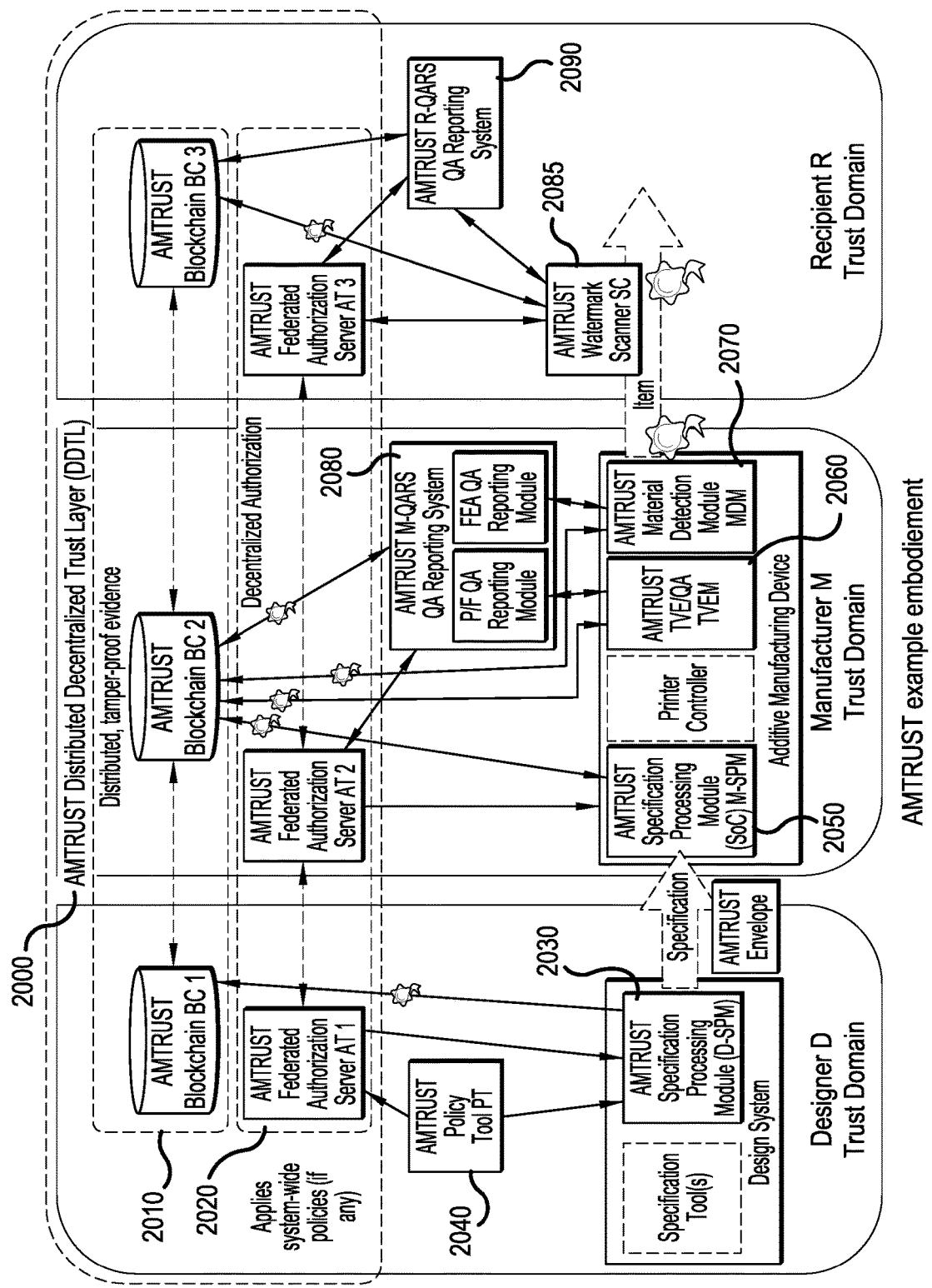
FIG. 20 illustrates a system for decentralized trust in the exemplary context of additive manufacturing, i.e. additive manufacturing trust (AMTRUST) according to an embodiment.

FIG. 20 shows AMTUST for a very simple manufacturing chain example across three stakeholders (from separate organizations, i.e. separate trust domains: a specification "Designer" (D) (left), a "Manufacturer" (M) (middle) and a "Recipient" (R) (right). The bottom half shows the manufacturing related systems and the various AMTRUST adds. The top half shows a "Distributed Decentralized Trust Layer" (DDTL). The components of the AMTRUST embodiment of the present invention are:

"Distributed Decentralized Trust Layer" (DDTL) (2000) provides several overarching features that are used by the AMTRUST components in the bottom half of the diagram: (1) "AMTRUST Blockchain (BC) (2010) provides a solution to ensuring for storing, retrieving, and linking a full, cryptographically linked trace of tamper-proof evidence across all stakeholders. Blockchain technologies decentralize trust and avoid central control, and increase assurance because there is no central point of failure. For commercial use cases, this approach increases trust because there is no single entity that everyone needs to trust. The blockchain approach ensures that evidence, once stored, cannot be tampered with by anyone. Furthermore, all evidence is individually cryptographically protected and signed, and linked for each step across the manufacturing chain—this way it is possible from any one piece of evidence (and especially from the watermark scanned by the item recipient) to trace evidence for that particular manufacturing business process across the entire manufacturing chain with a high degree of confidence. (2) "AMTRUST Federated Authorization" (FA) (2020) ensures that system-wide policies can be enforced across stakeholder boundaries, for example using ZBAC with ABAC, and combined with MDS (see MDS1 and B-MDS patents). ZBAC with ABAC allows the ecosystem-wide enforcement of overarching polices, as well as the flexible enforcement of policies by each stakeholder in a way that supports dynamic/adaptive, granular authorizations, flexible and controlled authorization delegation etc. MDS adds policy automation to ABAC/ZBAC, so that policies can be specified in generic, human-intuitive ways, and automatically turned into the matching technically enforceable authorizations.

Designer Trust Domain (D):

The designer produces the digital specification for the item, and sends the specification with the AMTRUST "specification envelope" to the Manufacturer M. The "Designer AMTRUST Specification Processing Module" (D-SPM) (2030) is installed on the designer IT system (potentially on a System on Chip to be hardened). The D-SPM adds AMTRUST features to the specification, and importantly, no other AMTRUST modules will accept the specification unless it has been processed by the. The D-SPM adds cryptographically protected and signed data to the specification as a cryptographically protecting "AMTRUST Envelope", incl. e.g. digital watermarks, cryptographic signatures, designer identity, authorized manufacturer identities (or roles, attributes, contexts etc.), specification provenance/authenticity, policies applied, specific instructions related to the specification etc. The D-SPM furthermore sends the information to the BC and adds cryptographic references to the information to the specification envelope. Information about any distribution Furthermore, an "AMTRUST Policy Tool" (PT) (2040) is a policy management device that allows designers to add specific (security and other) policies and instructions to the specification—in addition (and within the constraints of) to the above-mentioned organization/ecosystem-wide policies automatically applied. The applied policies are obtained from the local FA server as authorization tokens, which can be easily passed on with the other evidence in the specification envelope, and can be stored in the BC for future reference.

"Manufacturer Trust Domain" (M).

The manufacturer operates the additive manufacturing machinery. In the depicted example, the Manufacturer's additive manufacturing device directly includes a hardware module, the "Manufacturer AMTRUST Specification Processing Module" (M-SPM) (2050), for example implemented as a system on chip (SoC) (FPGA etc.) and inserted in the communication path between receiving the specification and passing it to the printer controller. In other lower-assurance embodiments of the present invention, the M-SPM is a separate desktop computer that staff uses to prepare the specification for printing. M-SPM checks the envelope validity/integrity and its contents (e.g. for specification authenticity, provenance, integrity). It also checks the policies provided through the authorization tokens (AT). Thanks to ZBAC federation approach (akin to federated identity servers, but for authorization tokens), M-SPM does not need to call D's AT server to check the token is valid. Instead it checks with M's AT server, which has a federation agreement with M's AT server that includes legal contracts for liability, costs, charging etc. Policies include authorizations & access policies (e.g. only certain printers, manufacturers, contexts, times, materials, and numbers of prints etc.). If M is authorized to print the specification in the specific context, M-SPM automatically calculates a suitable watermark using cryptographic hashes and watermarking approaches to embed unique references (or even information about the full manufacturing trace) into the specification in a way that cannot be forged/guessed/tampered with. After that, M-SPM passes the unwrapped specification to the printer's Printer Controller, and the item is printed. The M-SPM itself also ends evidence back to the BC about which specifications have been processed and what the result was.

During the printing process, the "AMTRUST TVE/QA Module" (TVEM) (2060) automatically monitors the quality of the printout, and the "AMTRUST Material Detection Module" (MDM) (2070) automatically monitors that the material is the one requested by the specification envelope (based on information provided by M-SPM via an encrypted channel). Both TVEM and MDM store evidence back into BC for future reference, and also provide the information to the "AMTRUST Manufacturer QA Reporting System" (M-QARS) (2080). M-QARS includes at least a "P/F QA Reporting Module" and an "FEA QA Reporting Module", which allow the manufacturer to deal with QA issues. Furthermore the M-QARS tool allows AMTRUST to monitor and enforce the business processes involved in QA: For example, information confirming that the information coming back from TVEM and MDM have been checked by staff, and—if QA was not met—the item was reprinted until it met the QA requirements. The information collected by M-QARS is fed into BC for future reference (and M-QARS draws on information stored in BC to determine any anomalies).

Access restrictions are enforced for all AMTUST manufacturer components (M-SPM, TVEM, MDM, and M-QARS) via the manufacturer's AT server.

Recipient Trust Domain (R):

In an embodiment of the invention, the recipient wants to assure the provided item can be trusted. The recipient uses the "AMTRUST Scanner Module" (SM) (2085) to read the watermark using a suitable technical method (x-ray, barcode or other), and sends cryptographic evidence about the scanning event to BC for future reference. SM also sends the scan results to the "Recipient AMTUST QA Reporting System (R-QARS) (2090), a frontend that allows the recipient to assess the full trace of information both in an automated way ("does the item meet its requirements? Y/N") and in a drill-down manual way where browsing the full evidence in detail is supported. Because use of SM and R-QARS may be restricted, both modules will control access based on tokens verified by their local AT server.

5.3 Orthogonal Policy Management Example Embodiment: Security and Data Protection in Police Intelligence Background:

In order to efficiently fight crime and terrorism, a new generation of policy IT systems are needed. These systems, which will also be used for predictive policing, have to integrate, store and process data from many sources, for example from traditional, siloed police systems, other government data bases, communications and transportation systems, social media and so on. Because of the high criticality and sensitivity of the data and the analytical power of these systems, in additional with a quite broad access not only from analysts with high clearance in restricted environments, but also from a high number of police officers on the road in patrol cars, the protection of such systems is a challenge. On one hand, highly critical information and functionality has to be protected from inside misuse and outside attacks, on the other hand, the security enforcement must not be an obstacle to the legitimate use of the system. In addition, the system has to be conformant to data protection and compliance regulations.

Solution:

In a policy intelligence analysis system, there are for example the following sources for the overall security and data protection policies:

1) Organization Wide Security Policies:

These policies include for example that only authenticated and authorized personnel are allowed to access the police organization's IT systems and that all relevant actions or the users shall be logged and audited to detect internal misuse and penetrations from the outside. They also regulate how information is shared with other organizations.

2) Department Security Policies:

These policies define the default security rules for a department and specific user groups. They define for example that case officers have access to all case data, while on the other hand, strategic analysts do not have access to detailed case data, like names of suspects or witnesses. These limits might also include a modification/redaction of data. For example, strategic analysts are not able to access the exact addresses or birth dates of individuals, but only see geographical regions or age groups.

3) Team and Individual Security Policies:

Teams and individual analysts want to define for example which information they are willing to share with others, and which information has to be specifically protected above normal protection levels. This includes for example a specific protection of secret informers or covered actions. If data is tagged as information from a secret informer, it is only accessible to the officer handling this informer. If another officer is trying to access the data, for example as part of a database query, a silent alarm can be raised and a notification is sent to the officer in charge of the information/informer.

4) Data Protection Policies:

Data protection policies define and enforce a state's mandatory data protection regulations. Such regulations mandate for example that information obtained for a specific purpose can only be used for this purpose, but nothing else (purpose limitation) or that data has to be deleted after a specified time span.

These different and orthogonal aspects of the overall security and data protection policy are defined by different administrators within the organization or are based on policy templates from third parties, e.g. for data protection policies enforcing the regulations of a state. The different administrator can only access, define and edit their specific policies, using a policy GUI with user management and access control.

The aspects can have different priorities, and describe subsets of a complete security policy protecting all individual assets. The complete security for an individual asset is generated by merging of all aspects relevant for this asset.

The policies are defined/modeled at a high level, in operational and legal terms, and analyzed. This analysis includes the detection of conflicts under consideration of the priorities, and it is automatically (based on overall rules) or manually decided how conflicts are resolved. For example, department security policy cannot grant access to data if this is forbidden by an organization wide policy and the overall policy always has to be conformant to the data protection regulations, otherwise the system cannot legally be used.

An embodiment of the invention, which also uses model-driven security (MDS, see MDS1) carries out the following steps (the order of some steps can be altered):
Reads all high level policies
Reads the functional description of the system, esp. the description of the assets
Iterates through all assets and collects all relevant policy aspects
Analyses for each asset whether the aspects to enforce are in conflict
Automatically resolves conflicts based on policy priorities and/or raises a notification to a human administrator to resolve the conflict
Sums up and merges the relevant parts/rules for the individual assets
Generates the full policy implementing all aspects for each asset The result of this process is a monolithic, overall security policy for the system as a whole, similar to security policies of the state of the art. In an embodiment, all steps of the above described process are logged in detail for audit purposes.

Figure 29:
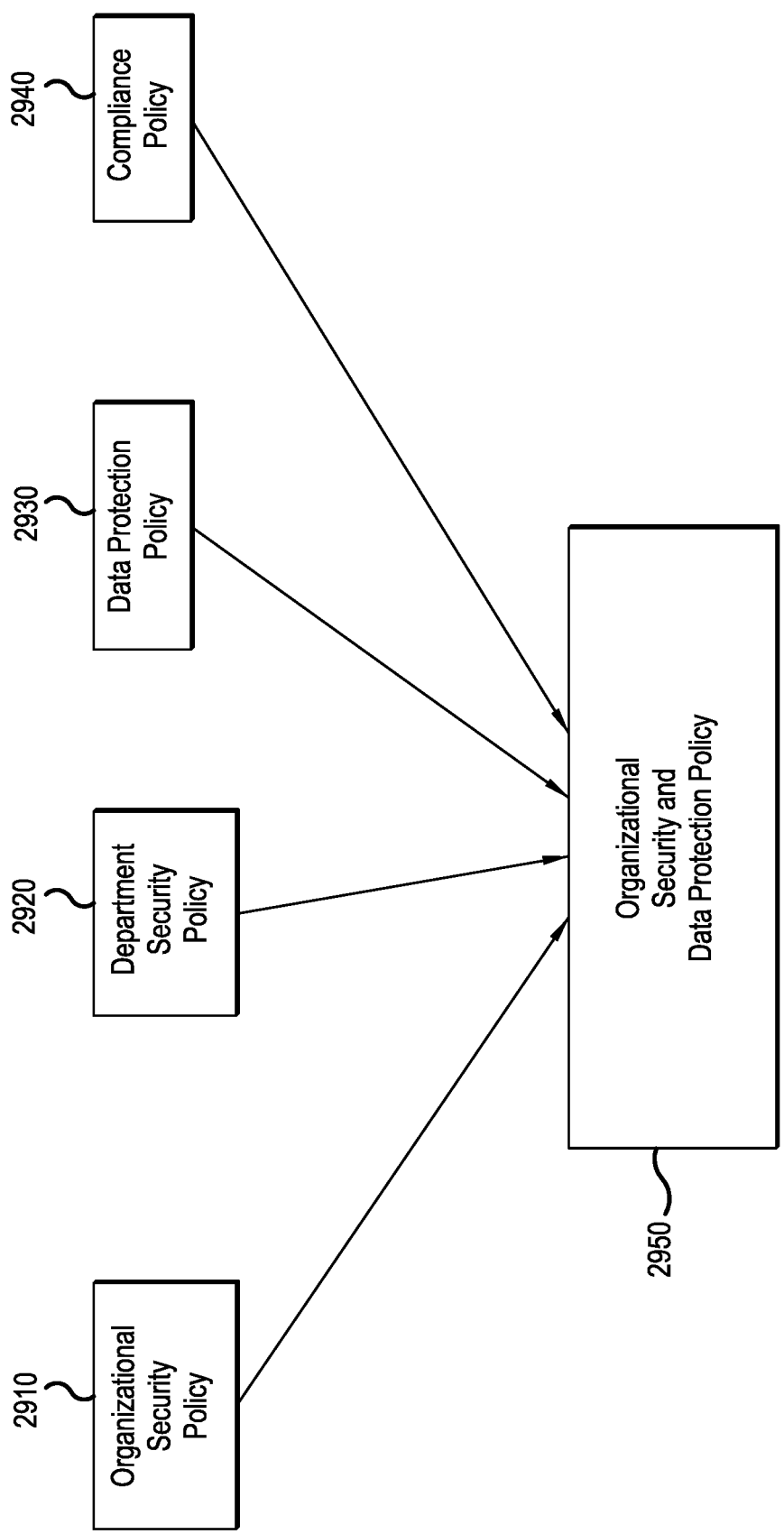
FIG. 29 illustrates an example of orthogonal and merged policies according to an embodiment.

FIG. 29 depicts exemplary orthogonal policies processed by an embodiment of the present invention: An organizational security policy (2910), a department security policy (2920), a data protection policy (2930), and a compliance policy (2940) are read, collected, analyzed, resolved, summed up, merged, and generated into one organization security and data protection policy (2950).

The high level security and data protection rules are then, using Model Driven Security (MDS), transformed to the low level, executable rules for the different enforcements mechanisms and technologies. This transformation transforms the rules for a specific aspect to rules for a specific Policy Enforcement Point (PEP) and Policy Decision Points (PDP). These PEP and PDP can be integrated into the call chains, like in the state of the art, but are in some cases implemented as services, for example to encrypt/pseudonymize/anonymize data in a database The transformation also includes an analysis whether the rules can be successfully enforced, for example whether an appropriate mechanism is available or whether low level rules are in conflict with each other.

In addition, from both the high and low level policies, a human readable representation is generated, which can for example used for auditing the policies.

In standard access control systems, the access to an asset is intercepted and it is decided whether the access is allowed or denied. This is not sufficient for the definition and enforcement of complex data protection and security policies based on real world regulations and policies. Therefore, in the embodiment of the invention, policies are defined on flexible events and trigger arbitrary actions.

Triggers for policy execution are for example the access to an asset, as before, but also for example specific points in time, geographical areas or functional actions, like closing cases.

The actions triggered are, for example, but not limited:
Allow/deny of access
Modification/redaction/pseudonymization/anonymization/encryption of data at rest and in transfer
Deletion of data
Logging and notification In addition, the embodiment of the invention supports the setting/modification/deletion of states in the policy execution and using this state in further decisions, and the execution of complex arbitrary calculations for decisions.

The combination of arbitrary triggers and actions allows the definition of policies required by real world security and data protection requirements, for example:
Anonymize/pseudonymize/delete related information X years after a case is closed.
Protect data from secret informers and notify case officer if the data is touched somehow, e.g. in a query.
Partially encrypt data from video streams after X hours.
Delete data if a device leaves a specific geographical area.

A big challenge in the enforcement of access control policies for security and data protection policies is the fact that it is not always clear in advance what is proportional and legitimate, to formally describe all potential situation and rules, and to enforce them. Therefore, in this application domain's use case, it is often more appropriate to implement more relaxed access control policies, in order to not disturb the legitimate use of the system, but to log all relevant actions of the users. This allows auditors, both inside an organization and from a third party, to audit and challenge the actions. If an action cannot be justified, then disciplinary actions can be taken. While this works fine for normal users, it is not sufficient to detect misuse by system administrators, because they are able to modify or delete audit files, in order to hide the illegitimate actions.

In order to prevent this, an embodiment of the present invention includes hardware that implements a second trust domain tightly integration with the functional system. This trust domain can for example be implemented as a System on a Chip connected over a bus to the functional system, and is not accessible by the system administrator.

The second trust domain provides:
Secure storage of log data-driven
Encryption and decryption of data
Generation of security tokens, for example for access control All cryptographic operations are logged in the second trust domain, the keys are also stored there, and are not accessible to the system administrator.

The second trust domain is installed in a way that it cannot be removed/switched off without shutting down the complete system. Switching off the transfer of events is possible, but cannot be done without detection. This allows the establishment of a high level of trust in the stored logging data.

6. Supply Chain Risk Analysis & Management

Supply chains introduce potential risks into procured products, including IT products. Most IT products are assembled from many parts, which come from many suppliers. Such risks can be lack of quality/Q&A (e.g. counterfeit parts), hidden malware (e.g. kill-switch or backdoors in hardware). Supply chain risk analysis and management is therefore an important activity. Because it involves complex analytics on complex data, there is a need for a supply chain risk analysis and management system (referred to as "SCRAMS" throughout this document). The following describes an embodiment of a SCRAMS system in two parts (implementation overview and architecture overview):

6.1. Example Embodiment: Implementation Overview

Figure 21A:

FIG. 21A illustrates a metamodel of an embodiment of the invention. This metamodel data structure can hold suppliers and items, and their relationships (for example using Eclipse Modeling Framework, EMF). The metamodel becomes clearer when looking at the example data model (FIG. 21B) for a fictitious, simple supply chain for procuring a SCRAMS solution.

Figure 22A:
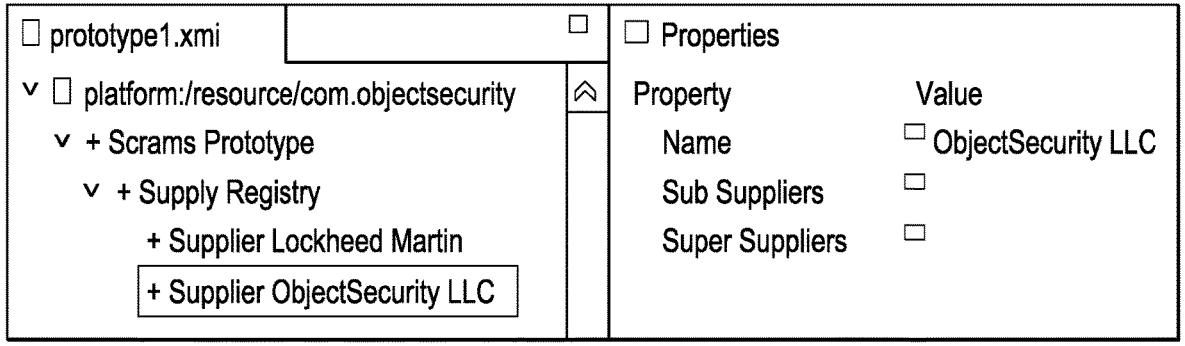

In this input model (which shows simplified example data of what may be discovered from an ERP and procurement systems), suppliers are registered, but—as shown for one supplier in FIG. 22A—the system does not specify who is above or below in the supply chain.

Figure 22B:
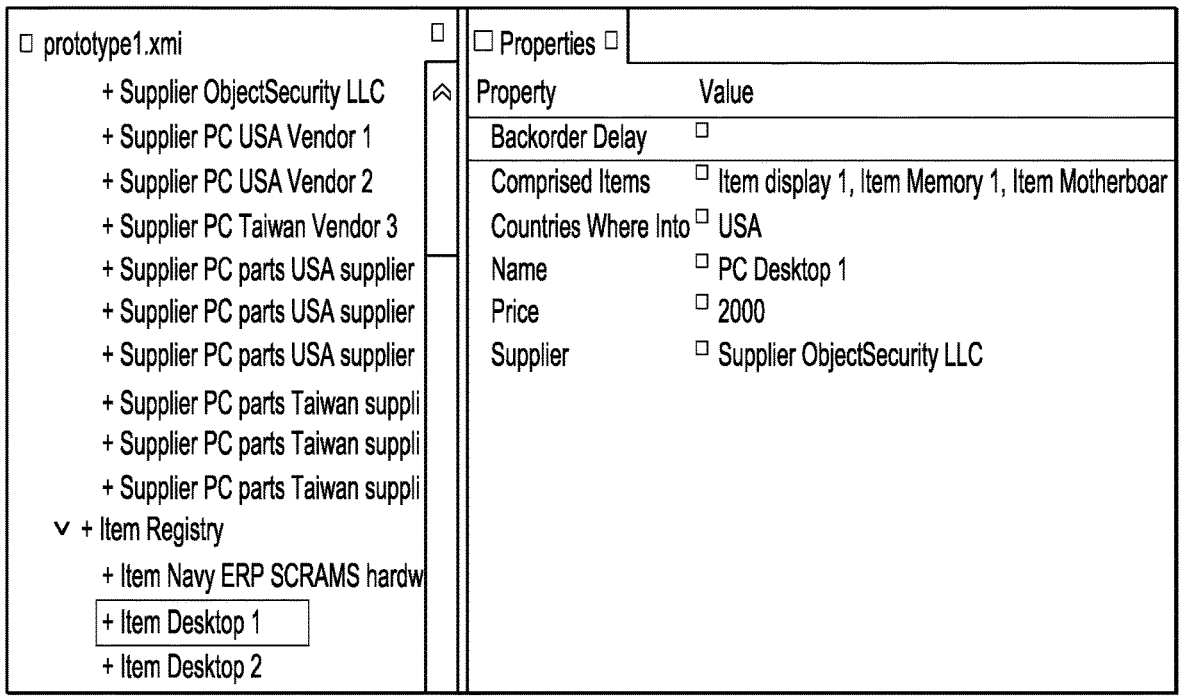

Item records, on the other hand, are assumed to contain data about who the supplier is. In the example displayed in FIG. 22B, ObjectSecurity is the supplier of "Item PC Desktop 1", as shown below. Item records also show the components ("Comprised Items") they are assembled from.

FIG. 22C illustrates trivial model transformation (written in OMG-QVT, a model-to-model transformation language provided in Eclipse) to automatically map the supply chain from the provided information. The code first restores the clean model, then autocompletes the manufacturer for each item, then autocompletes who supplies what, then figures out sub-suppliers aggregate, and then autocompletes who manufactures items for each supplier. FIGS. 23-1-23-3 illustrate show the exemplary console output documents every step the software illustrated in FIG. 22C runs through.

Figure 24A:
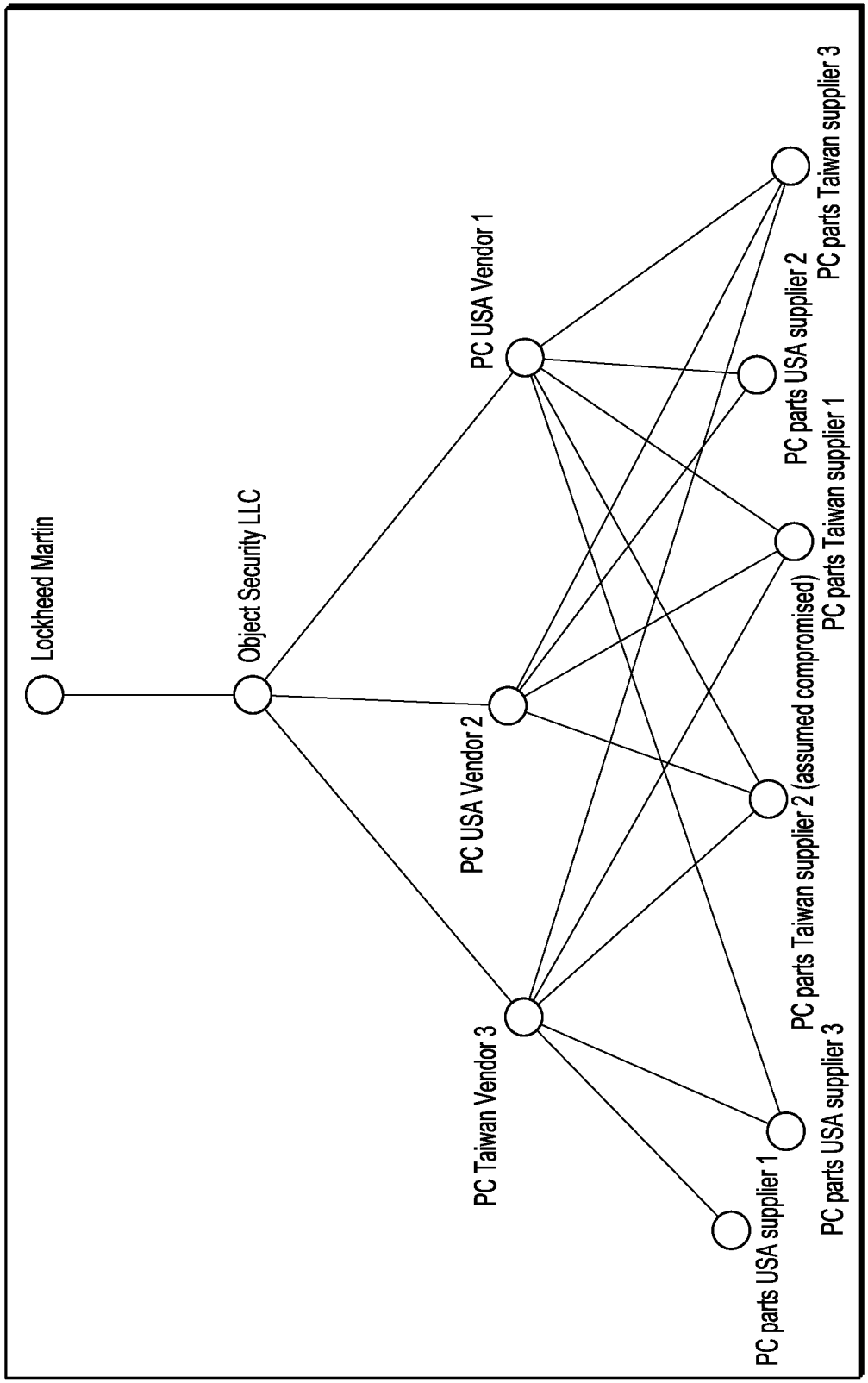

FIG. 24A shows a simple example of an interactive browser-based visualization (written in Xpand, a model-to-text transformation language provided in Eclipse) of the generated supply chain map. The exemplary Xpand file generates a larger HTML file that contains a JavaScript section with the interactive functionality (based on InfoVis, infovis-wiki.net) and an automatically generated JSON data section of the supply chain map taken from the data model (FIG. 22A)—the JSON structure is used by the JavaScript section to determine the actual interactive map.

One of the goals of an embodiment of the present invention is to detect anomalies in the supply chain. For example, the invention may use a simple anomaly detection example, where one of the suppliers provides some hard drives at a fraction of the price, but those are (for the sake of the example) assumed to be counterfeited. As shown in FIG. 24B (which displays the properties in the model), the original "Harddrive 2" by "PC parts Taiwan supplier 2" costs $300.

In our example, ObjectSecurity is buying several "PC Desktop 2" (see FIG. 24C for its properties in the model) computers for $2000 each for the SCRAMS solution from "PC USA Vendor 2" delivered to Lockheed Martin, and subsequently delivered on to the Government.

The exemplary anomaly detection algorithm (shown in FIG. 25A) calculates the average "normal" pricing of the desktop computer and all its parts (parts list provided by "PC USA Vendor 2" shown above) for each purchase. The metamodel (extended from the depiction in FIG. 21A) captures the pricing history for each purchase, and some exemplary purchase history—for the sake of simplicity, buying the same items 5 times—is generated (shown in the model output depicted in FIG. 25B)

The exemplary algorithm (illustrated in FIG. 26A) flags any deviation from the average, assuming prices are usually stable. The console output is displayed in FIG. 26B. More elaborate algorithms include for example heat maps, weighted averages, deviation over time, pricing from other sources etc. Algorithms can include checking for anomalies in item pricing or backorder timeframe for an item across several suppliers (or expected values from prior procurement experience). Thanks to the consistent data model, metamodel and data access layer, SCRAMS facilitates evolution algorithms.

In our example, a counterfeit "Harddrive 2" is now entering the supply chain for a fraction of the cost ($50), which is stored in the pricing history (and the cost savings is—somewhat unrealistically—passed on up the supply chain into any item that includes that hard drive. The updated pricing history is illustrated in FIG. 27A. The exemplary algorithm (illustrated in FIG. 26A) now flags the pricing anomaly in each item and on each aggregate in which the item is included (see FIG. 27B for the algorithm output).

6.2. Example Embodiment: Architecture Overview

Figure 28:
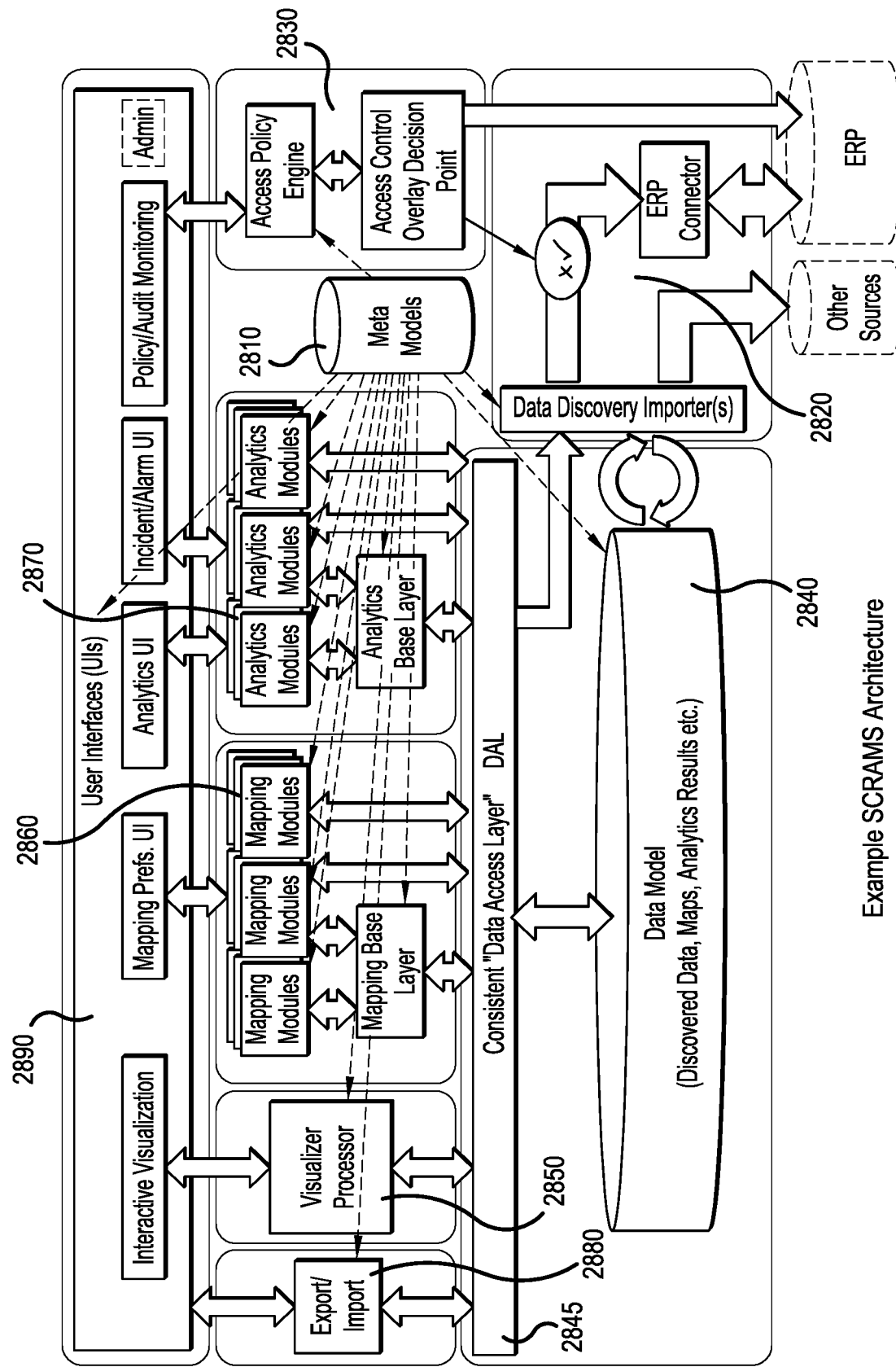
FIG. 28 illustrates a supply chain risk analysis and management system (SCRAMS) according to an embodiment.

FIG. 28 illustrates an exemplary high-level architecture of the SCRAMS system:

Metamodels (MM) (2810) are the semantic foundation of the SCRAMS system. MM specify the structure and semantics of all data in a rapidly customizable form that can be used by all other parts of SCRAMS. All components connected with dotted lines use the MM to understand the data in the DM.

The Data Discovery (DD) module (2820) discovers SCRAMS relevant data from various sources, including for example from Enterprise Resource Planning (ERP) systems through an "ERP Connector" module that abstracts the rest of SCRAMS from the particular ERP (e.g. SAP). "Other Sources" are also as needed (e.g. public sources about counterfeit, if available, e.g. from gidep.org). The "Data Discovery Importers" consume the discovered information and transform it (e.g. using flexible model-to-text (M2T) transformations, e.g. Eclipse XText) into the form specified by the MM, and store it in the SCRAMS "DM" (see below). This interaction can be continuous, and allows query instructions via the "DAL" (see below).

The Access Control Overlay (AC) module (2030) deals with the authentication and access control (e.g. for the role-based access control in ERP), and implements a fine-grained (e.g. attribute-based), contextual "overlay" that minimizes access contextually (least privilege). This increases security, if—in an embodiment—the AC module is implemented on a separate physical hardened host (or isolated on the same host, e.g. via virtualization) that acts as a policy-enforcing proxy. If the rest of SCRAMS gets hacked, this access control "overlay" will still be intact. Generic AC policies are managed in an intuitive UI, and are turned into technically enforceable rules using MDS1/B-MDS.

The Data Model (DM) (2840) stores all SCRAMS data in a consistent, consolidated form based on the MM, including: a rich supply chain map in the Data Model, historic information, anomaly results etc. Note that all the upper SCRAMS layers will only access information consistently through the consistent "Data Access Layer" (DAL) (2845). The DAL acts as an insulation layer from all the heterogeneous imported information to a common basis. This way, the algorithms (for analytics, policy generation etc.) can obtain this information in a consistent way. This allows gradually adding algorithm modules and importers. Without a common data model layer it would have been necessary to update the algorithms every time an importer is added. Thanks to the data decoupling by the DAL, the algorithms and importers can be built/maintained independently. SCRAMS includes similar more decoupling layers, to facilitate rapid evolution of the product as we discover more data and invent more analytics algorithms. For example:

- data metamodel is decoupled from all application code
- text-to-model importers decouple import syntax from data model, and metamodel of imported models is decoupled from the main metamodels
- model-to-text importers decouple export syntax from data model
- Data Discovery Importer(s) and DAL decouples imported heterogeneous functional data from the consistent data that is used by the algorithms
- technical access enforcement is decoupled from the policy metamodel via textual API
- the editor rendering is decoupled from the rest of the software through data metamodels and an editor Domain Specific Language (DSL)
- metamodels are isolated from each other through so-called "mapper metamodels" that act as a "metamodel API", indirectly referencing metamodel elements. This way it is possible to adapt several metamodels in isolation, as long as the mapper model is kept maintained. Furthermore, analytics algorithms can draw on all data through a single metamodel (by traversing through the mapper metamodel).
- etc.

The Visualization Processor (VP) (2850) continually mines the data in the DM to pre-process the interactive visualization of the supply chain map, e.g. using model-to-model transformations (M2M), e.g. in QVT, Java; supports "drill-down" into information, incidents etc.

The Mapping Modules (MP) (2860) continually mine (e.g. using M2M transformations) the DM via DAL to generate a rich, tiered supply chain map, and feed the map information back into DM (potentially involving many cross-references, as shown in the example implementation above). For rapid development and customization, MPs can draw on a "Mapping Base Layer", which contains common generic mapping features.

The Analytics Modules (AM) (2870) (continually mine (using M2M transformations) the DM via DAL to detect risks, and feed the results back into DM (so they can e.g. be visualized by the visualizer). Again, common features are provided by the "Analytics Base Layer" to support rapid development and customization.

Importers/Exporters (IE) modules (2880) import and export reports (ad other information) to/from report formats, e.g. MS Office/PDF/HTML etc., e.g. using model-to-text transformations (M2T). For example, also exports (and re-imports) SCRAMS-internal settings/preference information (e.g. stored analytics module configurations) based on user interactions.

The User Interfaces (UI) modules (2890) (for example an Eclipse RAP and MM based workbench) are automatically customized based on the user role (e.g. supply chain risk manager, contract specialist, admin, security admin, data modeler, power users etc.) and presents: interactive visualization, supply chain mapping preferences, analytics modules interactions, incidents/alarms, access policy management, admin, etc.

COMPUTER IMPLEMENTATION

Aspects of the disclosure are disclosed in the following description and related drawings directed to specific embodiments of the disclosure. Alternate embodiments may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the disclosure" does not require that all embodiments of the disclosure include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a wired access network and/or a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile device", a "mobile terminal", a "mobile station" and variations thereof. In an embodiment, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to cellular telephones, personal digital assistants (PDAs), pagers, laptop computers, desktop computers, PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the disclosure, it should be noted that various changes and modifications could be made herein without departing from the scope of the disclosure as defined by the appended claims. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated.

Example Computer Implementation

Figure 30:
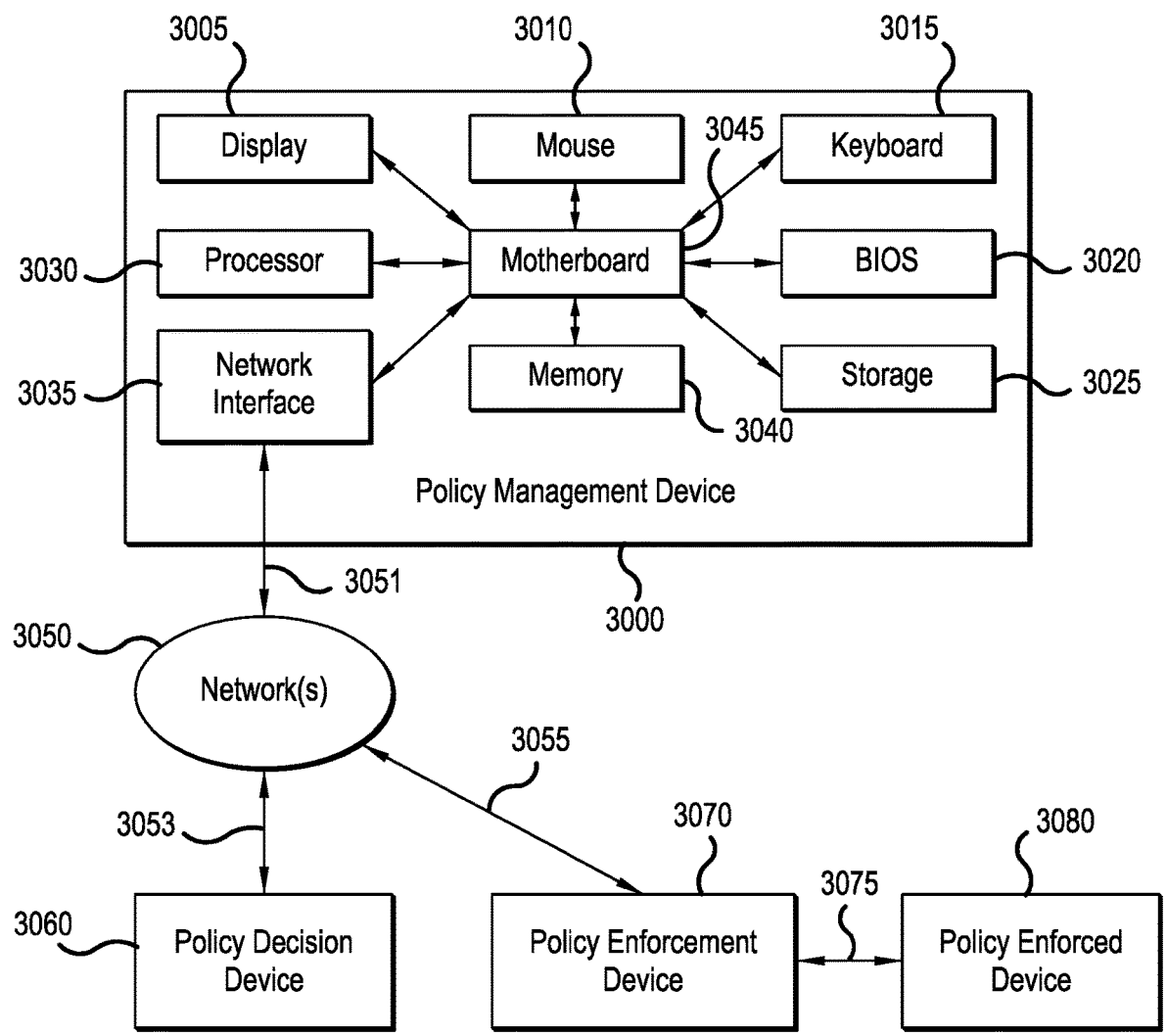
FIG. 30 illustrates a computer implementation according to an embodiment.

FIG. 30 is a block diagram that depicts a computer implementation of an exemplary embodiment of the present invention. A policy management device (computer) (3000) includes:
- a display (3005) for displaying information to a computer user, such as an external monitor, built-in screen, augmented/virtual reality headset, cathode ray tube (CRT) or liquid crystal display (LCD);
- a mouse (3010) for controlling cursor movement on display (3005) and for communicating direction information and command selections to processor (3030) is a type of user input device, which could be a mouse, trackball, cursor direction keys, touchpad, touch screen, gesture recognition device, motion detection device, electromagnetic wave body/brain detection device etc.;
- a keyboard (3015) for communicating information and command selections to processor, including alphanumeric and other keys is coupled to motherboard (3045), and could be combined with the mouse or separate, or could be replaced by a microphone in a voice/speech dictation device;
- a basic input and output system (BIOS) (3020) or other static storage device coupled to motherboard (3045) for storing static information and instructions for processor (3030) which executes on the policy management device;
- a storage (3025) for storing information and instructions is connected to the motherboard (3045), which could be a hard drive, solid state memory, magnetic/optical disk, flash memory, or other non-volatile memory;
- a processor (3030) for processing information and coupled with motherboard (3045), which could be a general purpose processor (e.g. Intel, ARM, AMD), a programmable logic controller, an FPGA etc.;

a network interface (3035) for two-way data communication over a network link (3051) that is connected to a network (3050) (which in turn may connect to other networks), and may be a cable modem, digital subscriber line (DSL) modem, satellite dish, an integrated services digital network (ISDN) card or other data communication connection to a corresponding type of telephone line, local area network (LAN), which could be an internal or external Ethernet adapter or Wi-Fi adapter; the network interface sends and receives electrical, electromagnetic or optical signals that carry digital data streams representing various types of information, carrying digital data streams, which carry the digital data.

a memory (3040) for storing information and instructions to be executed by the processor (3030), incl. temporary intermediate information during execution of instructions by processor, and could be a random access memory (RAM) or other volatile or dynamic storage device;

a motherboard (3045) (or other communication mechanism) for communicating information, which could be a PC motherboard.

Connected to a network which connects (potentially over numerous networks) (3050) via a network link (3053) is also a policy decision device (3060). This device also contains some of the components (not depicted) that are also contained in the policy management device (3000)—potentially excluding a display, mouse, and keyboard (because there may not be a human user). The policy management device (3000) communicates policies with the policy decision device (3060) across the network (3050) (via links 3051, 3053 etc.), and the policy decision device (3060) communicates with the policy enforcement device (3070) across the network (3050) (via links 3053, 3055 etc.).

Connected to a network which connects (potentially over numerous networks) (3050) via a network link (3055) is also a policy enforcement device (3070). This device also contains some of the components (not depicted) that are also contained in the policy management device (3000)—potentially excluding a display, mouse, and keyboard (because there may not be a human user).

Connected to the policy enforcement device (3070) is a policy enforced device (3080), which is the device for which the policy should be technically enforced.). This device also contains some of the components (not depicted) that are also contained in the policy management device (3000). The policy enforcement device (3070) is connected to the policy enforced device (3080), for example via the policy enforced device's motherboard (e.g. as a PCI board), or for example as a network dongle which connects to the policy enforced device like a network interfaces, but in addition to providing network connectivity also provides the features of the policy enforcement device.

Note that in computer implementations of embodiments of the present invention, some or all of the parts can be combined in a single device, for example (just to name a few possible configurations) the policy enforced device (3080) could include policy enforcement device (3070) and policy decision device (3060), or policy enforced device (3080) could include policy enforcement device (3070), while policy decision device (3060) is a separate device.

In the example computer implementation illustrated in FIG. 30, the policy management device (3000) generates and provides (to the policy decision device 3060) machine-enforceable policies, in response to processor (3030) executing one or more sequences of one or more instructions contained in memory (3040), causing processor (3030) to perform the process steps described in this specification (see example steps below). One or more processors in a multi-processing arrangement may also be employed to execute the sequences of instructions contained in memory (3040). In alternative embodiments, hard-wired circuitry may be used in place of or in combination with software instructions to implement the invention. Thus, embodiments of the invention are not limited to any specific combination of hardware circuitry and software. Furthermore, such instructions may be read into memory (3040) from another computer-readable medium, such as storage device (3025).

In particular, the policy management device (3000) carries out the following actions:

Processor (3030) loads a functional model for the policy enforced device (and its context) which indicates functional system attributes of the IT system and/or its context; in an example, the functional model is detected by sending and receiving probe communications (e.g. using approaches such as traceroute or nmap) across the network (3050), and/or by receiving information from one or more policy enforcement devices (3080), and/or importing information from available sources.

Processor (3030) loads, from a data storage (3025) or a memory (3040), at least one pre-configured policy selection template that indicates at least one policy aspect applicable to the at least one IT system, the at least one policy selection template being selected based on the at least one functional system attributes;

Processor (3030) generates at least one policy user interface and displays it on the display (3005), by selecting policy aspects applicable to the at least one IT system from the at least one policy template, and/or by selecting functional aspects applicable to the at least one IT system from the at least one functional model;

Processor (3030) receives a policy input via mouse (3010) and keyboard (3015) (and/or from the data storage or the memory, or entered by a user via a user interface), indicating at least one input policy for the at least one IT system;

Processor (3030) loads at least one pre-configured policy generation template from the memory (3040) or storage (3025) to the processor that indicates at least one technical rule or configuration aspect of the policy that the policy template pertains to;

Processor (3030) generates one or more machine-enforceable rules and/or configurations in a ready to implement format in a manner compliant with the received input policy (for example using model-driven security, see MDS1); and may store these "low-level policies" in memory (3040) and storage (3050).

Network interface (3035) transmits the at least one machine-enforceable rule and/or configuration to at least one policy implementation entity of the IT system, which in this example is a separate policy decision device (3060);

In the example, the policy enforcement device (3070) is connected to the policy decision device across the network (via 3053, 3055 etc.), and detects trigger events that require a policy decision to be made. For example, relevant network communications arriving at the police enforcement device that attempt to access resources on the policy enforced device (3080). This triggers the policy enforcement device (3070) to provide information about the trigger event to the policy decision device across the network (3050). The policy decision device evaluates the policies it stores against the trigger event information and makes a policy decision. It then provides the policy decision back to the policy enforcement device (across the network 3050), which enforces the decision for the policy enforced device (e.g. access granted or denied)—involving modifying an operation of the processor of the policy enforcement device (3070) or policy enforced device (3080) to execute one or more actions.

What is claimed is:

1. A method of managing policies for at least one information technologies (IT) system including at least one policy implementation, comprising:
    determining at least one functional model for the at least one IT system which indicates functional system attributes of the IT system and/or its context;
    loading, by a processor, from a data storage or a memory, at least one pre-configured policy selection template that indicates policy aspects applicable to the at least one IT system, the at least one policy selection template being selected based on the functional system attributes;
    automatically or semi-automatically generating, by the processor, at least one policy user interface, which is a graphical or textual user interface, that gathers a policy input, by selecting policy aspects applicable to the at least one IT system from the at least one policy selection template, and/or by selecting functional aspects applicable to the at least one IT system from the at least one functional model, and by displaying the policy aspects and/or the functional aspects;
    receiving, by a processor, the policy input at least partially entered by a user via the at least one policy user interface, indicating at least one input policy for the at least one IT system;
    loading at least one pre-configured policy generation template, from the memory to the processor, that indicates at least one technical rule or configuration aspect of the policy on the policy aspects and/or the functional aspects to be implemented on the at least one IT system that the least one pre-configured policy generation template pertains to;
    automatically or semi-automatically generating, by the processor, at least one machine-enforceable rule and/or configuration that is in a ready to implement format in a manner compliant with the received input policy based on the loaded at least one-preconfigured policy generation template;
    selecting the at least one pre-configured rule and/or configuration from the at least one policy generation template corresponding to the input policy, and iteratively filling attribute placeholders of the at least one pre-configured policy generation template with functional system attributes values indicated by the at least one functional model and/or policy aspects indicated by the at least one policy input, wherein the at least one machine-enforceable rule and/or configuration, which implicitly or explicitly includes at least one condition and at least one action is an output that is produced by the processor from the received policy input, the at least one functional model, and/or the at least one pre-configured policy generation template;
    transmitting the at least one machine-enforceable rule and/or configuration to at least one policy implementation entity of the IT system; and
    executing, by the processor, the transmitted at least one machine-enforceable rule and/or configuration by the at least one policy implementation entity for implementing the policy input through the IT system, thereby modifying an operation of the processor of the IT system or the policy implementation entity to determine the result of the at least one condition, and executing the at least one action.

2. The method according to claim 1, wherein the received input policy relates to non-functional system attributes for the IT system and is received in a format that is not machine-enforceable at the policy implementation entity of the IT system.

3. The method according to claim 1, wherein the at least one policy user interface is a wizard user interface, query and response user interface, textual user interface, tree editor user interface, table, form, website, voice interface, gesture interface, brainwave interface or diagrammatical user interface.

4. The method according to claim 1, wherein at the at least one policy user interface, user inputs made via the policy user interface determine at least one subsequent behavior or appearance of the policy user interface.

5. The method according to claim 1, wherein functional system attributes of the IT system and/or its context include one or more of IT system context, user context, user information context, operational context or organizational context, system state context, policy context, security policy context, compliance context, accreditation context, security posture context, technology context, information context, information flow context, network context, time context, workflow context, credential context, permission context, and authorization context.

6. The method according to claim 1, wherein automatically or semi-automatically generating, by the processor, at least one machine-enforceable rule and/or configuration that is in a ready to implement format in a manner compliant with the received input policy includes storing the input policy in a form suitable for implementation.

7. The method according to claim 6, wherein storing includes generating a syntactic output suitable for distributing into a policy implementation entity.

8. The method according to claim 1, wherein selecting the at least one policy selection template is based on IT system characteristics, IT system context, industry type, industry sector type, organizational type, applicable regulations, and/or applicable laws.

9. The method according to claim 1, wherein selecting the at least one policy selection template is based on the at least one user input, user characteristics and/or user attributes.

10. A policy management system, comprising:
    at least one policy management device that is configured to manage a policy input and/or a policy selection template and/or a policy generation template and/or a functional model, the at least one policy management device including a processor, a memory having a computer executable program and the policy input and/or the policy generation template and/or the functional model stored therein, and a user interface;
    at least one policy enforced device that is configured such that at least a part of the functional model managed by the policy management device reflects the functional features/behaviors of the at least one policy enforced device;
    at least one policy enforcement device that is configured to execute policy enforcement on the policy enforced device, the policy enforcement device being a part of or connected to the at least one policy enforced device and/or at least one policy decision device; and the at least one policy decision device that is configured to receive at least one machine-enforceable rule and/or configuration from the at least one policy management device, wherein the at least one policy management device determines at least one functional model for the at least one policy enforced device relevant for selecting the policy selection template and/or the policy generation template based on which functional system attributes are indicated by the policy selection template and/or the policy generation template, the at least one functional model indicating functional system attributes used to select the policy selection template and/or to iteratively fill attribute placeholders;

the at least one policy management device receives a policy selection template loaded from the memory, or entered by a user via a user interface, indicating policy aspects applicable to the at least one IT system, selecting the at least one policy selection template based on the functional system attributes;

the at least one policy management device automatically or semi-automatically generates at least one policy user interface, which is a graphical user interface, that gathers a policy input, by selecting policy aspects applicable to the at least one IT system indicated by the at least one policy selection template, and/or by selecting functional aspects applicable to the at least one IT system from the at least one functional model, and by displaying the policy aspects and/or the functional aspects;

the at least one policy management device receives the policy entered by a user via the at least one policy user interface, indicating at least one input policy for the at least one IT system;

the at least one policy management device loads at least one pre-configured policy generation template, from a memory to the processor, that indicates at least one technical rule or configuration aspect of the policy on the policy aspects and/or the functional aspects to be implemented on the at least one IT system that the least one pre-configured policy generation template pertains to;

the at least one policy management device automatically or semi-automatically generates at least one machine-enforceable rule and/or configuration that is in a ready to implement format in a manner compliant with the received input policy based on the loaded at least one-preconfigured policy generation template;

the at least one policy management device selects the at least one pre-configured rule and/or configuration from the at least one policy generation template corresponding to the input policy, and iteratively fills attribute placeholders of the at least one pre-configured policy generation template with functional system attributes values indicated by the at least one functional model and/or policy aspects indicated by the at least one policy input, wherein the at least one machine-enforceable rule and/or configuration, which explicitly or implicitly includes at least one condition and at least one action is an output that is produced from the received policy input, the at least one functional model, and/or the at least one pre-configured rule and/or configuration template;

the at least one policy management device transmits the at least one machine-enforceable rule and/or configuration to the at least one policy decision device that determines the result(s) of the at least one pre-configured rule and/or configuration for the policy enforced device; and the at least one policy enforcement device, when a policy relevant event occurs, instructs the at least one policy decision device to determine the result of the at least one condition of the transmitted at least one machine-enforceable rule and/or configuration for implementing the policy input for the at least one policy enforced device, thereby modifying an operation of the at least one policy enforced device or the at least one policy enforcement device to execute the at least one action.

11. The policy management system of claim 10, wherein the received input policy relates to non-functional system attributes for the IT system and is received in a format that is not machine-enforceable at a policy implementation entity of the IT system.

12. The policy management system of claim 10, wherein the at least one policy user interface is a wizard user interface, query and response user interface, textual user interface, tree editor user interface, table, form, website, voice interface, gesture interface, brainwave interface or diagrammatical user interface.

13. The policy management system of claim 10, wherein at the at least one policy user interface, user inputs made via the policy user interface determine at least one subsequent behavior or appearance of the policy user interface.

14. The method according to claim 10, wherein functional system attributes of the IT system and/or its context include one or more of IT system context, user context, user information context, operational context or organizational context, system state context, policy context, security policy context, compliance context, accreditation context, security posture context, technology context, information context, information flow context, network context, time context, workflow context, credential context, permission context, and authorization context.

15. The policy management system of claim 10, wherein automatically or semi-automatically generating, by the processor, at least one machine-enforceable rule and/or configuration that is in a ready to implement format in a manner compliant with the received input policy includes storing the input policy in a form suitable for implementation.

16. The policy management system of claim 15, wherein storing includes generating a syntactic output suitable for distributing into a policy implementation entity.

17. The policy management system of claim 10, wherein selecting the at least one policy selection template is based on IT system characteristics, IT system context, industry type, industry sector type, organizational type, applicable regulations, and/or applicable laws.

18. The policy management system of claim 10, wherein selecting the at least one policy selection template is based on the at least one user input, user characteristics and/or user attributes.

* * * * *